United States Patent [19]

Barr et al.

[11] Patent Number: 4,905,219

[45] Date of Patent: Feb. 27, 1990

[54] THREE LEVEL DISTRIBUTED CONTROL FOR NETWORKING I/O DEVICES

[75] Inventors: Paul Barr; Leon K. Woo, both of Framingham, Mass.

[73] Assignee: Aetna Life Insurance Company, Hartford, Conn.

[21] Appl. No.: 534,562

[22] Filed: Sep. 22, 1983

[51] Int. Cl.$^4$ ............................................... H04B 9/00
[52] U.S. Cl. ........................................... 370/4; 370/60; 370/124; 370/92; 455/612

[56] References Cited

U.S. PATENT DOCUMENTS

| | | | |
|---|---|---|---|
| 3,303,475 | 2/1967 | Hellerman et al. | 340/172.5 |
| 3,354,261 | 11/1967 | Hagen et al. | 370/42 |
| 3,444,521 | 5/1969 | Breese | 340/163 |
| 3,529,293 | 9/1970 | Sullivan | 340/163 |
| 3,560,660 | 2/1971 | Poretti et al. | 179/15 |
| 3,641,273 | 2/1972 | Herold et al. | 179/15 |
| 3,647,971 | 3/1972 | Cushman et al. | 179/2 |
| 3,691,528 | 9/1972 | Calvagna et al. | 340/152 |
| 3,829,777 | 8/1974 | Muratani et al. | 325/4 |
| 3,872,437 | 3/1975 | Cross | 340/147 |
| 3,883,691 | 5/1975 | Pilc et al. | 178/73 |
| 3,919,461 | 11/1975 | Hunting et al. | 178/2 |
| 3,952,286 | 4/1976 | Wakamatsu et al. | 340/163 |
| 3,956,593 | 5/1976 | Collins et al. | 179/15 |
| 3,985,962 | 12/1976 | Jones et al. | 179/15 R |
| 4,009,345 | 2/1977 | Flemming et al. | 179/15 |
| 4,061,880 | 12/1977 | Collins et al. | 179/15 |
| 4,074,072 | 2/1978 | Christensen et al. | 179/15 |
| 4,112,416 | 9/1978 | Hasegawa et al. | 340/147 |
| 4,127,845 | 11/1978 | Dansback et al. | 340/151 |
| 4,144,407 | 3/1979 | Zaffignani et al. | 178/50 |
| 4,177,450 | 12/1979 | Sarrand | 340/147 |
| 4,197,427 | 4/1980 | Hutcheson et al. | 179/18 |

(List continued on next page.)

FOREIGN PATENT DOCUMENTS 2069734  8/1981  United Kingdom .

OTHER PUBLICATIONS

Mokhoff-Fiber Optic Lans-Computer Design-Fall 1983-pp. 14–18.

Cohen-Packet Communication-1981-National Computer Conf. 4-7 May 1981, Chicago, Ill., pp. 169–172.

Rothauser-Meshed Star Networks-Local Networks for Computer Communications-North Holland Pub Co.-1981.

Primary Examiner—Robert L. Griffin
Assistant Examiner—L. Van Beek
Attorney, Agent, or Firm—Weingarten, Schurgin, Gagnebin & Hayes

[57] ABSTRACT

A three level network microprocessor based nodal architecture for a fiber optic local area network communication system is disclosed in which the processing responsibility for establishing a voice, video or data communication link between an initiating I/O device and a recipient I/O device and for subsequent two way data exchange between the initiating and recipient devices are shared between three levels of digital processing capability in such manner as to demand the least amount of time from the highest, most intelligent processing level common to all devices thereby making more efficient use of its processing capability as an overall supervisory processor. Each I/O device whether it be a digital terminal, computer or telephone set interfaces with a nodal system through a middle level of processor. An initial communication request from any device at the middle level generates an interrupt command to the highest supervisory processing level which responds to the interrupt, resulting in the identification of the desired recipient station by recalling from storage, associated with the highest level processor, routing information required in establishing a communication link with the desired recipient device. That information is provided to the processor at the middle level associated with the initiating device. That processor completes the link if the recipient is local to it. Otherwise the addresse or recipient device identifying codes are communicated from the middle level to a third level processor responsible for effecting the actual routing of the communication.

24 Claims, 6 Drawing Sheets

U.S. PATENT DOCUMENTS

| | | | |
|---|---|---|---|
| 4,201,889 | 5/1980 | Lawrence et al. | 320/68 |
| 4,210,782 | 7/1980 | Fujita | 179/18 |
| 4,259,717 | 3/1981 | Nakamura | 364/200 |
| 4,276,643 | 6/1981 | Laprie et al. | 371/8 |
| 4,287,508 | 9/1981 | Arita et al. | 340/150 |
| 4,288,658 | 9/1981 | Bieber et al. | 178/3 |
| 4,291,196 | 9/1981 | Spaniol et al. | 178/3 |
| 4,313,193 | 1/1982 | Nakano et al. | 370/43 |
| 4,317,197 | 2/1982 | Ulug | 370/94 |
| 4,322,843 | 3/1982 | Beuscher et al. | 370/63 |
| 4,347,498 | 8/1982 | Lee et al. | 340/825.02 |
| 4,355,385 | 10/1982 | Hampshire et al. | 370/85 |
| 4,373,183 | 2/1983 | Means et al. | 364/200 |
| 4,397,030 | 8/1983 | Becker et al. | 375/36 |
| 4,430,699 | 2/1984 | Segarra et al. | 364/200 |
| 4,450,554 | 5/1984 | Steensma et al. | 370/4 |
| 4,506,358 | 3/1985 | Montgomery | 370/60 |
| 4,510,594 | 4/1985 | Johnson | 370/60 |
| 4,566,095 | 1/1986 | Devault | 370/60 |
| 4,569,042 | 2/1986 | Larson | 370/60 |
| 4,692,917 | 9/1987 | Fujioka | 370/60 |
| 4,731,878 | 3/1988 | Vaidya | 455/600 |

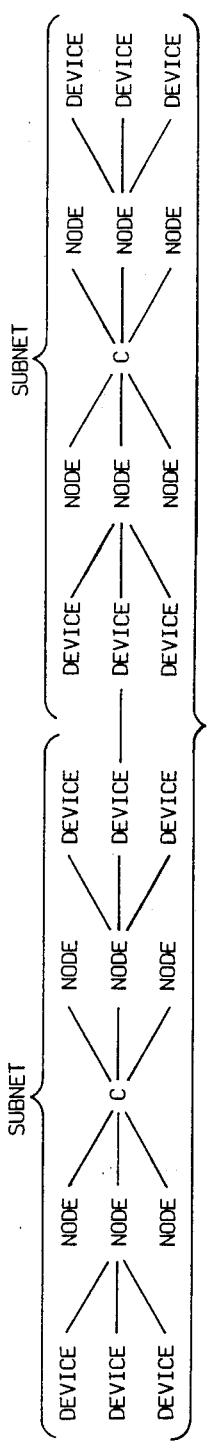
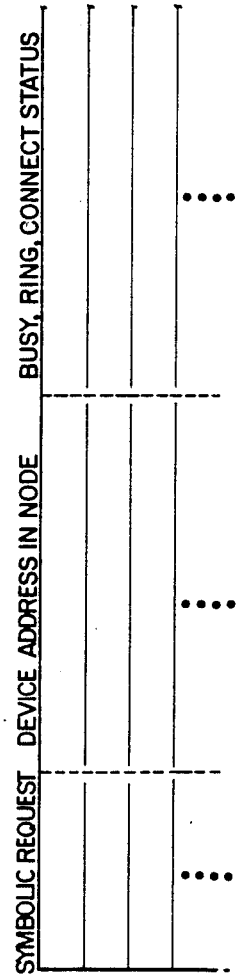
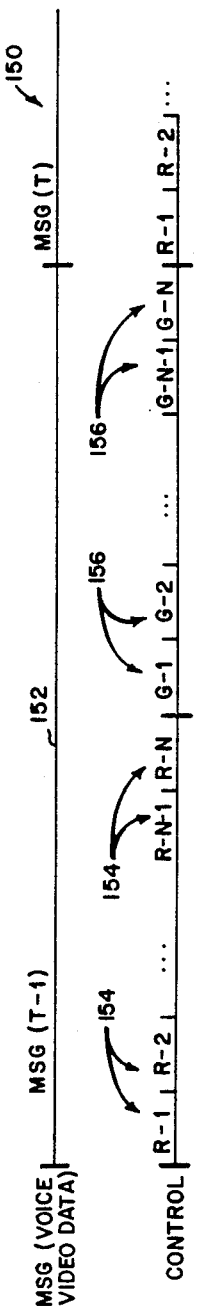

THREE LEVEL DISTRIBUTED CONTROL FOR NETWORKING I/O DEVICES

FIELD AND BACKGROUND OF THE INVENTION

The present invention relates to local area network systems in which simultaneous voice, data and video communication between an initiating and recipient device located within the same or distinct nodes is accomplished. Since any such system must have the capability for connecting any station with another station within the entire coverage area of the network, a great deal of complexity can be rapidly built into the system in order to provide such full service coverage. Utilizing digital processing techniques and available logical processor capabilities, it is possible to accommodate the demands of such networking to a great extent.

Efficient utilization of even a processor based networking system requires the efficient interplay of: (1) a directory function to identify, from an enormous repertory of subscriber addresses, a desired address for an identified recipient device from any initiating device; (2) the processing of that information to establish and maintain the communication link between the initiating and recipient devices; and (3) the function of information exchanger for a large number of simultaneous exchanges.

These substantial demands can and have been met in the past by expensive arrays of processing capability utilizing in some cases multiple processors and shared processing capacity.

BRIEF SUMMARY OF THE INVENTION

In accordance with the teaching of the present invention the processing functions required for establishing and maintaining a high level of voice, video and data communications between originating and recipient devices distributed over a communication network of multiple nodes is accomplished by distributing the processing function within each node between three levels of processing capability. A first level processor on the highest level provides initial processing on an interrupt basis of a request for communication from any originating I/O device within the node and rapidly accesses, at character transmission rates, routing information for the desired recipient device, while monitoring call progress until a connection is made. The high level processor then drops out. The routing information is in turn passed on to a second level processor system associated on a data bus with a cluster of devices, one of which is the originating device of the communication request. The routing information received at the second processor level from the directory in the top level processor is utilized at the second processor level to format both information and addressing data into queues and data registers, where they are available for extraction by a third level processor which acts on the routing information to distribute the data packet in according with that routing information either back to another cluster of communication devices within the same node or out over a network coupler, typically a passive star optical fiber network, to other nodes for distribution to the addressed recipient there.

The division of communication responsibility in this manner greatly improves the efficiency of each local area network node. The directory function for generating routing information for a desired communication between any two or more devices is centralized in a single processor at the highest level and the demands upon its time are minimized by passing control from it to the second and third level processors as soon as the routing information is established and a connection between devices made. Directory updating is also simplified by the need to access/modify information in only one data base. The actual control over communication between devices is then distributed between a number of small processors, typically inexpensive microprocessors, which efficiently maintain a large number of communications simultaneously. The substantially largest task of routing voice, video or data signals for transmission or receipt by individual devices is accomplished at the middle level of distributed processors, utilizing efficient high density, high speed burst transmission of data packets.

The communication routing external of a node is made by the third level processor through communication logic utilizing a priority scheme which occupies the real time communication ability of the linkage through a passive star or other mechanism to other nodes on a 100% message density basis along a message link. This high density is achieved by using a separate control link between nodes over which a repeating time frame is cut into segments occupied by requests for transmission from each node. Alternating with the request subframe is a subframe of grants, one corresponding to each of the nodes in the network. In each grant, a corresponding node transmits its determination of the next node to transmit according to the same algorithm which is based upon the node having the highest priority message and longest wait. All grants should be identical, which serves as an error check, and the identified node is then operative to transmit communication information over the message link during the subsequent frame. The process keeps repeating, allowing the node with the highest priority and longest wait to be the next to go. Because of the need for real time communication for voice and video signals, the priority algorithm assigns to those the highest priority, handling all requests for such communication first.

The three level hierarchy and distribution of communication functions between them minimizes the amount of burst transfers required within a node to a maximum of two to accomplish any information transfer function and a maximum of four transfers where more than one node is involved. Similarly, the separate control link insures that the message link will be completely full of information at all times as long as information is waiting, thereby allowing maximum communication rate between nodes.

DESCRIPTION OF THE DRAWING

These and other features of the present invention are more fully sent forth below in the solely exemplary detailed description and accompanying drawing of which:

FIGS. 4A, 4B and 4C are respectively a diagram illustrating network architecture, address formatting, and a device address directory;

FIG. 5 is a timing diagram illustrating the operation and timing of the priority switching of communication between nodes over a coupling network;

DETAILED DESCRIPTION

Figure 1:
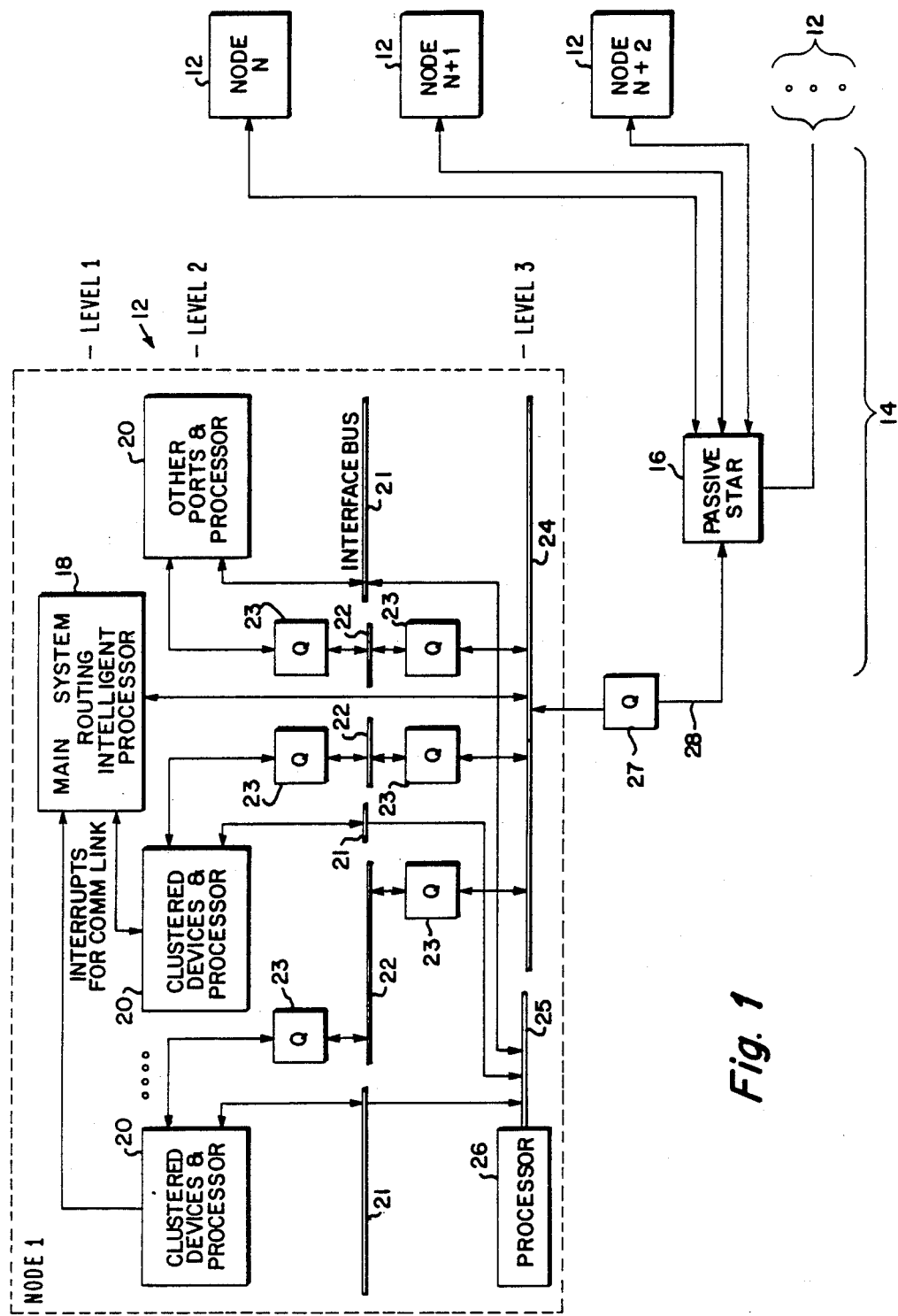
FIG. 1 is a generalized block diagram of a local area network illustrating the distribution within a single node of processing functions between three levels of processors.

The present invention contemplates a local area networking system as illustrated in FIG. 1 in which a plurality of nodes 12 are interconnected through a communication network 14 typically comprising a fiber optic communication path coupled through a passive star 16.

A typical network or local area network is illustrated in FIG. 4A. As shown there, devices are associated with nodes through which they may communicate to each other without their signals ever leaving the node. A subnetwork is formed by coupling together several nodes through a coupling device C. In the case of the present invention, a preferred coupler utilizes optical fiber interconnecting mechanisms. One or more devices within a node may comprise porting mechanisms that communicate with other similar devices in a node or nodes of other subnetworks. By allowing communication between such devices in different subnetworks, the subnetworks can be associated together to form networks, or local area networks.

FIG. 4B illustrates an addressing scheme utilized in the present invention to identify, within a group of networks, a particular device. The scheme of FIG. 4B devotes 32 bits to the particular device address, allotting 8 bits to denote the network, 8 bits to the subnetwork, 8 bits to the node, and 8 bits to the device within the node. A very large number of devices can be uniquely identified by such a format.

Within a single node 12 the communication function is distributed between three levels. The first level comprises a computer and associated memory and secondary storage operating with the system software identified in Table I as the main system routing. It comprises the most intelligent processor 18. The processor 18 maintains in secondary storage a directory of identification and routing directions for all devices within its node 12. Device addresses for other nodes 12 are accessed through the local area network as discussed below. The devices, representing the I/O capability of individual subscribers, are typically clustered in groups 20 comprising typically four individual devices such as telephone sets, data terminals, video systems, computers, etc. and have associated therewith a second level microprocessor. A request to establish communications, such as an offhook indication plus a dialed number, is established as an interrupt to the main computer system 18.

The dialed number is utilized by the highest level processor 18 to access a directory of addresses for the devices within that procesor's node. An exemplary directory is illustrated in FIG. 4C. As shown there, the directory consists of a series of storage addresses corresponding to the number of the requested device generated by the requesting device. Correlated with each address is a set of routing codes for the requested device, if it exists within the same node, along with a set of binary bits which the processor controls to indicate the status of the requested or addressed device. These bits include bits to indicate a busy or Off Hook status for the device, the status of that device receiving a ring signal, and the condition for that device being interconnected with another device.

If the directory of the local processor 18 for the requesting device does not contain such an entry for the requested device, it indicates that the requested device is not present within that local node. As described below, the processor 18 then composes a message for transmission to other nodes seeking the node having the requested device.

When the requested device is located, the processor associated with the node of the requested device detects its status. If that status indicates a busy condition, the requesting device is so signalled by its local processor 18. Otherwise the requested device is caused to ring and its subsequent Off Hook status institutes communication between the devices in a data block transfer mode. The communication prior to this point had occurred at character rate, insuring optimum speed in the communication and minimizing the amount of time that the attention of the highest level processor must be diverted to handling the communication initiating function. The conversion to block rate occurs after the processor 18 receives from its storage or the storage of the processor 18 in a remote node the routing instructions from the directory of FIG. 4C for communication to the requested device along with an indication of Off Hook for both devices. This information is provided to the processor(s) associated with the requesting device in one of the clusters 20. The requested device processor receives the complementary routing data for the requesting device. At this point the high level processor(s) 18 drops out of the communication function for information exchange between the requesting and recipient devices, all subsequent processing being handled by level two and three processors.

The microprocessor(s) associated at level 2 with the requesting and requested devices in the corresponding cluster(s) 20 formats information for transmission between the devices as a combination of information signals that are block transferred between FIFO queues 23 over a data bus 22. Source and destination queues 23 are identified over a control bus 21 from routing provided by a processor 18. A control bus 25 serviced by a third level microprocessor 26 sets source and destination controls for block transfer between queues 23 over a send data bus 24. If the routing is to a device with the node, the source and destination control set up over bus 25 will execute block transfer between queues 23. If the requested device is outside the node, routing will be between queues 23 and a queue 27 used for block transfer over the coupler link 14.

In this manner, the processing function for handling all of the information assemblage and interfacing with the individual devices occurs with a set of distributed processors grouped in clusters 20 at the second level. The actual information exchange is then simplified for routing by the processor 26 in the most efficient manner.

Figure 2:
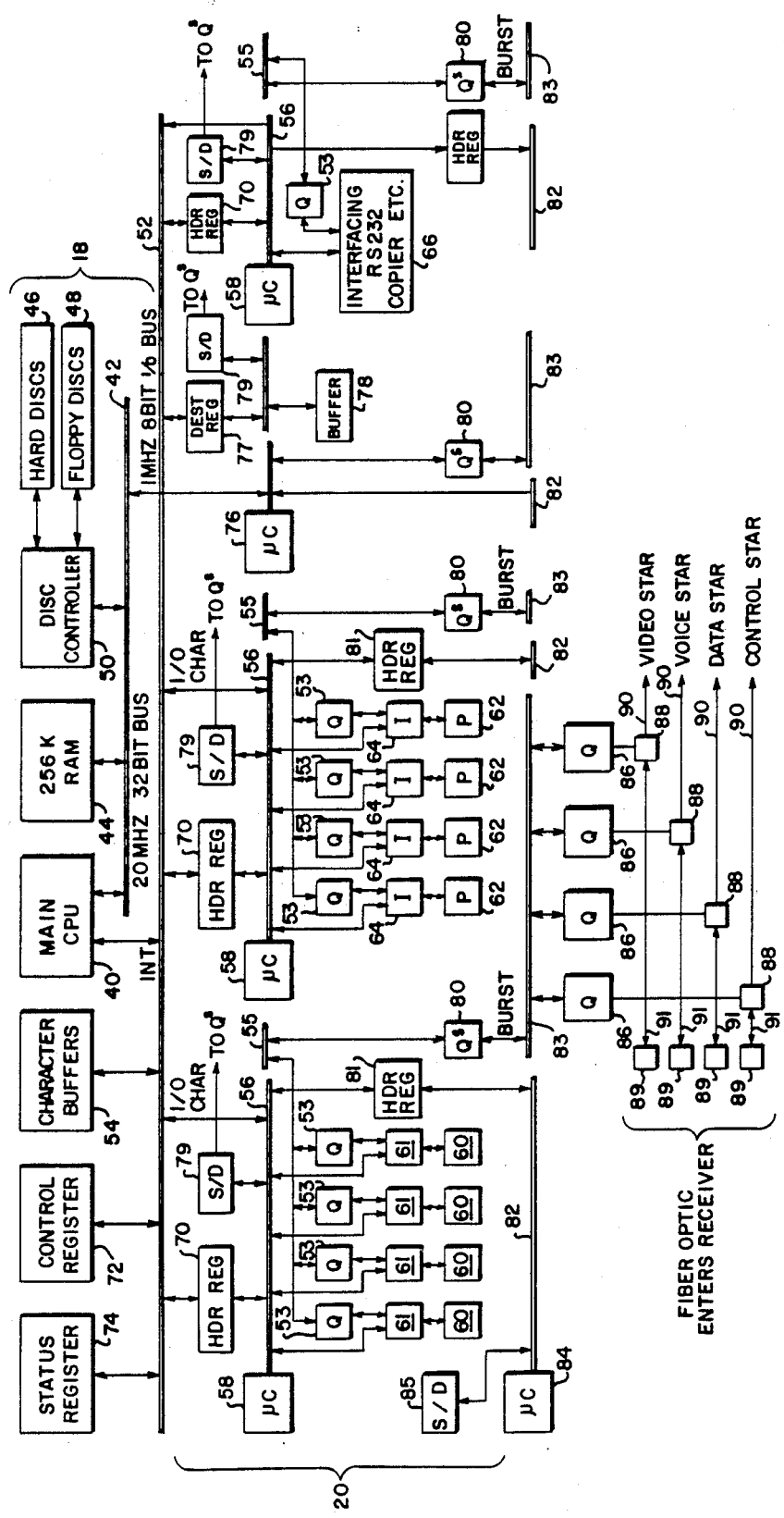
FIG. 2 is a detailed block diagram illustrating the component structure of a single node for use within the FIG. 1 architecture.

The details of an individual node 12 illustrated in FIG. 1 are shown with respect to FIG. 2 identifying individual component elements responsible for accomplishing the networking function.

The system illustrated in FIG. 2 shows the main system routing processor 18 to include a central processor unit 40, which may be a 32 bit microprocessor, programmed in accord with the Table I C-Language Coding, associated over a high speed data bus 42 with an internal RAM memory 44 and mass storage memories 46 and 48 in the form of hard disks and floppy disks associated with the bus 42 through a conventional disk controller 50. A data bus 52, typically a one mega byte input/output bus, communicates with the CPU 40 on the one hand to exchange data at a character rate with individual clusters 20. In the case of data exchange with digital devices, character buffers 54 provide buffering for the access rights on handshaking routines to set up communication. For voice, they provide tone to ASCII conversion.

Each cluster 20 is illustrated to comprise an interface or control bus 56 associated with a microcontroller 58. The bus 56 communicates with a plurality of devices such as a set of four data terminals 60 illustrated in one cluster 20 or a set four of conventional telephone sets 62 illustrated in a second one of the clusters 20. Typically each of the telephone sets 62 is coupled for message transfer to a data bus 55 through an interface circuit 64 and FIFO queue 53 described below with respect to FIG. 3. The digital terminals are connected through a digital interface 61 and FIFO queue 53 to the date bus 55 associated with its minicontroller 58.

Other interfacing functions and components such as an interfacing system 66 using one or more types of interfacing logic such as that corresponding to the RS232 interfacer for operation with other data equipment or a further network may be associated with the data and control buses 56, 55 of yet another cluster 20.

Associated with each data bus 56 of the clusters 20 is a header register 70 connected between the bus 42 and control bus 56 to contain routing data set there by CPU 40 appropriate to each device communication being established, or ongoing. The data in this register is accessed by the level two controller 58 to set up source and destination codes in registers 79 that control the transfer of data between queues on bus 55. A status register 74 functions to hold a request for communication for each device in a cluster 20. The CPU 40 scans these registers to identify interrupting devices requesting service. A sets of control registers 72 are associated with each device 60, 62 and are set by the CPU 40 to cause a particular device to receive and indicate a dial tone, busy signal or ring back, and to identify to that device whether it is in a character or burst data mode.

The main routing computer system 18 may be addressed on its bus 42 directly through a cluster comprising a microcontroller 76, data and control buses 55, 56, destination register 77 and buffer storage 78 associated with control bus 56 along with queues 80. Such a connection may be utilized, for example, for electronic or voice mail or mass data transfer to and from the records, such as disks 46 and 48, of the central computer system 18. It functions substantially the same as the other level two systems.

The control buses 56 set source and destination registers 79 that control communication through a set of queuing registers 80, according to data in header registers 70. A second set of header registers 81 are associated with a microcontroller 84 to define the third level of communication processing. The header registers 81 store the data in registers 70. The controller 84 uses the data in the header registers, identifying routing, to set source and destination codes in registers 85 over a control bus 82. At any instant of time these control the flow of data between the queues 80 and 86 on a data bus 83. Separate queuing registers 86 typically provided as four sets of registers, one for each of video, voice, data or control information channels, assemble data which is to be or has been transformed by an optical transmitter/receiver pair 88 for two way optical communication over the respective optical fiber cables 90 to a corresponding fiber optic coupler, such as a passive star coupler. The transmitter/receiver pairs 88 are controlled by control logic 89 over buses 91.

All processors 58, 84 and 89 may be model 8X305, 8X310 processors with associated RAM/ROM memory to contain their programming as shown in microcode in Table II. System speed typically increases with each downward level in order to accommodate the increasing information density. It is thus preferable that logic 89 be hard wired to provide simultaneous control of step execution specified in FIG. 7.

Figure 3:
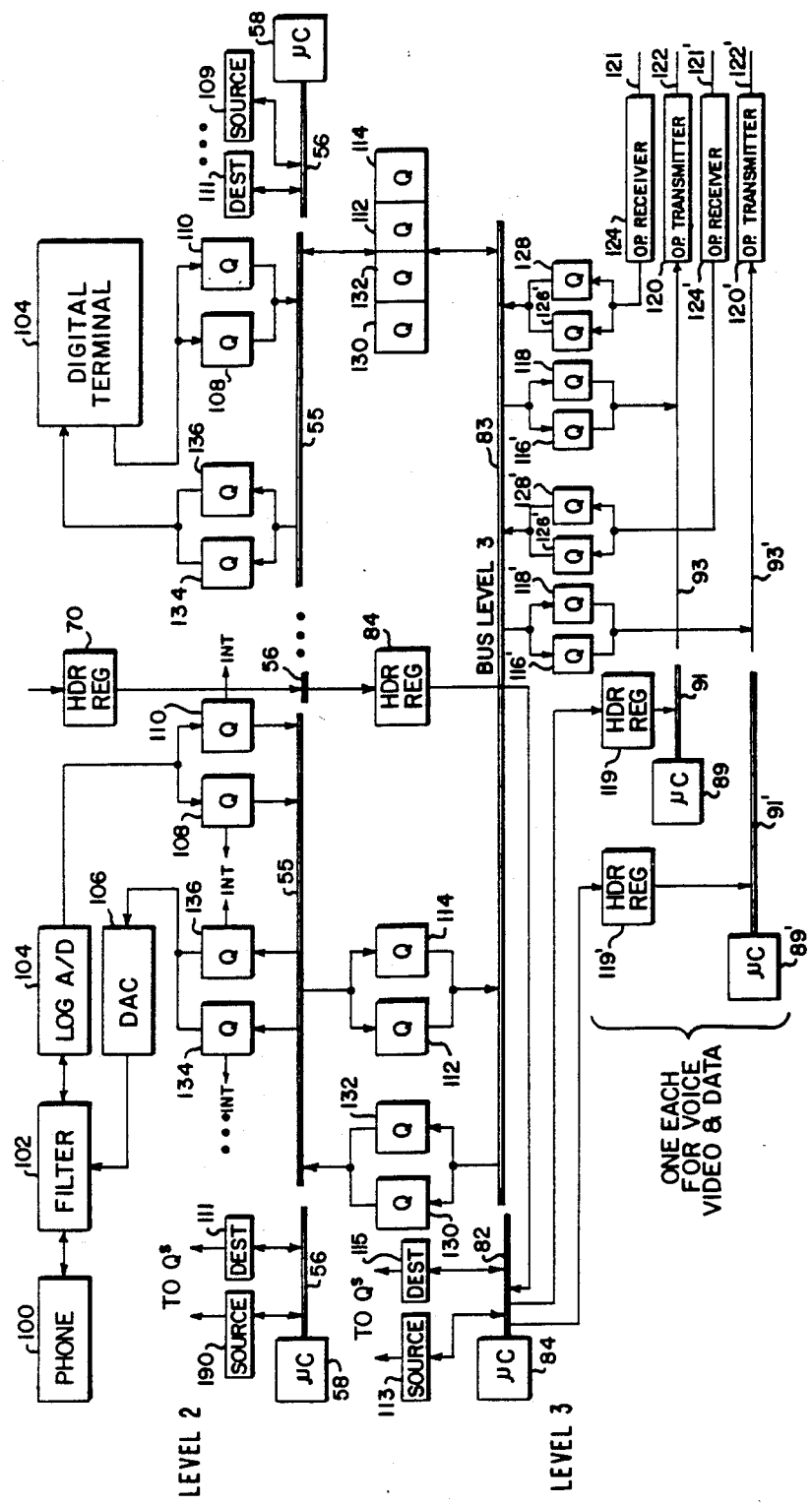
FIG. 3 is a detailed circuit diagram of a portion of the circuit node of FIG. 2 comprising the data handling capability for voice or digital signal transfer between second and third level processing functions.

FIG. 3 illustrates circuit details of clusters 20 and the queues 80 and 86, along with one of four transmitter/receiver pairs 88 and logic 89 and buses 91. In the case where the subscriber device comprises a telephone hand set 100 a filter network 102 provides bandpass matching of the telephone voice signal for application through a logarithmic analog-to-digital converter 104 or for transient filtering of the switching transients in the digital-to-analog conversion of a digital-to-analog converter 106. Converter 104 (AMD AM 7901) is selectively controlled by CPU 40 for log or linear operation. The output from the analog-to-digital converter 104 is applied to a set of queues 108 and 110. While one queue is accumulating a package of digital data for burst transmission, the adjacent queue 110 is transmitting the previously accumulated digital packet as a data burst. Each queue 108, 110 provides an output signal indicating its need for emptying as an interrupt signal. The associated microcontroller 58 receives both routing data from the header register 70 and the interrupts and sets control codes into source and destination registers 109 and 111 on control bus 56 to define the order of data flow in bursts from ones of the queues 108, 110 associated with each of the devices through data bus 55. The information is processed on the most urgent basis (i.e. FIFO) and is applied to the data bus 55 so that it will be picked up by a complementary set of data queues 112 and 114 coupling the data bus 55 to the data bus 83, associated with the third level microcontroller 84. In the event information is destined for a device in the same cluster 20, queues 134 and 136 will receive the bursts. In a similar manner, the microcontroller 84 will respond to data in header register 81 defining routing outside the node and interrupts from queues 112 and 114 defining timing to set source and destination registers 113 and 115 to control the flow of bursts of data from one of the queues 112 or 114 through data bus 83 to ones of four sets of output queues 116 or 118. If data is destined to a device within the node, one of queues 130, 132 leading to bus 55 of another cluster is used.

Data thus processed by the microcontroller 84, is assembled from the queues as data packages and applied into the data queues 116 and 118. Control logic 89 applies the data in the queues 116 and 118 to an optical transmitter system 120. Logic 89 accesses a header register 119 on control bus 91 to include addressing information in the data burst of queues 116, 118. Transmitter 120 converts the electrical signals into optical modulation for coupling into an optical fiber 122 and thence over the optical coupler system 14. The only difference is that header information is now transmitted as part of the outgoing data. The system of queues 116 and 118 is repeated for each of the communication channels utilized for voice, video, data and control purposes described above with respect to FIG. 2. The control channel is shown in FIG. 3 with all elements primed.

Data is received as optical signals on a fiber 121 and is converted to electrical counterparts by an optical receiver 124 and applied, under control of registers 113 and 115 set by processor 84, through a complementary set of queues 126 and 128 using the same data routing techniques in the reverse direction. The queues 126 and 128 provide data to the bus 83 where the source and destination registers 113 and 115 set by the controller 84 control the routing into one of the cluster 20 queue sets 130 and 132 used to block transfer data from the bus 83 to a bus 55. In similar fashion, the source and destination registers 109 and 111 set by the microcontroller 58 at the second level route information in the queues 130, 132, through the bus 55, to the appropriate ones of the queues 134 and 136 that directly apply information to the ultimate subscriber device.

In the case where the originating or recipient device is a digital terminal 140 rather than a voice terminal, a similar set of queues 108, 110, 134, and 136 are utilized for communication through the data bus 55 associated with the cluster microcontroller 58 and associated source and destination registers 109 and 111 controlling that flow of data communication.

Figure 7:
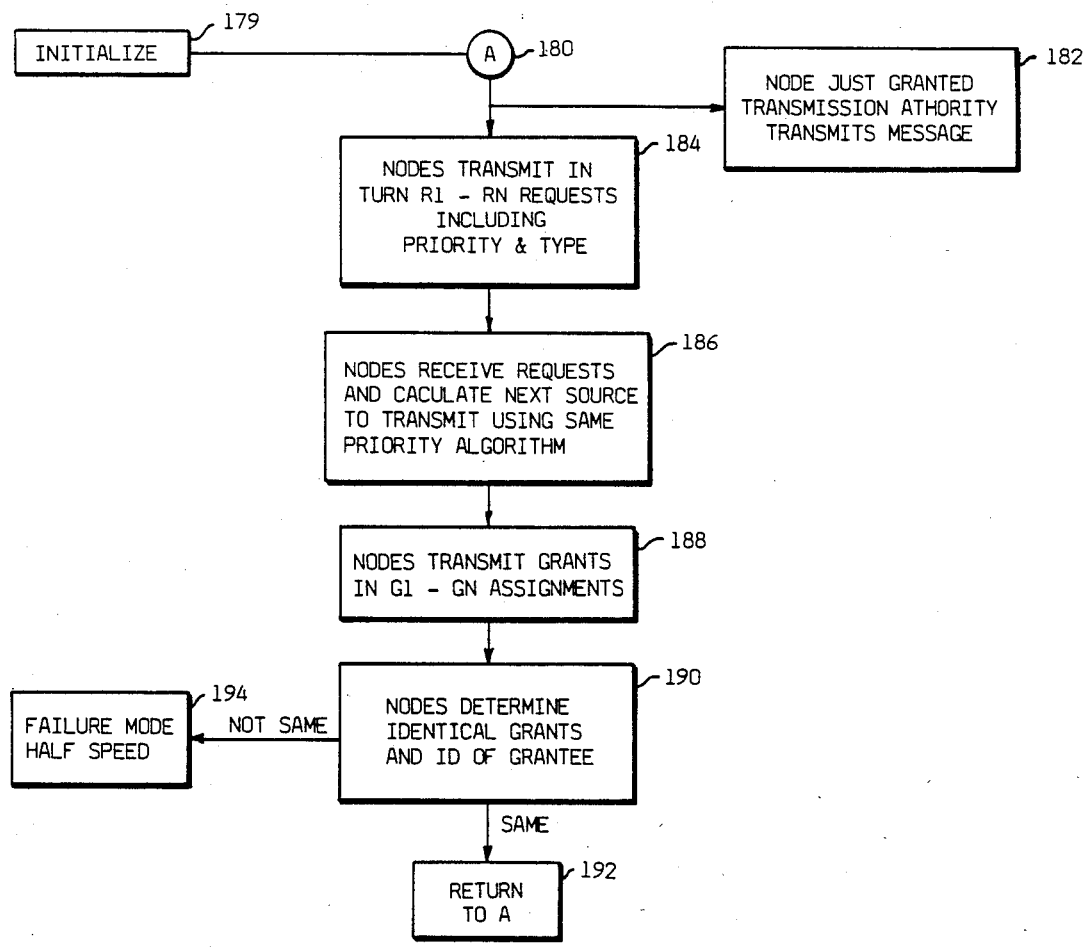
FIG. 7 is a processing algorithm illustrating the operation of the third level node in a priority transmission scheme with other nodes associated through a single coupling network to identify the next node to transmit over the network.

The transmission system from the data bus 83 through the system of queues 116, 118, and optical transmitter system 120 is governed by a priority scheme operative within the microcontroller 84 and logic 89, and described with respect to the algorithm of FIG. 7, utilizing the time framing illustrated in FIG. 5. As shown there, a timing diagram 150 is broken into a series of time frames 152 for the transmission, by one of the nodes 12 in the system, of a message packet. The determination of which node will transmit for each time frame 152 is determined by transmissions over a control link as illustrated by the primed numbers in FIG. 3. The time frame 152 on the control link is divided into a set of time slots (or bit groups) 154 each associated with one of the nodes 12 followed by a set of time slots 156, also each associated with one of the nodes. During the time slots 154, each node transmits in its associated time slot only a request for transmission comprising the identity of the type of information awaiting transmission if any. Each of the nodes receives this information as distributed throughout the network 14 and makes a determination according to an identical priority algorithm as to which station should transmit information in the next occurring information time frame 152. That determination is made upon the basis of the node having the longest interval from its last opportunity to transmit. The identity of the node to transmit is then communicated by each node it is corresponding time slot 156 as a grant of communication authority to that node. If all grants are identical, indicating each node its processing information according to the same priority scheme accurately, in the next subsequent time frame 152 the identified node will automatically transmit a data burst through its queuing system during the entire time slot 152. In this manner as long as there is a node awaiting to transmit information, the entire time available for transmission on the message links will be fully utilized. Typically, the priority scheme will give priority to voice and video communications because of its real time requirements, handling digital information exchange after all awaiting voice communications have been handled.

The main computer 18, according to the programming as exemplified by Table I, keeps track of the numbers of voice, data, etc. communications going on simultaneously and has a maximum number of voice communications which the node will handle simultaneously before overloading the transmission system so that a voice communication has to wait an unacceptably long period of time, thereby creating a perceived communication delay between the users. This information is contained within the system program. With a request for communication when the maximum number of voice channels has been reached, control register 72 will cause the requesting devices to be placed in a busy signal condition.

Figure 6:
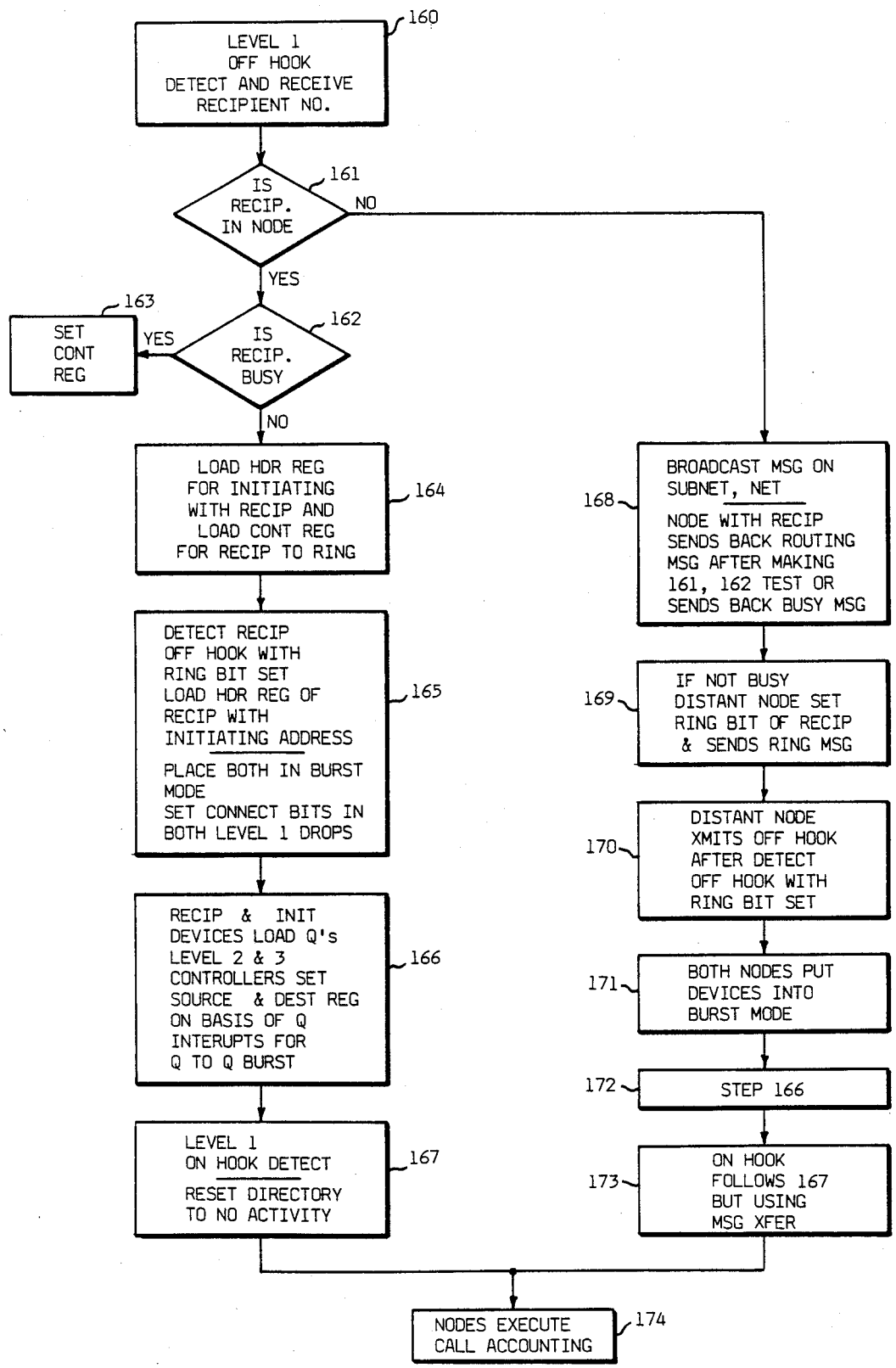
FIG. 6 is an algorithm illustrating the operation of a node according to FIG. 2 for establishing a communication link and for generating communication data for exchange between devices within the same or different nodes.

These and other functions of the CPU 40 are accomplished by the Table I programming. FIG. 6 is an algorithmic representation of that programming as it affects system operation according to the present invention. As shown therein, the initial response by the system to a requesting or initiating device going Off Hook is detection of that by the CPU 40 in a step 160 by interrupt and checking the status registers 74. Off Hook status causes CPU 40 to set a dial tone bit in control register 72 for the requesting device. The CPU also receives the number of the requested or recipient device generated by the requesting device. CPU 40 makes a decision in a subsequent step 161 by accessing the directory for all devices in its node as recorded in mass storage. If the device requested is within the node, processing branches to a decision step 162 in which the CPU 40 checks the status bits in the directory for the requested device. If the status bits indicate that the requested device is busy, the control register 72 for the requesting device is set to generate a busy tone in that device in a step 163. If the requested device is not busy, processing proceeds to a step 162 in which the CPU 40 places in the control registers 72 for the requested and requesting devices states which generate a ring and ring tone respectively. At this point the CPU 40 may also load the header register for the requesting device with routing data from the directory for the requested device although this may also be accomplished after the requested device is detected in the Off Hook status. In step 164 the CPU 40 sets the ring bits in the directory status registers for both requesting and requested devices. In subsequent step 165, the CPU 40 detects the Off Hook status of the requested device with the ring bit set. The header register 70 associated with the requested device and the control register 72 for both are loaded with control data causing each controller 58 to proceed to execute block or burst transfer between queues. The CPU 40 then sets the connect bits in the directories for the two (or more) devices and drops out of operation.

In a subsequent step 166, the messages generated and received by the requesting and requested devices flow through the level two and three queues under control of the source and destination registers set by the controllers 58 and 84 in response to queue status interrupts and header register addressing data set by CPU 40. If the talking devices are entirely within a single cluster 20, the header register addresses will result in source and destination register control that keep data flowing between the queues over a single bus 55 within that cluster.

The step 166 processing continues until the CPU 40 detects in the status register 74 an On Hook condition for one of the communicating devices in a step 167. The CPU 40 then resets the directory status bits for that device to an inactive status and proceeds to a step 174 to do accounting for the communication.

If decision step 161 indicated that the requested device was not in that node, processing proceeds to a step 168 in which the CPU 40 forwards a message, through the path governed by controller 76 for transmission to other nodes. That message identifies the originating node and requested device. All nodes respond to that message to search their directory for the requested device. The node which has the requested device within its directory and thus physically located within the node, checks the device status bits in the directory for a busy indication. If the device is busy it transmits such an indication, otherwise it transmits out over the subnetwork or network an indication of the routing to that device from its directory. The distant node then sets the ring bit in the directory and control register 72 for the requested device and transmits back a message, picked up by the originating node indicating a ringing state at the requested device in step 169. The originating CPU 40 sets the ring tone in the control register for the requesting device.

When the requested device goes Off Hook, the CPU 40 of the distant node detects that state via interrupts and the status registers 74. Detection of the Off Hook condition, with the ring bit set in step 170, causes transmission of an indication of that event over the network by the distant node CPU 40. Subsequently, in step 171 the distant node CPU 40, and the originating node CPU 40 in response to reception of the Off Hook message, both set the connect bits in the directories. At this point, or earlier, the header registers for both requesting and requested devices are set with routing information so that the block or burst transfer through the queues can proceed as noted above. The cluster controllers 58 are put into the block transfer mode initiating that form of information exchange between the devices. Subsequent step 172 corresponds to the normal communication state of step 166. Once either device goes On Hook, the local CPU 40 initiates the termination procedures of step 167, in step 173. Thereafter the processing proceeds to the accounting step 174.

The prioritizing scheme illustrated with respect to the timing diagram of FIG. 5 operates in accordance with the programmed algorithm of FIG. 7 within the controller 84 and logic 89. The algorithm of FIG. 7 implements the following data conventions:
A message packet frame is defined to include:
  a header (or burst) having: 4 bytes destination subframe and
  4 bytes source subframe
  (Where a dest/source subframe is: (FIG. 4B)
    1 byte device id
    1 byte Node id
    1 byte Subnet id
    1 byte Net id)
  1 byte type of message (or command char.)
  1 byte size of transfer;
  information consisting of: x bytes data; and
  a trailer having: 2 bytes Cyclic Redundancy check digits (CRC-16)

At wakeup or power up each Node is in an alexic state. It is one of the functions of initialization step 179 to place a unit into a normal state giving the Node its identity. By design embedded in the hardware, each Node, or a minimum of 3 Nodes in a Subnet, will turn on with the ability (as a minimum) to read from the memory of its CPU its physical id and its profile characteristics. This permits utilization of a priority interaction between nodes. At Startup each node reads its physical id and sets a watchdog timer to a value based on its physical id.
  id=1 set timer to 0
  id=2 set time to 0.1 sec Using the transmit clock
  id=3 set time to 0.2 sec
  id=20 set timer to 1.9 sec As the time counts down, a health message is transmitted by each node at time=0 on the messsge fiber link. The time intervals for each node are extracted from the message fiber link by each of the node's message receiver circuits and is used to define the timing for the control fiber link as shown in FIG. 5. This clock and a counter is used to partition (allocate a slot) the transmit and receive time for each of the nodes on the control fiber. As each node receives a message on the message fiber link it resets the watchdog timer to its initial value. This allows for robust system action (i.e., no single point failure mechanism.)

The priority scheme after initialization starts from a state 180 and proceeds to a step 182 in which the node granted transmission authority transmits its message during the subsequent time frame 152. Each microcontroller 89 in each node also executes a step 184 in which, in the particular one of the time slots 154 assigned to that node, it transmits a request (or not) for transmission. Using the recovered clock from the message fiber link each node counts modulo 3, using their number of modulo 3 compared to its physical id as the time slot for that node to make a message bus request (i.e. id 1 starts out followed by id 2, id 3, etc.) till the 20th time slot is noted. This provides 3 bit times for each node (hence time=60 bits for all nodes to make or not make a message bus request for the next message frame.) Each time slot (3 bits) for the 1st-60 bit period is defined as follows:
  bit 1: Binary 1 for request for message link
    Binary 0 for no request (absence of pulse)
  if bit 1=Binary 1 then
    bit 2: Binary 1 message request=voice
    Binary 0 message request=data
  if bit 2=Binary 0 then
    bit 3: Binary 1 character transfer
    Binary 0 block transfer.

In a subsequent step 186 each node microcontroller 84 receives the request from all the other nodes as applied on the control cable 90 of the network connector and calculates according to the same priority scheme the identity of the node next to transmit. The priority algorithm for granting a node's message request proceeds according to the following rules:
  (a) At any instance of time a voice or video (real time) request has higher priority than a data request.
  (b) Two or more nodes requesting voice message transmission at the same time, the lower physical id node is granted.

(c) Outstanding voice requests are honored as longest waiting first.

(d) Data requests are honored after all voice or video requests have been granted.

If all nodes are operating correctly this identity will be the same from each case. In a subsequent step 188, each node transmits the identity of the node determined to be the next to transmit in the assigned one of the time slots 156 as a grant of authority. Each node in a step 190 responds to the grants of authority to determine that all nodes are granting the same node the authority to transmit in the next message frame 152 and, if the identity is the same, processing returns in a step 192 to state A with, in step 182, the granted node transmitting its message, and the request and grant sequence repeating. A failure operation 194 can be provided if the determination in step 190 is that one (or less than a majority as an option) of the nodes fails to identify the same node as granted authority. In this case, on the basis of an indication of a system error, the system can revert to a more conventional form of time shared communication or otherwise to avoid the problem of having two nodes from an erroneous grant attempt to transmit a message in the same frame 152.

Exemplary components for implementing the system include TRW 1030 units for all queue registers, signitics 8X320 units for the header registers, a Motorola VME BOS for bus 42, a Motorola I/O channel for bus 52, 7400 series registers for the control, status, source and destination registers and character buffers, a Z8030 with a M68008 controller for the digital terminal interfacing. Other components have been noted in the text where important. The optical transmitter and receiver are conventional and have a clock recovery phase locked loop as known in the art. The four fiber optic links may be combined into one coupler using wavelength division multiplexing if desired. The registers are preferably operated in a memory mapped mode as is known in the art.

The above system provides a local area networking function in which a highly efficient division of system control is achieved between three levels of processor control and further in which message density is maintained at 100%. It will occur to others that improvements and modifications can be made within the scope of the invention as defined solely in the following claims.

```
#define PUR.S 2
#define BUFMAX
#define MONITOR
/*transmission delay in characters in full duplex*/
#define TXDELAY 10
typedef struct {int start;   /*buffer control block*/
                int next;
                int len;
                int bufmax;
               } BCB;
#include        "[nangle.net.build]atlstd.h"
#include        "[nangle.net.build]atlque.h"
#include        "[nangle.net.build]atlpkt.h"

/*******************************************/
/*                                         */
/* for net,subnet,&node structure defs.    */
/* see atlque.h                            */
/*                                         */
/*******************************************/ typedef struct controller_def {char  *base;
                               int   nbits;
                               int   parity;
                               int   stopbits;
                               int   linespeed;
                              } CONTROLLER, *P_CONTROLLER;

/*******************************************/
/*                                         */
/* command table defs.                     */
/*                                         */
/*******************************************/ typedef struct svctbl {char  *lname;
                       char  *sname;
                       ifunc service;
                       char  *response;
                      } ATLSVC, *P_ATLSVC;

/*******************************************/
/*                                         */
/*    User Table Definitions               */
/*                                         */
/*******************************************/
```

```
typedef struct user { char name[MAXTOKEN];
                      char password[MAXTOKEN];
                      int privilege;
                      int priority;
                      int processid;
                    } USERS, *P_USERS;

/************************************************/
/*                                              */
/*    Device Table Definitions                  */
/*                                              */
/************************************************/ typedef struct  devices {char    name[MAXTOKEN];
                         char    processid;       /* O.S. process id */
                         int     mode;            /* 0 = sharable, 1 = dedicated */
                         int     lrecl;
                         int     blksize;
                         int     type;            /* TTY,DISK,PHONE */
                        } DEVICES;
        #define HDRSIZ              20
        #define TLRSIZ
        #define DFLT_PKTSZ         138
```

```
typedef struct  iodev_def      {struct iodev_def   *next;
                                struct iodev_def   *last;
                                ULINT              id;
                                char               *name;    /* logical name */
                                char               processid; /* O.S. process id */
                                P_SYNC             sem;      /* syncronization */
                                SINT               mode;     /* 0=sharable,1=dedicated */
                                SINT               status;   /* 0=sharable,1=locked */
                                cfunc              driver;   /* a(device driver) */
                                int                port;
                                SINT               lrecl;    /* logical record length in */
                                SINT               blksize;
                                SINT               type;     /* TTY,DISK,PHONE */
                               } IODEV_DEF, *P_IODEV;
#define DEVSIZE sizeof(IODEV_DEF)

typedef struct udevq_def       {struct udevq_def   *next;
                                struct udevq_def   *last;
                                P_IODEV            device;
                               } UDEVQ_DEF, *P_UDEVQ;
#define UDEVSIZE sizeof(UDEVQ_DEF)

typedef struct  io_rblk {struct io_rblk    *next;
                         struct io_rblk    *last;
                         ULINT             dpid;       /* destination pid */
                         ULINT             spid;       /* source pid */
                         char              processid;  /* O.S. process id */
                         char              priority;   /* f(type) */
                         char              opcode;     /* for command messages */
                         char              type;       /* net,tel,data */
                         struct q_fibwait  {struct io_rblk *next;
                                            struct io_rblk *last;
                                           } q_fiberwait;
                         char              *bufptr;    /* ptr to msg f pkt buf */
                         msgbuf;                       /* a(msg buffer) */
                         msgsize;                      /* msg length */
                         *pktbuf;                      /* a(pkt buffer) */
                         npkts;                        /* # of packets */
                         P_IODEV           device;
                         status;
                        } IO_RBLK;
#define IORBLKSIZE sizeof(IO_RBLK)
```

```
                   struct document   *next;
                   struct document   *last;
                   char              *page;
                   }DOCUMENT, *P_DOCUMENT;

typedef struct mailbox_def   {struct mailbox_def  *next;
                              struct mailbox_def  *last;
                              int                 jdate;
                              int                 time;
                              char                *sender;
                              P_DOCUMENT          missive;
                              } MAILBOX, *P_MAILBOX;

typedef struct user_def   {struct user_def   *next;
                           struct user_def   *last;
                           ULINT             id;        /* unique id */
                           char              *name;     /* logical name */
                           char              processid; /* O.S. process id */
                           ULINT             sem;       /* semaphore */
                           char              priority;
                           ULINT             filter;    /* security */
                           SINT              status;    /* 0=avail,1=busy */
                           char              type;      /* 0 = permanent, 1 = temp */
                           P_IORBLK          req;       /* i/o request block pointer */
                           P_UDEVQ           devq;      /* device queue ptr */
                           int               ear;       /* listen pid # */
                           int               portn;     /* port # */
                           P_MAILBOX         mailq;     /* mail queue */
                           int               nettime;
                           } USER_DEF, *P_USER;
#define USERSIZE sizeof(USER_DEF)

typedef struct node_def   {struct node_def   *next;
                           struct node_def   *last;
                           ULINT             id;       /*unique id */
                           char              *name;    /* logical name */
                           SINT              status;   /* up/down */
                           SINT              nuser;    /* # of active users */
                           P_USER            userq;    /* user queue ptr */
                           SINT              ndev;     /* # of active devices */
                           P_NODEV           devq;     /* node device queue ptr */
                           } NODE_DEF, *P_NODE;
#define NODESIZE sizeof(NODE_DEF)

/*****************************************************/
/*                                                   */
/* subnet queue structure defs.                      */
/*                                                   */
/*****************************************************/ typedef struct snet_def   {struct snet_def   *next;
                           struct snet_def   *last;
                           ULINT             id;       /* unique id */
                           char              *name;    /* logical name */
                           SINT              status;   /* up/down */
                           P_NODE            nodeq;    /* node queue ptr */
                           } SNET_DEF, *P_SNET;
#define SNETSIZE sizeof(SNET_DEF)

/*****************************************************/
/*                                                   */
/* net queue structure defs.                         */
/*                                                   */
/*****************************************************/ typedef struct net_def    {struct net_def    *next;
                           struct net_def    *last;
                           ULINT             id;        /* unique id */
                           char              *name;     /* logical name */
                           SINT              status;    /* up/down */
                           P_SNET            snetq;     /* snet queue ptr */
                           SINT              protocol;  /* 0=us,1=x25,2=sdlc */
                           SINT              charset;   /* 0=ascii,1=ebcdic,3=bcd */
                           SINT              wordsize;  /* in bits */
                           SINT              type;      /* 0 = pkt, 1 = msg */
                           } NET_DEF, *P_NET;
#define NETSIZE sizeof(NET_DEF)
```

```
/*******************************************/
/*                                         */
/*    ERROR return levels for use in       */
/*         subscripting SYSERR[]           */
/*         or: int SYSERR[4];              */
/*                                         */
/*******************************************/ define OSERR    0
define IOERR    1
#define UTLERR   2
#define MISCERR  3

/*******************************************/
/*                                         */
/*    O.S. return codes                    */
/*                                         */
/*******************************************/ define RET_OK        0
define ER_TID        1
#define ER_TCB        2
#define ER_MEM        3
#define ER_NMB        4
#define ER_MIU        5
#define ER_ZMW        6
#define ER_BUF        7
#define ER_WTC        8
#define ER_ISC        9
#define ER_TMO       10
#define ER_NMP       11
#define ER_QID       12
#define ER_QFL       13
#define ER_PID       14

/*******************************************/
/*                                         */
/*    O.S. Queue Usage                     */
/*                                         */
/*******************************************/ define LISTENQ      10

/*******************************************/
/*                                         */
/*    NET return codes                     */
/*                                         */
/*******************************************/ define ER_NET       15
define ER_SNET      16
#define ER_NODE      17
#define ER_DEVICE    18
#define ER_USER      19

/*******************************************/
/*                                         */
/*    Default Priorities                   */
/*    0 = highest priority                 */
/*                                         */
/*******************************************/ define PRI_ERR      -1
define PRI_LOCK      0
#define PRI_EXEC      1
#define PRI_IOC       5
#define PRI_IOP       6
#define PRI_IOS       7
#define PRI_IOR       8
#define PRI_MGR       9
#define PRI_NET      10
```

```
#define PRI_TEL          20
#define PRI_DATA         30
#define PRI_DAEMON       50

/*****************************************/
/*                                       */
/*      Misc. constants                  */
/*                                       */
/*****************************************/ define HIGHVAL      0x7FFFFFFF
define LOWVAL       -HIGHVAL
#define ERRDIM       4
#define MAXPORTS     5
#define STDBUFSZ     512
#define MAXBUFSZ     4096
#define BUFSCALE     2
#define MPGSHFT      3
#define MAXLINSZ     133
#define MAXLINE      133
#define TOKENSIZE    133
#define MAXTOKEN     16
#define LF           '\n'
#define CR           '\015'
#define EOL          '\0'
#define ISOLAYERS    7
#define NETWORK  0
#define NET      0
#define TEL      1
#define DATA     2
#define ASCII    0
#define EBCDIC   1
#define BCD      2
#define ATL      0
#define X25      1
#define SDLC     2
#define PKT      0
#define MSG      1
#define FREE     0
#define SHARABLE     0
#define DEDICATED    1
#define SHARED   0
#define LOCKED   1
#define TRUE     1
#define FALSE    0
#define AVAIL    1
#define NAVAIL   0
#define UP       1
#define DOWN     0
#define TTY      0
#define DISK     1
#define PHONE    2
```

```
/*****************************************/
/*                                       */
/*      Misc. typedefs                   */
/*                                       */
/*****************************************/ typedef unsigned char              char;
typedef char     (*cfunc)();
typedef int      (*ifunc)();

typedef unsigned int               UINT;

typedef long int                   SINT;
typedef unsigned short int         USINT;

typedef long int                   LINT;
typedef unsigned long int          ULINT;

typedef struct {LINT  key;
                LINT  lock;
                LINT  msg;
               } SYNC, *P_SYNC;
```

```
/*********************************************************************/
/*                                                                   */
/*      Phone Commands (TONE REGISTER)                               */
/*                                                                   */
/*********************************************************************/
#define DIALTONE   0x1a
#define BUSY       0x19
#define RINGBACK   0x1b
#define TONELISTEN 0x18
#define DIGITONE   0x24
/*********************************************************************/
/*                                                                   */
/*      Phone Commands (PHONE REGISTER)                              */
/*                                                                   */
/*********************************************************************/
#define DIGITIZING 0x20
#define ENAFIFO    0x2c
#define ENBFIFO    0x34
#define MRESET     0x04
#define RING       0x58
define TONEON     0x40 define FILLCHR    0x7f
/*********************************************************************/
/*                                                                   */
/*      Phone Status                                                 */
/*                                                                   */
/*********************************************************************/
#define HOOKOFF    0x01
#define HOOKON     0x02
#define INAFULL    0x08
#define INBFULL    0x04
#define TONEVALID  0x10
#define RxFIBFULL  0x20
#define TxFIBEMPTY 0x40
/*********************************************************************/
/*                                                                   */
/*      Fiber Status                                                 */
/*                                                                   */
/*********************************************************************/
#define TXFEMTY    0x01
#define RXFFUL     0x02
#define TXFIBEREN  0x01
#define RXFIBEREN  0x02
#define SYNC       0xe4
/*********************************************************************/
/*                                                                   */
/*      Network Phone Constants                                      */
/*                                                                   */
/*********************************************************************/
#define MYNODE    1
#define PHONES    2
#define FIFOLEN   64
#define FIBERLEN  128
#define HEADERLEN 11
/*********************************************************************/
/*                                                                   */
/*      Phone Message Constants                                      */
/*                                                                   */
/*********************************************************************/
#define A_FULL   1
#define B_FULL   2
#define ANSWER   3
#define HANGUP   4
#define DESTBUSY 5
#define DESTRING 6
#define NOPHONE  7
#define GOAHEAD  8
/*********************************************************************/
/*                                                                   */
/*      SENDMSG/READMSG Opcodes                                      */
/*                                                                   */
/*********************************************************************/
#define DIAL     1
#define CLEARING 2
```

```
#define PACKET   3
#define REQUID   4
#define RETUID   5
/****************************************************************/
/*                                                              */
/*      Network Phone Directory                                 */
/*                                                              */
/****************************************************************/
#define DIRSIZE    32
define DIRTOKENLEN 16 typedef struct { char   name[DIRTOKENLEN];
                 char   number[DIRTOKENLEN];
                 ULINT  phoneaddr;
                 char   busy;
                 char   ringing;
                 ULINT  connection;
               } PHONE_INFO;

typedef struct { char *bodyptr;
               } BODY;
```

```
        .even
        .text
        .gloal  _cftbl,_main,_sysinit,_swap,_MBLKSZ,_UPQMEM
start:  move.l  #_cftbl,0x38    *vector 14 is VRTX Configuration Address
        move.l  #0x00001800,0x80 *trap 0 is VRTX interface
        jmp     0x1000           *VRTX starting address
_cftbl:
        dc.l    0x00040000       * sys RAM addr
        dc.l    0x10000          * sys RAM size
        dc.w    8192             * sys stack size
_UPQMEM:
        dc.l    0x70000          * user RAM addr (Partition 0)
        dc.l    0x10000          * user RAM size (Partition 0)
_MBLKSZ:
        dc.w    32               * user block size
        dc.w    1024             * user stack size
        dc.l    _main            * user task addr
        dc.w    10               * user task count
        dc.l    _sysinit         * sys init addr
        dc.l    -1               * sys tcreate addr
        dc.l    -1               * sys tdelete addr
        dc.l    -1               * sys tswap addr
        dc.l    0                * reserved
        #include "atlncp.h"

main()

{extern ifunc atlmgr,userint;
         extern SINT   NXTPID;
         extern int    SYSERR[];
         int error;

/******************************************************/
/*                                                    */
/* Start up system queues and daemons                 */
/*      ... then go away.                             */
/*                                                    */
/******************************************************/ init();
         p_del(0,SYSERR+OSERR);
        } include "[nangle.   .build]atlstc.h"
        #include "[nangle.net.build]atlics.h"

/**************************************************************/
/*                                                            */
/*      Device Initialization Routines                        */
/*                                                            */
/**************************************************************/
```

```
char *base2661 = 0x080000;   /*memory mapped address of Signetics 2661*/
char *rbuf2661 = 0x080001,   /*receive buffer */
     *tbuf2661 = 0x080001,   /*transmit buffer */
     *stat2661 = 0x080003,   /*status register */
     *mr2661   = 0x080005,   /*mode registers */
     *cr2661   = 0x080007;   /*control register*/ char *base6850 = 0xfe8000;   /*memory mapped address of Motorola 6850*/
char *cr6850   = 0xfe8001,   /*control register*/
     *stat6850 = 0xfe8001,   /*status register */
     *rbuf6850 = 0xfe8003,   /*receive buffer */
     *tbuf6850 = 0xfe8003;   /*transmit buffer */

/* mode register 1,2 receive/transmit setup for 9600 baud, 1 stop bit, */
/* no parity, 8 bit characters */
#define MR1 0x6e
#define MR2 0x7e
#define ENABLE 0x22
/***********************************************************************/
/*                                                                     */
/*      Initialize Signetics 2661 (4 RS232C Serial Ports)              */
/*                                                                     */
/***********************************************************************/
ini2661()
        { extern cfunc int2661;
          int port,*vector;

base2661 = 0x080000;
          rbuf2661 = base2661 + 1;
          tbuf2661 = base2661 + 1;
          stat2661 = base2661 + 3;
          mr2661   = base2661 + 5;
          cr2661   = base2661 + 7;
          vector   = 0x000100;
          *vector  = &int2661;

for (port=0; port<4; ++port)
          { *(mr2661+(port<<(3))) = MR1;
            *(mr2661+(port<<(3))) = MR2;
            *(cr2661+(port<<(3))) = ENABLE; /*enable port*/
          }
        }
/***********************************************************************/
/*                                                                     */
/*      Initialize Motorola 6850 Serial Port (MONITOR Port)            */
/*                                                                     */
/***********************************************************************/
ini6850()
        { extern cfunc int6850;
          int *vector;
          base6850 = 0x00fe8000;
          cr6850   = base6850+1;
          stat6850 = base6850+1;
          rbuf6850 = base6850+3;
          tbuf6850 = base6850+3;
          vector   = 0x00000074;
          *vector  = &int6850;
          *cr6850  = 0x03;       /*master reset*/
          *cr6850  = 0x15;       /*9600 baud, 8 bits with 1 stop bit*/
        }
/***********************************************************************/
/*                                                                     */
/*      Initialize Buffer Control Blocks                               */
/*      for Receiver and Transmitter                                   */
/*                                                                     */
/***********************************************************************/
inibcb()
        { extern BCB tbcb[],rbcb[];
          int port;

for (port=0; port<PORTS; ++port)
          { rbcb[port].start=0;
            rbcb[port].next =0;
            rbcb[port].len  =0;
            rbcb[port].outmax =BUFMAX-1;
```

```
            tbcb[port].start=0;
            tbcb[port].next =0;
            tbcb[port].len  =0;
            tbcb[port].bufmax  =BUFMAX-1;
          }
       }
/**********************************************************************/
/*                                                                    */
/*       Initialize TRAP1 and TRAP2 Vector Locations                  */
/*       and System Wait Queues                                       */
/*                                                                    */
/**********************************************************************/
initrap()
       { extern cfunc trap1,trap2;
         int *vector1,*vector2,i,error;

vector1 = 0x84;
         vector2 = 0x88;
         *vector1 = &trap1;
         *vector2 = &trap2;
         for (i=0; i<(PORTS<<1); ++i)
         { inique (i,31,&error);
           /*if (error<0) queue allocation error*/
         }
       }
include "[nangle.net.build]atlnco.h"
#include "[nangle.net.build]atltel.h"
/**********************************************************************/
/*                                                                    */
/*       Phone Initialization Routines                                */
/*                                                                    */
/**********************************************************************/ iniauto()
       { extern cfunc int1,int2,int3,int4;
         int *vector;
         vector = 0x64;
         *vector = &int1;
         vector = 0x68;
         *vector = &int2;
         vector = 0x6c;
         *vector = &int3;
         vector = 0x70;
         *vector = &int4;
       }
include "[nangle.net.build]atlnco.h"
#include "[nangle.net.build]atltel.h"
/**********************************************************************/
/*                                                                    */
/*       Phone Initialization Routines                                */
/*                                                                    */
/**********************************************************************/
iniphone()
       { int i,j,error;
         extern char *outla,*outlb,*statphone,*crlphone,*digtits;
         extern BODY bodyin[],bodyout[];
         extern char bodyread[][FIFOLEN],bodywrite[][FIFOLEN];

for (i=0; i<PHONES; i++)
            { inique(255-i,63,&error);
              /*if (error<0) queue allocation error*/
            }
         for (i=0; i<PHONES; i++)
            { *(statphone+(i<<5)) = 0xff;
              *(crlphone+(i<<5)) = DIGITIZING;
              *(crlphone+(i<<5)) = DIGITIZING|mRESET;
              for (j=0; j<FIFOLEN; j++)
                 { *(outla+(i<<5)) = FILLCHR;
                   *(outlb+(i<<5)) = FILLCHR;
                 }
              bodyin[i].bodyptr = bodyread[i];
              bodyout[i].bodyptr = bodywrite[i];
            }
       }
```

```
#include "[nangle.net.build]atlncp.h"
#include "[nangle.net.build]atlios.h"
/*************************************************/
/*                                               */
/*      External global inits                    */
/*                                               */
/*************************************************/ int     SYSERR[4] = {0,0,0,0};
        int     ERROR    = 0;
        ULINT   NETID    = 0;
        ULINT   SNETID   = 0;
        ULINT   NODEID   = 0;
        ULINT   NODEMASK = 0;
        SINT    NXTNET   = 0;
        SINT    NXTSNET  = 0;
        SINT    NXTNODE  = 0;
        SINT    NXTUSER  = 0;
        SINT    NXTDEV   = 0;
        SINT    NXTDRVR  = 0;
        SINT    NXTPID   = 0;

P_NET           NETQUEUE  = NULL;
        P_SNET          SNETQUEUE = NULL;
        P_NODE          NODEQUEUE = NULL;
        P_USER          USERQUEUE = NULL;
        P_IODEV         DEVQUEUE  = NULL;
        P_IORBLK        IOR_QUEUE = NULL;
        P_IORBLK        IOS_QUEUE = NULL;
        P_IORBLK        IOC_QUEUE = NULL;
        P_IORBLK        IOP_QUEUE = NULL;

char    PRIVERMSG[1][] = "\n Insufficient privilege for attempted operation\n";
char    CMDERMSG[1][] = "\n Unknown command - type ? for help\n";
char    NOMEMSG[1][] = "\n Insufficient memory available for request\n";
char    BRKTBL[] = {' ','\t',';'};
int     BRKTBLEN = sizeof(BRKTBL);

/*************************************************/
/*                                               */
/*      Initialization Routines                  */
/*                                               */
/*************************************************/ init()
        {
        char    line[10];
        int     *usermem,echo,parity,lineptr;
        extern int      SYSERR[],UP0MEM,HIGHMEM;
        extern int      FREEMEM;
        extern unsigned short int MBLKSZ;

lineptr = 11;
        echo = 1;
        parity = 0;
        putstr(MONITOR," Memory block size = ",NULL);
        itoa(MBLKSZ,line);
        putstr(MONITOR,line,NULL);
        putstr(MONITOR,"\n",NULL);

usermem = &UP0MEM;
        FREEMEM = NULL;
        HIGHMEM = *usermem + *(usermem+1);
        putstr(MONITOR," HIGHMEM = ",NULL);
        itox(HIGHMEM,line);
        putstr(MONITOR,line,NULL);
        putstr(MONITOR,"\n",NULL);
        NETID  = 1;
        SNETID = 1;
        NODEID = 0;
        while (NODEID < 1)
                {
                putstr(MONITOR," Enter node id: ",NULL);
                getline(MONITOR,line,&lineptr,echo,parity);
                NODEID = atoi(line);
                }
```

```
            NXTNET  = 1;
            NXTSNET = 1;
            NXTNODE = 1;
            NXTUSER = 1;
            NXTDEV  = 1;
            NXTPID  = 1;
            settime(0);
            cinit(SYSERR);
            ninit(SYSERR);
            pinit(SYSERR);
            timeslice(1);
        }
        #include "atlncp.h"

P_SYNC  IORSEM = 0;
P_SYNC  IOCSEM = 0;
P_SYNC  IOPSEM = 0;

iosini(error)
        int     error[];
        {
          extern    P_SYNC          IORSEM, IOCSEM, IOPSEM;

mem_alloc(&IORSEM, sizeof(SYNC), error);
          IORSEM->lock = IORSEM->key = IORSEM->msg = 0;
          mem_alloc(&IOCSEM, sizeof(SYNC), error);
          IOCSEM->lock = IOCSEM->key = IOCSEM->msg = 0;
          mem_alloc(&IOPSEM, sizeof(SYNC), error);
          IOPSEM->lock = IOPSEM->key = IOPSEM->msg = 0;
        }
        #include "[nangle.net.build]atlncp.h"

char    NETNAME[1][MAXTOKEN]  = "NET";
char    SNETNAME[1][MAXTOKEN] = "SNET";
char    NODENAME[1][MAXTOKEN] = "NODE";

DEVICES devtbl[] =    {
                        {"TERM0",   0, DEDICATED, 1,  1, TTY},
                        {"TERM1",   0, DEDICATED, 1,  1, TTY},
                        {"TERM2",   0, DEDICATED, 1,  1, TTY},
                        {"TERM3",   0, DEDICATED, 1,  1, TTY},
                        {"TERM4",   0, DEDICATED, 1,  1, TTY},
                        {"PHONE0", 255, DEDICATED, 1, 16, PHONE},
                        {"PHONE1", 254, DEDICATED, 1, 16, PHONE}
                      };

ninit(error)
        int     error[];
        {
          register int    i;
          extern char             NETNAME[][];
          extern char             SNETNAME[][];
          extern char             NODENAME[][];
          extern P_NET            NETQUEUE;
          extern SINT             NXTSNET;
          extern SINT             NXTNODE;
          extern ULINT            NETID;
          extern ULINT            SNETID;
          extern ULINT            NODEID;
          extern ULINT            NODEMASK;
          extern SINT             NXTPID;
          extern DEVICES          devtbl[];

NODEMASK = (NETID << 24) | (SNETID << 16) | (NODEID << 8);

itoa(NETID,  &NETNAME[0][strlen(NETNAME)]);
          itoa(SNETID, &SNETNAME[0][strlen(SNETNAME)]);
          itoa(NODEID, &NODENAME[0][strlen(NODENAME)]);

addnet(NETNAME, ATL, ASCII, 2, PKT, error);
          addsnet(SNETNAME, error);
          addnode(NODENAME, SNETNAME, error);
          for (i = 0; i < sizeof(devtbl)/sizeof(struct devices); ++i)
                addev(devtbl, i, NODENAME, error);
          logphone();
        }
```

```
        #include "[nangle.net.build]atincb.h"
        #include "[nangle.net.build]atitel.h"
        #include "[nangle.net.build]atlios.h"

static  int     NXTPORT = 0;

pinit(error)
        int     error[];
        {
          extern int NXTPORT;
          extern SINT   NXTPID;
          extern int    userproc();
          extern int    listen();
          extern int    phoneproc();

/**********************************************/
/*                                            */
/* Start up system daemons                    */
/*                                            */
/**********************************************/ iosini(error);
        if (error[0] == 0)
            {
                for (NXTPORT = 0; NXTPORT < MAXPORTS - 1; ++NXTPORT)
                        p_create(&userproc,NXTPID++,PRI_LOCK,error+OSERR);
                inique(LISTENQ,64,error);
                p_create(&listen,NXTPID++,PRI_LOCK,error+OSERR);
                for (NXTPORT = 255; NXTPORT > 253; --NXTPORT)
                        p_create(&phoneproc,NXTPID++,PRI_LOCK,error+OSERR);
            }
        } userproc()
        {
        int     i;
        char    line[MAXLINSZ];
        extern int NXTPORT;

strcpy(line,"\nInitializing port ");
        i = strlen(line);
        line[i] = ' ';
        itoa(NXTPORT,line+i);
        i = strlen(line);
        strcpy(line+i," process\n",NULL);
        putstr(MONITOR,line,NULL);
        command(NXTPORT);
        } phoneproc()
        { P_USER userptr;
          extern P_USER USERQUEUE;
          extern int phone();
          extern int NXTPORT;
          int   i;
          char  line[MAXLINSZ];

strcpy(line,"\nInitializing phone ");
        i = strlen(line);
        line[i] = ' ';
        itoa(NXTPORT,line+i);
        i = strlen(line);
        strcpy(line+i," process\n",NULL);
        putstr(MONITOR,line,NULL);
        phone(NXTPORT);
        }
        #include "atlncp.h"

qinit(error)
        int     error[];
        {
        register int    i;
        extern P_NET            NETQUEUE;
        extern P_SNET           SNETQUEUE;
        extern P_NODE           NODEQUEUE;
```

```
        extern P_USER           USERQUEUE;
        extern P_IODEV          DEVQUEUE;
        extern P_IOQUEUE        IOR_QUEUE;
        extern P_IOQUEUE        IOS_QUEUE;
        extern P_IOQUEUE        IOC_QUEUE;
        extern P_IOQUEUE        IOP_QUEUE;

mem_alloc(&NETQUEUE,NETSIZE,error);
        NETQUEUE->next = NETQUEUE->last = NETQUEUE;

mem_alloc(&SNETQUEUE,SNETSIZE,error);
        SNETQUEUE->next = SNETQUEUE->last = SNETQUEUE;

mem_alloc(&NODEQUEUE,NODESIZE,error);
        NODEQUEUE->next = NODEQUEUE->last = NODEQUEUE;

mem_alloc(&USERQUEUE,USERSIZE,error);
        USERQUEUE->next = USERQUEUE->last = USERQUEUE;

mem_alloc(&DEVQUEUE,DEVSIZE,error);
        DEVQUEUE->next = DEVQUEUE->last = DEVQUEUE;

mem_alloc(&IOR_QUEUE,IOQSIZE,error);
        IOR_QUEUE->next = IOR_QUEUE->last = IOR_QUEUE;

mem_alloc(&IOS_QUEUE,IOQSIZE,error);
        IOS_QUEUE->next = IOS_QUEUE->last = IOS_QUEUE;

mem_alloc(&IOC_QUEUE,IOQSIZE,error);
        IOC_QUEUE->next = IOC_QUEUE->last = IOC_QUEUE;

mem_alloc(&IOP_QUEUE,IOQSIZE,error);
        IOP_QUEUE->next = IOP_QUEUE->last = IOP_QUEUE;
        }
char    *TIMER = 0x00FE801T;

timeinit()
        {
        register char   *cr1,*cr2,*cr3;
        char    *t1ctr,*t2ctr,*t3ctr;
        int     *vector;
        extern char *TIMER;
        extern int      ui_timer();

TIMER = 0x00FE801;
        cr1 = cr3 = TIMER;
        cr2 = cr1 + 2;
        t1ctr = cr1 + 4;
        t2ctr = t1ctr + 4;
        t3ctr = t2ctr + 4;

/* load timeout into latches    */
/* 2ms time slice test for timer 3*/
        *t3ctr = 0x01;
        *(t3ctr+2) = 0x2E;
/* set up control registers     */
        *cr3 = 0xC0;
        *cr2 = 0x01;
        *cr1 = 0x00;

vector = 0x00000078;
        *vector = &ui_timer;
        } include "[nangle.net.buildJatlncp.h"
include "[nangle.net.buildJatltel.h"
#include "[nangle.net.buildJatlios.h"

char voicemail = 'n';
char recplay = 'n';
/****************************************************************/
/*                                                              */
/*      Reentrant Phone Process                                 */
/*                                                              */
/****************************************************************/
```

```
phone(num)
  int num;
  {
    P_USER userptr;
    int timeout,message,destphone,offset;
    int net,snet,node,destid;
    ULINT reply,srcid,id;
    int error[ERRDIM];
    char phonenum[16],pinfo[4];
    char busy,type,opcode;
    char msgon;
    extern char *critone,*criphone,*bigtits;
    extern BODY bodyin[],bodyout[];
    extern PHONE_INFO directory[];
    extern P_USER USERQUEUE;
    extern P_IODEV DEVQUEUE;
    extern USERS atlusers[];
    extern char voicemail,recplay;
    PHONE_INFO *mydirptr,*dirptr;
    register char i;
    register char *outptr,*inptr;
    char chr;
    int j,k;
    UDEVQ_DEF udqptr;

udqptr.next = udqptr.last = &udqptr;
    udqptr.device = userptr = NULL;
    offset = 255 - num;
    userptr = fnduser(USERQUEUE,atlusers[offset].name);
    udqptr.device = fnddev(DEVQUEUE,atlusers[offset].name);
    p_inq(0,pinfo);
    userptr->req->processid = userptr->processid = pinfo[1];
    enqudev(userptr->devq,&udqptr);
    putstr(4,"Phone process initialized\n",NULL);
    mydirptr = directory+offset;
    msgon = 'n';
    voicemail = 'n';
    recplay = 'n';
    if (offset==0) mem_alloc(&bigtits,40000,error);
    p_pri(0,PRI_TEL,error);
    for(;;)
again:
    for(;;)
      {
        timeout = 0;
        if (recplay == 'n') *(criphone+(offset((5)) = TONEON|DIGITIZING|MRESET;
        for(i=0; i<7; i++)
          { q_wmsg(num,timeout,&message,error); /*wait for digits*/
            if (message==ANSWER)
              { id=mydirptr->connection;
                decnid(id,&net,&snet,&node,&destid);
                destphone = 255-destid;
                if (node==MYNODE)
                if (msgon=='y')
                  {
                    inptr = bigtits;
                    putstr(MONITOR,"\nAnswer Recording...",NULL);
                    *(critone+(destphone((5)) = DIGITONE;
                    *(criphone+(destphone((5)) = ENAFIFO|ENBFIFO;
                    *(critone+(offset((5)) = DIGITONE;
                    *(criphone+(offset((5)) = ENAFIFO|ENBFIFO;
                    for (j=0; j<625; j++)
                    { outptr = bodyout[destphone].bodyptr;
                      q_wmsg(num,timeout,&message,error); /*wait for PACKE
                      if (message == HANGUP)
                        {putstr(MONITOR,"\nHANGUP",NULL);
                         goto again;
                        }
                      for (i=0; i<FIFOLEN; i++)
                        {
                          *(outptr++)= *(inptr++); /*local transfer*/
                        }
                    }
                  }
                uiqmsg(destid,ANSWER,error);
```

```
                    goto localcall;
               }
             else { /sendmsg(userptr,&message,TEL,ANSWER,destid);/
                    goto remotecall;
                  }
          }
      if (message == '\*')
          {putstr(4,"\nCalling Ma Bell...",NULL);
             if (offset==0)      {destphone = 1;
                                   uiqmsg(254,message,error);
                                  }
                            else {destphone = 0;
                                   uiqmsg(255,message,error);
                                  }
             goto localcall;
           }
      if (message == '\#')
          {
            if (voicemail == 'n')
                 {putstr(4,"\nNo mail",NULL);
                   goto again;
                  }
            inptr = bigtits;
            putstr(MONITOR,"\nPlayback Voice Message...",NULL);
            recplay = 'y';
            *(cr1tone+(0))  = DIGITONE;
            *(cr1tone+(32)) = DIGITONE;
            *(cr1phone+(0))  = ENAFIFO|ENBFIFO;
            *(cr1phone+(32)) = ENAFIFO|ENBFIFO;
            for (j=0; j<625; j++)
             { outptr = bodyout[offset].bodyptr;
               q_wmsg(num,timeout,&message,error); /*wait for PACKET*/
               if (message == HANGUP)
                 {recplay = 'n';
                   putstr(MONITOR,"\nHANGUP",NULL);
                   goto again;
                  }
               for (i=0; i<FIFOLEN; i++)
                 {
                   *(outptr++)= *(inptr++); /*local transfer*/
                  }
              }
              recplay = 'n';
              goto again;
           }
         if (message < '\#') goto again;
         phonenum[i] = message;
      }
   phonenum[i] = '\0';
   putstr(MONITOR,"\nNumber dialed is ",NULL);
   putstr(MONITOR,phonenum,NULL);
   destphone = -1;
   for (i=0; (i<DIRSIZE)&&directory[i].name!='\0'; i++)
       if (strcmp(phonenum,directory[i].number) == 0)
           { destphone = i;
             dirptr=directory+i;
             putstr(MONITOR,"\nCalling ",NULL);
             putstr(MONITOR,dirptr->name,NULL);
             break;
           }
   if (destphone == -1)
      { putstr(MONITOR,"\nnon-local phone number: ",NULL);
        putstr(MONITOR,phonenum,NULL);
        destid = mydirptr->phoneaddr;
        sendmsg(userptr,phonenum,TEL,DIAL,destid);
        readmsg(userptr,&reply,&type,&opcode,&srcid);
        if (opcode==NOPHONE)
            { putstr(MONITOR,"\nNon-existant number. Try Ma Bell.",NULL);
              break;
            }
        if (opcode==DESTRING)
            mydirptr->connection = reply;
      }
   if (destphone==-1)
       { if (opcode==DESTBUSY)
```

```
                    busy=1;
             else busy=0;
          }
      else busy=dirptr->busy;
      if (busy == 1)
          { *(critone+(offset((5)) = BUSY;
            break;
          }
      *(critone+(offset((5)) =  RINGBACK;
      if (destphone > -1)
         { dirptr->ringing = 1;
           dirptr->connection=mydirptr->phoneaddr;
           mydirptr->connection = dirptr->phoneaddr;
           *(critone+(destphone((5))=RING;
         }
/*test section*/
 if (destphone==2)
   {
      mydirptr->connection = directory[destphone].phoneaddr;
      recplay = 'y';
      *(critone+(0)) = DIGITONE;
      *(critone+(32)) = DIGITONE;
      *(cr1phone+(0)) = ENAFIFO|ENBFIFO;
      *(cr1phone+(32)) = ENAFIFO|ENBFIFO;
      for(;;)
        {
         outptr = bodyout[offset].bodyptr;
         for (i=0; i<FIFOLEN; i++)
         *(outptr++) = FILLCHR;
    outptr = bigtits;
    putstr(4,"\nHit 'C' to erase message and exit...",NULL);
    putstr(4,"\n    ...or RETURN to record or save message",NULL);
    sc_get(4,&chr,1);
    if((chr&0x7f) == 'C')
        { msgon = 'n';
          voicemail = 'n';
          recplay = 'n';
          putstr(4,"\nmessage erased",NULL);
          goto again;
        }
    putstr(4,"\nHit RETURN to record...",NULL);
    putstr(4,"\n    ...or 'R' to save last recording as answer message",NULL);
    putstr(4,"\n    ...or 'M' to save last recording as voice mail",NULL);
    sc_get(4,&chr,1);
    if((chr&0X7f) == 'R') { msgon = 'y';
                            voicemail = 'n';
                            recplay = 'n';
                            goto again;
                          }
    if((chr&0X7f) == 'M') { voicemail = 'y';
                            msgon = 'n';
                            recplay = 'n';
                            goto again;
                          }
    putstr(4,"\nRECORDING...\n",NULL);
    for (j=0; j<625; j++)
       { inptr = bodyin[offset].bodyptr;
         q_wmsg(num,timeout,&message,error);  /*wait for PACKET*/
         /*packet processing here*/
         if (message == HANGUP)
            {recplay = 'n';
             putstr(MONITOR,"\nHANGUP",NULL);
             goto again;
            }
         for (i=0; i<FIFOLEN; i++)
           {
            *(outptr++)= *(inptr++); /*local transfer*/
           }
        }
    putstr(4,"\nHit RETURN for playback",NULL);
    sc_get(4,&chr,1);
    inptr = bigtits;
    for (j=0; j<625; j++)
       { outptr = bodyout[offset].bodyptr;
         q_wmsg(num,timeout,&message,error); /*wait for PACKET*/
```

```
                    if (message == HANGUP)
                       {recplay = 'n';
                        putstr(MONITOR,"\nHANGUP",NULL);
                        goto again;
                       }
                    for (i=0; i<FIFOLEN; i++)
                       {
                        *(outptr++)= *(inptr++); /*local transfer*/
                       }
                 }
             }
          }
    /*end of test section*/ if (destphone==-1)
            { id = mydirptr->connection;
              q_wmsg(num,timeout,&message,error); /*wait for ANSWER*/
              if (message == HANGUP)
                {sendmsg(userptr,&message,TEL,HANGUP,id);
                 putstr(MONITOR,"\nHANGUP",NULL);
                 break;
                }
remotecall:     /putstr(MONITOR,"\nRemote call",NULL);/
                *(cr1tone+(offset((5)) = DIGITONE;
                *(cr1phone+(offset((5)) = ENAFIFO|ENBFIFO;
                for(;;)
                  {
                    q_wmsg(num,timeout,&message,error); /*wait for PACKET*/
                    /*packet processing here*/
                    if (message == HANGUP)
                       {sendmsg(userptr,&message,TEL,HANGUP,id);
                        putstr(MONITOR,"\nHANGUP",NULL);
                        break;
                       }
                    inptr = bodyin[offset].bodyptr;
                    sendmsg(userptr,inptr,TEL,PACKET,id);
                    outptr= bodyout[offset].bodyptr;
                    readmsg(userptr,outptr,&type,&opcode,&srcid);
                  }
            }
        else { q_wmsg(num,timeout,&message,error); /*wait for ANSWER*/
               if (message == HANGUP)
                  {*(cr1phone+(destphone((5)) = TONEON|DIGITIZING|MRESET;
                   *(cr1tone+(destphone((5)) = TONELISTEN;
                   dirptr->ringing=0;
                   putstr(MONITOR,"\nHANGUP",NULL);
                   break;
                  }
localcall:     /putstr(MONITOR,"\nLocal call",NULL);/
                *(cr1tone+(offset((5)) = DIGITONE;
                *(cr1phone+(offset((5)) = ENAFIFO|ENBFIFO;
                for(;;)
                  {
                    q_wmsg(num,timeout,&message,error); /*wait for PACKET*/
                    /*packet processing here*/
                    if (message == HANGUP)
                       {*(cr1phone+(destphone((5)) = TONEON|DIGITIZING|MRESET;
                        *(cr1phone+(offset((5)) = TONEON|DIGITIZING|MRESET;
                        *(cr1tone+(destphone((5)) = TONELISTEN;
                        putstr(MONITOR,"\nHANGUP",NULL);
                        break;
                       }
                    inptr = bodyin[offset].bodyptr;
                    outptr= bodyout[destphone].bodyptr;
                    for (i=0; i<FIFOLEN; i++)
                       {
                        *(outptr++) = *(inptr++);/*local transfer*/
                       }
                  }
             }
         }
      }
sendmsg(devptr,message,type,opcode,destid)
```

```
    P_IODEV devptr;
    char *message,type,opcode;
    ULINT destid;
    {
    outstr(MONITOR,"\nsendmsg",NULL);
    }
    readmsg(devptr,message,type,opcode,srcid)
    P_IODEV devptr;
    char *message,*type,*opcode;
    ULINT *srcid;
    {
    outstr(MONITOR,"\nreadmsg",NULL);
    }
        #include "atlncp.h"
        #include "atlios.h"

P_IODEV addev(devtbl,index,node,error)
        DEVICES  devtbl[];
        char    *node;
        int      index,error[];

{
      extern SINT    NXTDEV;
      extern P_NODE  NODEQUEUE,fndnode();
      extern P_IODEV DEVQUEUE;
      P_NODE nodeptr;
      register P_IODEV ptr;
      P_IODEV          tptr;

if ((nodeptr = fndnode(NODEQUEUE,node)) == NULL)  /* for known node */
          {error[UTLERR] = ER_NODE;
           return(NULL);
          }
      mem_alloc(&tptr,DEVSIZE,error);    /* allocate memory */
      if ((error[UTLERR] = error[OSERR]) != RET_OK)
            {
             errprint(MONITOR,error[UTLERR]);
             return(NULL);
            }
      ptr = tptr;
      ptr->next = ptr->last = ptr;        /* initialize */
      mem_alloc(&ptr->sem,sizeof(SYNC),error);
      if ((error[UTLERR] = error[OSERR]) != RET_OK)
            {
             errprint(MONITOR,error[UTLERR]);
             mem_free(&tptr,DEVSIZE,error);
             return(NULL);
            }
      ptr->sem->key = ptr->sem->lock = ptr->sem->msg = 0;
      ptr->name = devtbl[index].name;
      ptr->id = NXTDEV;
      ptr->processid = devtbl[index].processid;
      ptr->mode = devtbl[index].mode;
      ptr->status = SHARABLE;
      ptr->lrecl = devtbl[index].lrecl;
      ptr->blksize = devtbl[index].blksize;
      ptr->type = devtbl[index].type;
      nodeptr->ndev = NXTDEV++;
      enqdev(DEVQUEUE,ptr);                      /* put on active queue */
      p_smsg(&ptr->sem->key,TRUE,error+OSERR);
      return(ptr);
    }
        #include "atlncp.h"
        #include "atlios.h"

P_NET addnet(name,protocol,charset,wsize,type,error)
        char    *name;
        SINT    protocol,charset,wsize,type;
        int     error[];

{
      register P_NET ptr;
      P_NET          tptr;
      extern int NXTNET;
      extern P_NET NETQUEUE;
      extern P_SNET SNETQUEUE;
```

```
            mem_alloc(&tptr,NETSIZE,error);
            if ((error[UTLERR] = error[OSERR]) != RET_OK)
                    {
                      errprint(MONITOR,error[UTLERR]);
                      return(NULL);
                    }
            ptr = tptr;
            ptr->next = ptr->last = ptr;
            ptr->id = NXTNET++;
            ptr->name = name;
            ptr->status = UP;
            if (NETQUEUE->next == NETQUEUE)
                then ptr->snetq = SNETQUEUE;
                else {
                        mem_alloc(&ptr->snetq,SNETSIZE,error);
                        if ((error[UTLERR] = error[OSERR]) != RET_OK)
                              {
                                errprint(MONITOR,error[UTLERR]);
                                mem_free(&tptr,NETSIZE,error);
                                return(NULL);
                              }
                     }
            ptr->snetq->next = ptr->snetq->last = ptr->snetq;
            ptr->protocol = protocol;
            ptr->charset = charset;
            ptr->wordsize = wsize;
            ptr->type = type;
            enqnet(NETQUEUE,ptr);
            return(ptr);
        }
            #include "atlncp.h"
            #include "atlios.h"

P_NODE addnode(node,subnet,error)
        char    *node,*subnet;
        int     error[];

{
          register P_NODE   ptr;
          P_NODE            tptr;
          P_SNET            snetid;
          extern ULINT      NODEID;
          extern SINT       NXTNODE;
          extern P_SNET     SNETQUEUE, fndsnet();
          extern P_NODE     NODEQUEUE;
          extern P_USER     USERQUEUE;
          extern P_IODEV    DEVQUEUE;

if ((snetid=fndsnet(SNETQUEUE,subnet))==NULL) /* does subnet exist? */
             {error[UTLERR] = ER_SNET;
              return(NULL);
             }
          mem_alloc(&tptr,NODESIZE,error); /* yes - allocate a new node */
          if ((error[UTLERR] = error[OSERR]) != RET_OK)
                  {
                    errprint(MONITOR,error[UTLERR]);
                    return(NULL);
                  }
          ptr = tptr;
          ptr->next = ptr->last = ptr;
          ptr->name = node;
          ptr->status = UP;

if (NODEQUEUE->next == NODEQUEUE)
              then {
                     ptr->devq = DEVQUEUE;
                     ptr->userq = USERQUEUE;
                   }
              else {
                     mem_alloc(&ptr->devq,DEVSIZE,error); /* alloc a device queue *
                     if ((error[UTLERR] = error[OSERR]) != RET_OK)
                         then {
                                errprint(MONITOR,error[UTLERR]);
                                mem_free(&tptr,NODESIZE,error);
                                return(NULL);
```

```
                }
        else mem_alloc(&ptr->devq->sem,sizeof(SYNC),error);
            if ((error[UTLERR] = error[OSERR]) != RET_OK)
                {
                    errprint(MONITOR,error[UTLERR]);
                    mem_free(&ptr->devq,DEVSIZE,error);
                    mem_free(&tptr,NODESIZE,error);
                    return(NULL);
                }
      mem_alloc(&ptr->userq,USERSIZE,error);   /* alloc a user queue */
      if ((error[UTLERR] = error[OSERR]) != RET_OK)
            {
                errprint(MONITOR,error[UTLERR]);
                mem_free(&ptr->devq->sem,sizeof(SYNC),error);
                mem_free(&ptr->devq,DEVSIZE,error);
                mem_free(&tptr,NODESIZE,error);
                return(NULL);
            }
            ptr->devq->next = ptr->devq->last = ptr->devq;
            ptr->userq->next = ptr->userq->last = ptr->userq;
            ptr->ndev = 0;
            ptr->nuser = 0;

ptr->id = NODEID;
            NXTNODE++;
            enqnode(NODEQUEUE,ptr);
            return(ptr);
        }
        #include "atlncp.h"
        #include "atlios.h"

P_SNET addsnet(name,error)
        char    *name;
        int     error[];

{register P_SNET ptr;
         P_SNET         tptr;
         extern int NXTSNET;
         extern P_SNET SNETQUEUE;
         extern P_NODE NODEQUEUE;

mem_alloc(&tptr,SNETSIZE,error);         /* alloc sub net */
         if ((error[UTLERR] = error[OSERR]) = RET_OK)
                {
                    errprint(MONITOR,error[UTLERR]);
                    return(NULL);
                }
        ptr = tptr;
        ptr->next = ptr->last = ptr;
        ptr->name = name;
        ptr->status = UP;
        if(SNETQUEUE->next == SNETQUEUE)
            then ptr->nodeq = NODEQUEUE;
            else {
                mem_alloc(&ptr->nodeq,NODESIZE,error); /* alloc node queue */
                if ((error[UTLERR] = error[OSERR]) != RET_OK)
                    {
                        errprint(MONITOR,error[UTLERR]);
                        mem_free(&tptr,SNETSIZE,error);
                        return(NULL);
                    }
                }
        ptr->nodeq->next = ptr->nodeq->last = ptr->nodeq;
        ptr->id = NXTSNET++;
        enqsnet(SNETQUEUE,ptr);
        return(ptr);
        }
        #include "[nangle.net.build]atlncp.h"
        #include "[nangle.net.build]atlios.h"

P_USER adduser(usertable,userid,node,port,error)
        char    *node;
        register USERS  usertable[];
        register int    userid;
        int     port,error[];
```

```
{register P_USER ptr;
 P_USER        tptr;
 P_NODE qptr;
 unsigned char pinfo[4];
 extern ifunc  userint;
 extern SINT   NXTUSER;
 extern SINT   NXTPID;
 extern P_NET  NETQUEUE;
 extern P_SNET SNETQUEUE;
 extern P_NODE NODEQUEUE, fnqnode();
 extern P_USER USERQUEUE;

if ((qptr = fnqnode(NODEQUEUE.node)) == NULL)  /* for known node */
    {
     error[UTLERR] = ER_NODE;
     return(NULL);
    }
 mem_alloc(&tptr,USERSIZE,error);        /* alloc user def memory */
 if ((error[UTLERR] = error[OSERR]) != RET_OK)
     {
       error[OSERR] = RET_OK;
       return(NULL);
     }
 ptr = tptr;
 ptr->next = ptr->last = ptr;
 ptr->name = usertable[userid].name;
 p_inq(0,pinfo);
 ptr->processid = pinfo[1];
 encnio(&ptr->io,NETQUEUE->next->id,SNETQUEUE->next->id,
         qptr->id,port);
 NXTUSER += 1;
 ptr->sem = 0;
 ptr->filter = usertable[userid].privilege;
 ptr->type = '\0';
 ptr->req = NULL;
 cr_ioblk(ptr,error); /* set up IO_RBLK */
 if (error[UTLERR] != RET_OK)
    {
      mem_free(&tptr,USERSIZE,error);
      del_ioblk(ptr,error);
      return(NULL);
    }
 ptr->status = AVAIL;
 mem_alloc(&ptr->devq,UDEVSIZE,error);
 if ((error[UTLERR] = error[OSERR]) != RET_OK)
       {
         error[OSERR] = RET_OK;
         del_ioblk(ptr,error);
         mem_free(&tptr,USERSIZE,error);
         return(NULL);
       }
 ptr->devq->next = ptr->devq->last = ptr->devq;
 ptr->priority = usertable[userid].priority;
 ptr->ear = NULL;
 ptr->portn = port;
 mem_alloc(&ptr->mailq,sizeof(struct mailbox_def),error);
 if ((error[UTLERR] = error[OSERR]) != RET_OK)
    {
      error[OSERR] = RET_OK;
      mem_free(&ptr->devq,UDEVSIZE,error);
      del_ioblk(ptr,error);
      mem_free(&tptr,USERSIZE,error);
      return(NULL);
    }
 ptr->mailq->next = ptr->mailq->last = ptr->mailq;
 encuser(USERQUEUE,ptr);                 /* and activate */
 qptr->nuser++;
 return(ptr);
} include "[nangle.net.build]atlnco.h"
   #include "[nangle.net.build]atlics.h"
static ATLSVC   mgrcmd[] =   {{"add net",   "anet", &addnet, NULL},
```

```
                    {"remove net",   "rnet",  &remnet,  NULL},
                    {"add snet",     "asnet", &addsnet, NULL},
                    {"remove snet",  "rsnet", &remsnet, NULL},
                    {"add node",     "anode", &addnode, NULL},
                    {"remove node",  "rnode", &remnode, NULL},
                    {"add user",     "auser", &adduser, NULL},
                    {"remove user",  "ruser", &remuser, NULL},
                    {"add device",   "adev",  &addev,   NULL},
                    {"remove user",  "rdev",  &remdev,  NULL},
                };

atlmgr()
        {register int i;
         register int MAXCMD;
         int    lineptr,lmax,ltoken,echo,parity;
         char   line[MAXLINSZ],token[MAXTOKEN];
         extern int SYSERR;
         extern ATLSVC  mgrcmd[];

echo = 1;
         parity = 0;
         MAXCMD =   (sizeof(mgrcmd)/sizeof(struct svctbl));
         for (;;)
             {
              lmax = getline(MONITOR,line,&lineptr,echo,parity);
              ltoken = lex(token,line,&lineptr);
              for (i = 0; i < MAXCMD; ++i)
                  if (strcmp(token,mgrcmd[i].sname) ||
                      strcmp(token,mgrcmd[i].lname))
                      {
                          (*mgrcmd[i].service)();
                          break;
                      }
              if (i ) = MAXCMD)
                  {
                   putstr(MONITOR,"\nUnrecognized command - ",NULL);
                   putstr(MONITOR,token,NULL);
                   putstr(MONITOR,"\n",NULL);
                  }
             }
        }
include "[nangle.net.build]atlncp.h"
include "[nangle.net.build]atltel.h"
#include "[nangle.net.build]atlios.h"

listen()
        {
         P_USER userptr;
         P_IORBLK ioptr;
         int timeout,error[ERRDIM];
         extern P_USER USERQUEUE;

putstr(4,"\nListen process initialized\n",NULL);
         mem_alloc(&userptr,USERSIZE,error);
         if (error[OSERR] != RET_OK)
             {
              errprint(MONITOR,error[OSERR]);
              return;
             }
         p_pri(0,PRI_DATA,error);

for(;;)
             {
              timeout = 0;
              q_wmsg(LISTENQ,timeout,&ioptr,error);
              if (ioptr->opcode == REQUID)
                  {
                   userptr->id = fnduser(USERQUEUE,ioptr->pktbuf1);
                   userptr->req = ioptr;
                   sendmsg(userptr,ioptr->pktbuf1,DATA,RETUID,
                          ioptr->opid);
                  }
             }
        }
```

```
#include "[nangle.net.build]atincp.h"

msetdate(name)
     char name[];
     {
     P_USER userptr;
     int echo, parity;
     char line[MAXLINSZ];
     extern int TODAY;
     extern P_USER USERQUEUE, fnduser();
     extern char PRIVERMSG[][];

if ((userptr = fnduser(USERQUEUE, name)) == NULL)
          return;
     if ((userptr-)filter & 1) == 0)
          then {
               putstr(userptr-)portn, PRIVERMSG, NULL);
               return;
               }
     echo = 1;
     parity = 0;
     TODAY = getdate(userptr-)portn, line, echo, parity);
     }
     #include "[nangle.net.build]atincp.h"

msettime(name)
     register char name[];
     {
     P_USER userptr;
     char   line[MAXLINSZ];
     int    i, nticks, lineptr, echo, parity;
     extern P_USER USERQUEUE, fnduser();
     extern char PRIVERMSG[][];

echo = 1;
     parity = 0;
     if ((userptr = fnduser(USERQUEUE, name)) == NULL)
          return;
     if ((userptr-)filter & 1) == 0)
          then {
               putstr(userptr-)portn, PRIVERMSG, NULL);
               return;
               }
     putstr(userptr-)portn, "\n HOUR ? ", NULL);
     getline(userptr-)portn, line, &lineptr, echo, parity);
     i = atoi(line);
     nticks = i * 3600;
     putstr(userptr-)portn, "\n MINUTE ? ", NULL);
     getline(userptr-)portn, line, &lineptr, echo, parity);
     i = atoi(line);
     nticks = nticks + (i * 60);
     putstr(userptr-)portn, "\n SECOND ? ", NULL);
     getline(userptr-)portn, line, &lineptr, echo, parity);
     i = atoi(line);
     nticks = (nticks + i) * 500;
     settime(nticks);
     }
include "atincp.h"
#include "atlios.h"

remdev(name, error)
     char    *name;
     int     error[];

{
     extern P_IODEV DEVQUEUE, fnddev();
     register P_IODEV ptr;
     P_IODEV           tptr;

if (*name == "*")
          then
               {
               for (ptr = DEVQUEUE-)next; ptr != DEVQUEUE; ptr = ptr-)next)
                    remdev(ptr-)name, error);
```

```
                }
        else
            {
            if ((tptr = fnddev(DEVQUEUE,name)) == NULL)
                    then {
                            errprint(MONITOR,ER_DEVICE);
                            return;
                        }
                    else {
                            deqdev(tptr);
                            mem_free(&tptr->sem,sizeof(SYNC),error);
                            mem_free(&tptr,DEVSIZE,error);
                        }
            }
    } include "atlnco.h"
        #include "atlios.h"

remnode(name,error)
        char    *name;
        int     error[];

{register P_NODE ptr;
         P_NODE          tptr;
         register P_IODEV devptr;
         extern P_NODE   NODEQUEUE, fnanode();
         extern SINT     NXTNODE;

if (*name == "*")
            then
                {
                for (ptr = NODEQUEUE->next; ptr != NODEQUEUE; ptr = ptr->next)
                        remnode(ptr->name,error);
                }
            else
                {
                if ((tptr = fnanode(NODEQUEUE,name)) == NULL)
                        then {
                                errprint(MONITOR,ER_NODE);
                                return;
                            }
                        else {
                                deqnode(tptr);
                                NXTNODE--;
                                remuser("*",error);
                                remdev("*",error);
                                mem_free(&tptr,NODESIZE,error);
                            }
                }
        } include "atlnco.h"
        #include "atlios.h"

remsnet(name,error)
        char    *name;
        int     error[];

{register P_SNET ptr;
         P_SNET          tptr;
         extern SINT     NXTSNET;
         extern P_SNET   SNETQUEUE, fnasnet();

if (*name == "*")
            then
                {
                for (ptr = SNETQUEUE->next; ptr != SNETQUEUE; ptr = ptr->next)
                        remsnet(ptr->name,error);
                }
            else
                {
                if ((ptr = tptr = fnasnet(SNETQUEUE,name)) == NULL)
                        then {
                                errprint(MONITOR,ER_SNET);
                                return;
```

```
                                  }
                         else {
                                  deqsnet(ptr);
                                  NXTSNET--;
                                  remnode("*",ptr);
                                  mem_free(&tptr,SNETSIZE,error);
                         }
                 }
        } include "atlncp.h"
        #include "atlios.h"

remnet(name,error)
        char    *name;
        int     error[];

{register  P_NET  ptr;
         P_NET             tptr;
         extern int NXTNET;
         extern P_NET NETQUEUE, fndnet();

if (*name == "*")
            then
                 {
                   for (ptr = NETQUEUE->next; ptr != NETQUEUE; ptr = ptr->next)
                        remnet(ptr->name,error);
                 }
            else
                 {
                   if ((tptr = fndnet(NETQUEUE,name)) == NULL)
                         then {
                                  errprint(MONITOR,ER_NET);
                                  return;
                              }
                         else {
                                  deqnet(tptr);
                                  NXTNET--;
                                  remsnet("*");
                                  mem_free(&tptr->snetq,SNETSIZE,error);
                                  mem_free(&tptr,NETSIZE,error);
                              }
                 }
        }
        #include "[nangle.net.build]atlncp.h"
        #include "[nangle.net.build]atlios.h"

remuser(name,error)
        char    *name;
        int     error[];

{register P_USER ptr;
         P_USER            tptr;
         P_IODEV devptr;
         P_MAILBOX mailptr;
         extern P_NODE   NODEQUEUE;
         extern P_USER   USERQUEUE, fnduser();
         extern SINT     NXTUSER, NXTPID;

if (strcmp(name,"*") == 0)
            then
                 {
                   for (ptr = USERQUEUE->next; ptr != USERQUEUE; ptr = ptr->next)
                        remuser(ptr->name,error);
                 }
            else
                 {
                   if ((ptr = tptr = fnduser(USERQUEUE,name)) == NULL)
                         then {
                                  errprint(MONITOR,ER_USER);
                                  return;
                              }
                         else {
                                  dequser(ptr);
                                  NXTUSER--;
```

```
                    if(ptr->ear != NULL)
                        {
                          NXTPID--;
                          p_del(ptr->ear,error+OSERR);
                        }
                    NODEQUEUE->next->nuser--;
                    for (mailptr = ptr->mailq->last;
                            mailptr != ptr->mailq;
                            mailptr = mailptr->last)
                        {
                          delmail(ptr,mailptr);
                        }
                    mem_free(&ptr->mailq,
                            sizeof(struct mailbox_def),error);

for (devptr = ptr->devq->last;
                            devptr != ptr->devq;
                            devptr = devptr->last)
                        {
                          mem_free(&devptr,UDEVSIZE,error);
                        }
                    mem_free(&ptr->devq,UDEVSIZE,error);
                    del_ioblk(ptr,error);
                    mem_free(&tptr,USERSIZE,error);
                 }
            }
      } include "[nangle.net.build]atlncp.h"

setslice(user)
      register P_USER user;
      {
        char    line[];
        int     echo,port,lineptr;

echo = 1;
        parity = 0;
        if (user->privilege < 1)
            then {
                    putstr(user->port,
                            " Insufficient privilege for attempted operation\n",
                            NULL);
                    return;
                 }
        putstr(user->port,"Input interval ",NULL);
        getline(user->port,line,&lineptr,echo,parity);
        timeslice(atoi(line));
      } include "[nangle.  t.build]atlncp.h"

delmail(user,qptr)
      P_USER    user;
      P_MAILBOX qptr;
      {
        int error[ERRDIM];
        P_MAILBOX      readptr;
        P_DOCUMENT     mail;

if (qptr == user->mailq)
            return(qptr);
        readptr = qptr->last;
        deqmail(qptr);
        for (mail = qptr->missive->last; mail != qptr->missive;
                    mail = mail->last)
            {
              mem_free(&mail->page,MAXLINSZ<<MPGSHFT,error);
              mem_free(&mail,sizeof(struct document),error);
            }
        mem_free(&qptr->missive,sizeof(struct document),error);
        mem_free(&qptr->sender,MAXLINSZ,error);
        mem_free(&qptr,sizeof(struct mailbox_def),error);
        return(readptr);
      }
```

```c
#include "[nangle.net.build]atlncp.h"
#include "[nangle.net.build]atlios.h"

/*****************************************************************/
/*                                                               */
/*        3m Greeting                                            */
/*                                                               */
/*****************************************************************/ char    dtline[MAXLINSZ] = " ";
char    *dline =    "                                                        *\n";
char    *astline =  "        * * * * * * * * * * * * * * * * * * * * *\n";
char    *welcome =  "        *           WELCOME TO 3M/AETNA             *\n";
char    *fibline =  "        *    FIBER OPTIC LOCAL AREA NETWORK          *\n";
char    *merlin =   "        *              MERLIN SPEAKS                 *\n";

/*****************************************************************/
/*                                                               */
/*        User and Password Table                                */
/*                                                               */
/*****************************************************************/
USERS atlusers[] =      {
                        {"PHONE0",       "",             0,0,0},
                        {"PHONE1",       "",             0,0,0},
                        {"ELION",        "BIGCHEESE",    0,1,0},
                        {"WOO",          "CHEDDAR",      1,0,0},
                        {"NANGLE",       "BRIE",         1,0,0},
                        {"BARR",         "COTTAGE",      1,0,0},
                        {"FLANAGAN",     "PARMESAN",     0,1,0},
                        {"BREEN",        "BOURSIN",      0,1,0},
                        {"JAN",          "SWISS",        0,1,0},
                        {"TOURNAS",      "CHEESEWHIZ",   0,1,0},
                        {"NICHOLSON",    "RICOTTA",      0,1,0},
                        {"MANAGER",      "RIPE",         1,0,0},
                        {"WESTGARD",     "RW",           0,1,0},
                        {"MCRAE",        "DM",           0,1,0},
                        {"DAVIS",        "DD",           0,1,0},
                        {"SISLER",       "LS",           0,1,0},
                        {"EDWIN",        "AE",           1,0,0},
                        {"DEGENARO",     "BD",           0,1,0},
                        {"GIORDONO",     "JG",           0,1,0},
                        {"LAUERMAN",     "RL",           0,1,0},
                        {"HUBER",        "AH",           0,1,0},
                        {"PINT",         "GP",           0,1,0},
                        {"CRISTAN",      "LC",           0,1,0},
                        {"ROTHLAUF",     "AR",           0,1,0},
                        {"WARD",         "JW",           0,1,0},
                        {"MCARTHUR",     "SM",           0,1,0},
                        {"SCHELL",       "TS",           0,1,0},
                        {"BARKER",       "BB",           0,1,0},
                        {"HOLMAN",       "KH",           0,1,0},
                        {'\0','\0',0,'0','0'}
                        };
#define MAXUSERS sizeof(atlusers) / sizeof(struct user) + 32
define MAXPHONES 2 logphone()
        {int i,error[ERRDIM];
         extern P_NODE NODEQUEUE;
         extern USERS  atlusers[];

for (i = 0; i < MAXPHONES; ++i)
                adduser(atlusers,i,NODEQUEUE->next->name,255 - i,error);
P_USER login(port,line,token,name,lineptr,ltoken,echo,parity,error)
        int     port,*lineptr,*ltoken,*echo,*parity,error[];
        char    line[],token[],name[];
        {
        int     i,userid,lmax;
        P_USER  userptr;
        P_IODEV devptr;
        extern P_NODE   NODEQUEUE;
        extern P_USER   USERQUEUE,adduser();
        extern P_IODEV  DEVQUEUE,fnddev();
        extern USERS    atlusers[];
        extern DEVICES  devtbl[];
        extern int      TODAY;
```

```
        *ltoken = 0;
        userid = -1;
        while(userid < 0)
             {
                 userptr = devptr = NULL;
                 userid = -1;
                 putstr(port,"\n Username: ",NULL);
                 lmax = getline(port,line,lineptr,*echo,*parity);
                 *ltoken = lex(token,line,lineptr);
                 for (i=0; (i < MAXUSERS) && (*atlusers[i].name != '\0'); ++i)
                    {
                        if (strcmp(&atlusers[i].name,token) == 0)
                           {
                               strcpy(name,token);
                               putstr(port," Password: ",NULL);
                               /*disable echo of password*/
                               *echo = 0;
                               lmax=getline(port,line,lineptr,*echo,
                                           *parity);
                               *ltoken=lex(token,line,lineptr);
                               *echo = 1;
                               if (strcmp(&atlusers[i].password,token) != 0)
                                    then {
                                            putstr(port," Invalid Password\n",
                                                     NULL);
                                            userid = -2;
                                         }
                                    else {
                                            userid = i;
                                            if ((userptr=adduser(atlusers,userid,
                                                     NODEQUEUE->next->name,
                                                     port,error)) == NULL)
                                               {
                                                   errprint(port,error[UTLERR]);
                                                   error[UTLERR] = error[OSERR] =
                                                              RET_OK;
                                                   return(NULL);
                                               }
                                            if ((devptr = fnddev(DEVQUEUE,
                                                     devtbl[port].name)) == NULL)
                                               {
                                                   errprint(port,ER_DEVICE);
                                                   error[UTLERR] = error[OSERR] =
                                                              RET_OK;
                                                   return(NULL);
                                               }
                                            dev_alloc(userptr,devptr,error);

if (error[OSERR] != RET_OK)
                                                {
                                                   errprint(port,error[OSERR]);
                                                   error[OSERR] = RET_OK;
                                                   return(NULL);
                                                }
                                         }
                                 break;
                           }
                    }
                 if (userid == -1)
                       putstr(port," Invalid Username\n",NULL);
             }
        if (strcmp(name,"MANAGER") == 0)
             then {
                     msetdate(atlusers[i].name);
                     msettime(atlusers[i].name);
                  }
        userptr->nettime = gettime();
        helloatl(port);
        return(userptr);
    } helloatl(port)
        int port;
    {
        char    line[MAXLINSZ];
```

```
            putstr(port,
                "\n Welcome to AETNA Telecommunications Laboratory",NULL);
            putstr(port,"\n                    ATL NET Version 0.0",NULL);
            pad(line,0,MAXLINSZ - 1,' ');
            line[0] = '\n';
            daytime(line+15);
            line[strlen(line)] = ' ';
            fmtdate(line+25,TODAY);
            putstr(port,line,NULL);
            putstr(port,"\n\n",NULL);
        } hello3m(port)
        int port;
        {
         int i;

for (i = 0; i < 7; ++i)
                putstr(port,"\n",NULL);
         putstr(port,astline,NULL);
         putstr(port,dline,NULL);
         putstr(port,welcome,NULL);
         putstr(port,dline,NULL);
         putstr(port,fibline,NULL);
         putstr(port,dline,NULL);
         putstr(port,merlin,NULL);
         putstr(port,dline,NULL);
         pad(dtline,0,MAXLINSZ - 1,' ');
         dtline[20] = '*';
         daytime(dtline+25);
         dtline[strlen(dtline)] = ' ';
         fmtdate(dtline+38,TODAY);
         dtline[strlen(dtline)] = ' ';
         dtline[54] = '*';
         dtline[55] = '\n';
         dtline[56] = EOL;
         putstr(port,dtline,NULL);
         putstr(port,dline,NULL);
         putstr(port,astline,NULL);
         for (i = 0; i < 5; ++i)
                putstr(port,"\n",NULL);
        }
        #include "[nangle.net.build]atlncp.h"

logout(port,line,name,error)
        int port,error[];
        char line[],name[];
        {
         int     i;
         P_USER  userptr;
         P_IODEV devptr;
         extern P_USER   USERQUEUE, fnduser();
         extern P_IODEV  DEVQUEUE, fnddev();
         extern DEVICES  devtbl[];
         extern int      TODAY;

if ((userptr = fnduser(USERQUEUE,name)) == NULL)
                {
                 errprint(port,ER_USER);
                 return(NULL);
                }
         if ((devptr = fnddev(DEVQUEUE,devtbl[port].name)) == NULL)
                {
                 errprint(port,ER_DEVICE);
                 return(NULL);
                }
         dev_free(userptr,devptr,error);
         if (error[OSERR] != RET_OK)
                {
                 errprint(port,error[OSERR]);
                 error[OSERR] = 0;
                }
         remuser(name,error);
         i = gettime() - userptr->nettime;
         putstr(port,name,NULL);
```

```
#include "[nangle.net.build]atlncp.h"

static  ATLSVC   mailtbl[]      {{"READ",    "R" ,NULL,NULL},
                                 {"NEXT",    "N" ,NULL,NULL},
                                 {"BACK",    "B" ,NULL,NULL},
                                 {"LAST",    "L" ,NULL,NULL},
                                 {"SEND",    "S" ,NULL,NULL},
                                 {"DELETE",  "D" ,NULL,NULL},
                                 {"HELP"   , "?" ,NULL,NULL},
                                 {"QUIT"   , "Q" ,NULL,NULL},
                                 {"EXIT",   , "EX",NULL,NULL}
                                };
#define MTBLEN sizeof(mailtbl)/sizeof(struct svctbl)

mail(user,line,token,lineptr,echo,parity,error)
        register P_USER user;
        int *lineptr,echo,parity,error[ERRDIM];
        char    line[],token[];
    {register int    i;
     int     port, lmax, ltoken;
     register P_MAILBOX readptr;
     P_MAILBOX sendptr,delptr;
     extern P_USER USERQUEUE,fnduser();
     extern ATLSVC mailtbl[];
     extern char CMDERMSG[][];

port = user->portn;
     for (i = 0; i < ERRDIM; i++)
             error[i] = 0;
     sendptr = delptr = NULL;
     readptr = user->mailq;
     for (;;)
         {
             ltoken = lex(token,line,lineptr);
             if (ltoken == 0)
                 {
                     putstr(port," Mail > ",NULL);
                     lmax = getline(port,line,lineptr,echo,parity);
                     ltoken = lex(token,line,lineptr);
                 }
             if (ltoken == 0)
                     return;
             for (i = 0; i < MTBLEN; ++i)
                 {
                     if (strcmp(token,mailtbl[i].lname) == 0 ||
                         strcmp(token,mailtbl[i].sname) == 0)
                         {
                             switch(i)
                                 {
                                     case 0: /* READ */
                                     case 1: /* NEXT */
                                         readptr=readmail(user,readptr,
                                                          line,echo,
                                                          parity);
                                         delptr = readptr;
                                         break;

case 2: /* READ BACK */
                                         readptr=readmail(user,
                                                          readptr->last->last,
                                                          line,echo,parity);
                                         delptr = readptr;
                                         break;

case 3: /* READ LAST */
                                         readptr=readmail(user,
                                                 user->mailq->last->last,
                                                 line,echo,parity);
                                         delptr = readptr;
                                         break;

case 4: /* SEND */
                                         sendptr=sendmail(user,
                                                          line,lineptr,
                                                          token,echo,
                                                          parity,error);
```

```
                                if (error[UTLERR] = RET_OK)
                                    {
                                    errprint(port,
                                             error[UTLERR]);
                                    error[UTLERR]=error[OSERR]
                                                 =RET_OK;
                                    }
                                break;
                    case 5: /* DELETE */
                            if (delptr == NULL ||
                                readptr == user->mailq)
                                then {
                                    putstr(port,
"As a safety precaution the Mailer will ",NULL);
                                    putstr(port,
"only delete mail currently READ.\n",NULL);
                                    }
                                else {
                                    readptr=delmail(user,
                                             readptr);
                                    delptr = NULL;
                                    putstr(port,
                                        " Deleted\n",NULL);
                                    }
                                break;
                    case 6: /* HELP */
                            help(port,mailtbl,
                                 sizeof(mailtbl)/
                                 sizeof(struct svctbl));
                                break;
                    case 7: /* QUIT */
                    case 8: /* EXIT */
                            return;
                            break;
                    default:
                            break;
                    }
            *lineptr = strlen(line);
            break;
            }
        }
if (i >= MTBLEN)
    then {
        putstr(port,CMDERMSG,NULL);
        *lineptr = strlen(line);
        }
        #include "[nangle.net.build]atlnop.h"

P_MAILBOX readmail(user,qptr,line,echo,parity)
        P_USER user;
        P_MAILBOX qptr;
        char line[];
        int echo,parity;
        {
        register char   *msgptr,*pagenc;
        register P_DOCUMENT   mail;
        register int    port;
        extern int      TODAY;

port = user->portn;
        qptr = qptr->next;
        if (qptr == user->mailq)
            then {
                putstr(port," No new mail\n",NULL);
                return(qptr);
                }
        putstr(port,"\n Msg from: ",NULL);
        putstr(port,qptr->sender,NULL);
        pad(line,0,MAXLINSZ-1,' ');
        line[MAXLINSZ] = EOL;
        line[0] = '\n';
        fmtdate(line+2,TODAY);
```

```
                line[strlen(line)] = ' ';
                fmttime(qptr->time, line+17);
                putstr(port,line,NULL);
                putstr(port,"\n\n",NULL);
                mail = qptr->missive->next;
                for (; mail != qptr->missive; mail = mail->next)
                        {
                        msgptr = mail->page;
                        pagend = msgptr + (MAXLINSZ<<MPGSHFT);
                        while (msgptr < pagend && (*msgptr != NULL))
                                {
                                putstr(port,msgptr,NULL);
                                putstr(port,"\n",NULL);
                                msgptr += strlen(msgptr)+1;
                                }
                        }
                putstr(port,"\n",NULL);
                return(qptr);
                } include "[nangle.net.build]atlnco.h"
                #include "[nangle.net.build]atltel.h"

static  char    bell = 0x07;
static  char    ctl_s = 0x13;
static  char    *notice = "\n You have mail ...\n";

P_MAILBOX sendmail(sender,line,lineptr,token,echo,parity,error)
        P_USER   sender;
        char line[],token[];
        int *lineptr,echo,parity,error[];
        {
        int     lmax,ltoken;
        register int port;
        unsigned char   requid,data;
        P_USER          user;
        P_MAILBOX       mailptr;
        P_DOCUMENT      mail;
        register char   *msgptr,*pagend;
        extern P_USER   USERQUEUE,frduser();
        extern int      TODAY;

/**********************************************************/
        /*                                                        */
        /*      Find destination                                  */
        /*                                                        */
        /**********************************************************/ port = sender->portn;
        if ((ltoken = lex(token,line,lineptr)) == 0)
                then {
                        putstr(port,"\n Send mail > ",NULL);
                        putstr(port,"\n Enter user name: ",NULL);
                        lmax = getline(port,line,lineptr,echo,parity);
                        ltoken = lex(token,line,lineptr);
                     }
        user = NULL;
        while (ltoken > 0)
                {
                if ((user = frduser(USERQUEUE,token)) == NULL)
                        then
                                {
                                sendmsg(sender,token,DATA,REQUID,NULL);
                                readmsg(sender,token,&data,&requid,&user);
                                }
                if (user != NULL)
                        break;
                putstr(port," Unknown user: ",NULL);
                putstr(port,token,NULL);
                putstr(port,"\n Enter user name: ",NULL);
                lmax = getline(port,line,lineptr,echo,parity);
                ltoken = lex(token,line,lineptr);
                }
        if (ltoken == 0)
                return(NULL);
```

```
/*************************************************************/
/*                                                           */
/*      Alloc memory                                         */
/*                                                           */
/*************************************************************/ mem_alloc(&mailptr,sizeof(struct mailbox_def),error);
  if ((error[UTLERR] = error[OSERR]) != RET_OK)
          return(NULL);
  mem_alloc(&mailptr->sender,MAXLINSZ,error);
  if ((error[UTLERR] = error[OSERR]) != RET_OK)
          {
          mem_free(&mailptr,sizeof(struct mailbox_def),error);
          return(NULL);
          }
  mem_alloc(&mailptr->missive,sizeof(struct document),error);
  if ((error[UTLERR] = error[OSERR]) != RET_OK)
          {
          mem_free(&mailptr->sender,MAX_INSZ,error);
          mem_free(&mailptr,sizeof(struct mailbox_def),error);
          return(NULL);
          }
  mailptr->next = mailptr->last = mailptr;
  mailptr->missive->next = mailptr->missive->last = mailptr->missive;

/*************************************************************/
/*                                                           */
/*      Set up address,time & date                           */
/*                                                           */
/*************************************************************/ strcpy(mailptr->sender,sender->name);
  mailptr->jdate = TODAY;
  mailptr->time = gettime();
  if ((ltoken = lex(token,line,lineptr)) == 0)
       then {
              putstr(port," Enter message: ",NULL);
              lmax = getline(port,line,lineptr,echo,parity);
            }
       else {
              strcpy(line,line + (*lineptr) - ltoken);
              lmax = strlen(line);
            }
/*************************************************************/
/*                                                           */
/*      Allocate/write a 'page' at a time                    */
/*                                                           */
/*************************************************************/ while ( !(lmax == 1 && line[0] == '.'))
          {
          mem_alloc(&mail,sizeof(struct document),error);
          if ((error[UTLERR] = error[OSERR]) != RET_OK)
                  {
                  mem_free(&mailptr->missive,sizeof(struct document),
                               error);
                  mem_free(&mailptr->sender,MAXLINSZ,error);
                  mem_free(&mailptr,sizeof(struct mailbox_def),error);
                  return(NULL);
                  }
          mail->page = NULL;
          mem_alloc(&mail->page,MAXLINSZ<<MPGSHFT,error);
          if ((error[UTLERR] = error[OSERR]) != RET_OK)
                  {
                  mem_free(&mail,sizeof(struct document),error);
                  mem_free(&mailptr->missive,sizeof(struct document),
                               error);
                  mem_free(&mailptr->sender,MAXLINSZ,error);
                  mem_free(&mailptr,sizeof(struct mailbox_def),error);
                  return(NULL);
                  }
          pad(msgptr,0,MAXLINSZ<<MPGSHFT,'\0');
          pagend = msgptr + (MAXLINSZ<<MPGSHFT);
          while (msgptr < pagend && (!(lmax == 1 && line[0] == '.')))
                  {
                  strcpy(msgptr,line);
```

```
                        msgptr += strlen(line)+1;
                        lmax = getline(port,line,lineptr,echo,parity);
                        ltoken = lex(token,line,lineptr);
                    }
              enqdoc(mailptr->missive,mail);
          }

/**********************************************************/
/*                                                        */
/*      Send it off                                       */
/*                                                        */
/**********************************************************/ if (mail->page != NULL)
        then {
              enqmail(user->mailq,mailptr);
              putstr(user->portn,&bell,NULL);
              putstr(user->portn,notice,NULL);
              putstr(port,"\n Mail sent\n",NULL);
              *lineptr = strlen(line);
            }
    return(mailptr);
}
          #include "[nangle.net.build]atlncp.h"

static   ATLSVC   setcmd[] =      {{"DATE",      "D",    NULL,NULL},
                                   {"SLICE"   ,  "S",    NULL,NULL},
                                   {"TERMINAL",  "TERM", NULL,NULL},
                                   {"TIME",      "T",    NULL,NULL},
                                   {"HELP",      "?",    NULL,NULL}
                                  };

set(port,line,token,name,lineptr,ltoken,echo,parity,error)
        register char line[];
        char token[],name[];
        int port,*lineptr,*ltoken,*echo,*parity,error[];
        {
         register int i,cmdlen;
         int lmax;
         P_USER userptr;
         extern P_USER USERQUEUE,fnduser();
         extern ATLSVC setcmd[];

cmdlen = sizeof(setcmd)/sizeof(struct svctbl);
         for(;;)
             {
              putstr(port," SET ) ",NULL);
              *ltoken = lex(token,line,lineptr);
              if (*ltoken == 0)
                  {
                   lmax = getline(port,line,lineptr,*echo,*parity);
                   *ltoken=lex(token,line,lineptr);
                  }
              if (*ltoken == 0)
                  return;
              for (i = 0; i < cmdlen; i++)
                  {
                   if(strcmp(token,setcmd[i].sname) == 0 ||
                      strcmp(token,setcmd[i].lname) == 0)
                       {
                        switch(i)
                            {
                             case 0: /* Date */
                                   msetdate(name);
                                   break;

case 1: /* Set time slice */
                                   if((userptr = fnduser(USERQUEUE,name))
                                            ==NULL)
                                       {
                                        errprint(port,ER_USER);
                                        return;
                                       }
```

```
                                            putstr(port,"Input interval ",NULL);
                                            getline(port,line,lineptr,*echo,
                                                    *parity);
                                            timeslice(atoi(line));
                                            break;

case 2: /* Terminal */
                                            setterm(port,line,token,name,lineptr,
                                                    ltoken,echo,parity);
                                            break;

case 3: /* Time */
                                            msettime(name);
                                                                break;

case 4: /* Help */
                                                    help(port,setcmd,cmdlen);
                                                    break;
                                    }
                                *lineptr = strlen(line);
                                break;
                            }
                        }
                    } include "[nangle.net.build]atlnco.h"

setterm(port,line,token,name,lineptr,ltoken,echo,parity)
        char line[],token[],name[];
        int port,*lineptr,*ltoken,*echo,*parity;
        {
          *ltoken=lex(token,line,lineptr);
          if (*ltoken == 0)
                {
                    putstr(port," SET TERM ) ",NULL);
                    getline(port,line,lineptr,*echo,*parity);
                    *ltoken = lex(token,line,lineptr);
                    if (*ltoken == 0)
                        return;
                }
          if (strcmp(token,"ECHO") == 0) *echo = 1;
          if (strcmp(token,"NOECHO") == 0) *echo = 0;
        }
        #include "[nangle.net.build]atlnco.h"

talk(port,line,token,lineptr,echo,parity,error)
        register int port,*lineptr;
        int     echo,parity,error[];
        register char line[];
        char    token[];
        {
          int   lmax,ltoken;
          P_USER user;
          extern P_USER USERQUEUE,fnduser();

putstr(port," Talk > ",NULL);
          ltoken = lex(token,line,lineptr);
          if (ltoken == 0)
              then {
                    lmax = getline(port,line,lineptr,echo,parity);
                    ltoken = lex(token,line,lineptr);
                  }
              else lmax = strlen(line);
          if ((user = fnduser(USERQUEUE,token)) == NULL)
              then {
                    putstr(port," Unknown user: ",NULL);
                    putstr(port,token,NULL);
                    *lineptr = strlen(line);
                    return;
                  }
          for (;;)
                {
                  ltoken = lex(token,line,lineptr);
                  if (ltoken == 0)
                        {
```

```c
                        putstr(port," Enter message: ",NULL);
                        lmax = getline(port,line,lineptr,echo,parity);
                        ltoken = lex(token,line,lineptr);
                        if (ltoken == 0)
                                return;
                        }
                line[lmax] = '\n';
                line[min(MAXLINSZ,lmax+1)] = EOL;
                putstr(user->portn,line + (*lineptr) - ltoken,NULL);
                putstr(port," Talk > ",NULL);
                *lineptr = strlen(line);
                }
        } include "[nangle.net.build]atlncp.h"
        #include "[nangle.net.build]atlios.h"
static   char bell[] = 0x07070707;

/*******************************************************************/
/*                                                                 */
/*      Command Table                                              */
/*                                                                 */
/*******************************************************************/
static   ATLSVC cmdtbl[] =       {{"LOGOUT",    "LO",   NULL,NULL},
                                  {"CONNECT",   "CON",  NULL,NULL},
                                  {"DATE",      "DA",   NULL,NULL},
                                  {"DISCONNECT","DISC", NULL,NULL},
                                  {"DISPLAY",   "DISP", NULL,NULL},
                                  {"SHOW",      "SH",   NULL,NULL},
                                  {"HELP",      "?",    NULL,NULL},
                                  {"MAIL",      "M",    NULL,NULL},
                                  {"SET",       "SET",  NULL,NULL},
                                  {"TALK",      "TA",   NULL,NULL},
                                  {"TIME",      "TI",   NULL,NULL}
                                };

/*******************************************************************/
/*                                                                 */
/*      Command Processor                                          */
/*                                                                 */
/*******************************************************************/
command(port)
        register int port;
        {
        int error[ERRDIM];
        register int i,cmdtblen;
        int echo,parity,nticks,ltoken,lineptr;
        char token[MAXTOKEN],line[MAXLINE],name[MAXTOKEN],pinfo[4];
        P_USER userptr;
        extern P_NODE   NODEQUEUE;
        extern char     CMDERMSG[][];
        extern DEVICES devtbl[];
        extern P_USER  login();

strcpy(line,"Port ");
        i = strlen(line);
        itoa(port,line+i);
        i = strlen(line);
        strcpy(line+i," is now active\n");
        putstr(MONITOR,line,NULL);
        p_inq(0,pinfo);
        devtbl[port].processid = pinfo[1];
        parity=0;
        echo=1;
        cmdtblen = sizeof(cmdtbl)/sizeof(struct svctbl);
        p_pri(0,PRI_DAEMON,error);
        if (error[OSERR] != RET_OK)
                errprint(MONITOR,error[OSERR]);

for(;;)
                {
                while((userptr = login(port,line,token,name,&lineptr,<oken,
                                        &echo,&parity,error)) == NULL);
                for (i = 0; i < ERRDIM; i++)
                        error[i] = 0;
                for(;;)
```

```
{
do {
        putstr(port,"\n ATLNET) ",NULL);
        getline(port,line,&lineptr,echo,parity);
        ltoken=lex(token,line,&lineptr);
    }
while (ltoken == 0);
for (i=0; i<cmdtblen; ++i)
    if ((strcmp(token,cmdtbl[i].sname) == 0) ||
        (strcmp(token,cmdtbl[i].lname) == 0))
        {
          switch(i)
            {
                case 0: /* Logout */
                        logout(port,line,name,error);
                        break;

case 1: /* Connect */
            putstr(port,"\n CONNECT command \n",NULL);
                        break;
                case 2: /* Date */
                        {
                         extern int TODAY;

line[0] = ' ';
                         fmtdate(line+1,TODAY);
                         putstr(port,line,NULL);
                         putstr(port,"\n",NULL);
                         break;
                        } case 3: /* Disconnect */
            putstr(port,"\n Disconnect command\n",NULL);
                        break;

case 4: /* Display */
                case 5: /* Show */
                        display(port,line,token,
                                &lineptr,echo,parity,
                                error);
                        break;

case 6: /* Help */
                        help(port,cmdtbl,cmdtblen);
                        break;

case 7: /* Mail */
                        mail(userptr,line,token,
                             &lineptr,echo,parity,
                             error);
                        break;

case 8: /* Set */
                        set(port,line,token,name,
                            &lineptr,<oken,&echo,
                            &parity,error);
                        break;

case 9: /* Talk */
                        talk(port,line,token,&lineptr,
                             echo,parity,error);
                        break;
                    case 10: /* Time */
                            {
                              char hhmmss[9];
                              extern char bell[];

putstr(port,
        " At the sound of the tone the time will be ",NULL);
                              daytime(hhmmss);
                              putstr(port,hhmmss,NULL);
                              putstr(port,bell,NULL);
                              putstr(port,"\n",NULL);
                              break;
                            }
```

```
                                        }
                                        lineptr = strlen(line);
                                        break;
                                }
                        lineptr = strlen(line);
                        if (i == 0) break;
                        if (i )= cmdtolen)
                                putstr(port,CMDERMSG,NULL);
                }
        }
}
        #include         " ngle.net.buildatlncp.n"

static  ATLSVC  disptbl[] =     {{"CONFIG" ,"C"    ,NULL,NULL},
                                 {"NETWORK","N"    ,NULL,NULL},
                                 {"SUBNET" ,"S"    ,NULL,NULL},
                                 {"NODE"   ,"NO"   ,NULL,NULL},
                                 {"USERS"  ,"U"    ,NULL,NULL},
                                 {"DEVICES","D"    ,NULL,NULL},
                                 {"MEMORY" ,"M"    ,NULL,NULL},
                                 {"QUIT"   ,"Q"    ,NULL,NULL},
                                 {"EXIT"   ,"EX"   ,NULL,NULL},
                                 {"HELP"   ,"?"    ,NULL,NULL},
                                };
#define DTBLEN sizeof(disptbl)/sizeof(struct svctbl)

display(port,line,token,lineptr,echo,parity,error)
        register char line[];
        char    token[];
        register int port;
        int     *lineptr,echo,parity,error[];
        {register int   i;
         int    lmax,ltoken;
         extern ATLSVC disptbl[];
         extern char CMDERMSG[][];

for (;;)
                {
                putstr(port," Display ) ",NULL);
                ltoken = lex(token,line,lineptr);
                if (ltoken == 0)
                        {
                        lmax = getline(port,line,lineptr,echo,parity);
                        ltoken = lex(token,line,lineptr);
                        }
                if (ltoken == 0)
                        return;
                for (i = 0; i < DTBLEN; ++i)
                        {
                        if (strcmp(token,disptbl[i].lname) == 0 ||
                            strcmp(token,disptbl[i].sname) == 0)
                                {
                                switch(i)
                                        {
                                        case 0: /* Configuration */
                                                dspconfig(port);
                                                break;

case 1: /* Network */
                                                dspnet(port,line);
                                                break;

case 2: /* Subnet */
                                                dspsnet(port,line);
                                                break;

case 3: /* Node */
                                                dspnode(port,line);
                                                break;

case 4: /* Users */
                                                dspuser(port,line);
                                                break;

case 5: /* Devices */
```

```
                                dspdev(port,line);
                                break;

case 6: /* Memory */
                                dspmem(port,line,token,lineptr,echo,
                                        parity);
                                break;

case 7: /* Quit */
                        case 8: /* Exit */
                                return;

case 9: /* Help */
                                help(port,disptbl,DTBLEN);
                                break;
                        }
                break;
                }
        }
        if (i )= DTBLEN)
                putstr(port,CMDERMSG,NULL);
        *lineptr = strlen(line);
}
        #include "[nangle.net.build]atlstc.h"

static   char    config[][34] = {"   SYSTEM:                             ",
                                 "          RAM ADDR                     ",
                                 "          RAM SIZE                     ",
                                 "          STACK SIZE                   ",
                                 "          FREE MEMORY                  ",
                                 "                                       ",
                                 "   USER:                               ",
                                 "          RAM ADDR                     ",
                                 "          RAM SIZE                     ",
                                 "          BLOCK SIZE                   ",
                                 "          STACK SIZE                   ",
                                 "          TASK ADDR                    ",
                                 "          TASK COUNT                   "
                                };

dspconfig(port)
        int     port;
        {
        register int    i,linesize;
        register char   *lineptr;
        int     *cftbl,*lptr,loopmax;
        short   int *sptr;
        extern int      FREEMEM;

linesize = sizeof(config[0]);
        loopmax = sizeof(config)/sizeof(config[0]);

for (i = 0; i < loopmax; i++)
                {
                pad(&config[i][0],22,10,' ');
                config[i][0] = '\n';
                config[i][33] = EOL;
                } lineptr = config;
        lineptr = lineptr+linesize+22;
        cftbl = 0x00000038;
        cftbl = *cftbl;
        sptr = lptr = cftbl;        /* sys ram addr */
        itox(*lptr,lineptr);
        lptr += 1;                  /* sys ram size */
        lineptr += linesize;
        itox(*lptr,lineptr);
        sptr += 4;                  /* sys stack size */
        lineptr += linesize;
        itox(*sptr,lineptr);
        lineptr += linesize;        /* free memeory ptr */
        itox(FREEMEM,lineptr);
        sptr += 1;
        lptr = sptr;                /* user ram addr */
        lineptr += linesize;
```

```
    lineptr += linesize<<1;
    itox(*lptr,lineptr);
    lptr += 1;              /* user ram size */
    lineptr += linesize;
    itox(*lptr,lineptr);
    sptr += 4;              /* user block size */
    lineptr += linesize;
    itox(*sptr,lineptr);
    sptr += 1;              /* user stack size */
    lineptr += linesize;
    itox(*sptr,lineptr);
    lptr += 2;              /* user task addr */
    lineptr += linesize;
    itox(*lptr,lineptr);
    sptr += 3;              /* user task count */
    lineptr += linesize;
    itox(*sptr,lineptr);

for (i = 0,lineptr = config; i < loopmax; i++,lineptr += linesize)
        {
            putstr(port,lineptr,NULL);
        }
    putstr(port,"\n",NULL);
    }
#include        "atincp.h"

dspdev(port,line)
        register int    port;
        register char   line[];
        {register P_IODEV ptr;
         extern P_IODEV DEVQUEUE;

putstr(port,"\n    ID      NAME    STATUS TYPE",NULL);
         putstr(port,"\n -------- ---------- ------ ----",NULL);
         for (ptr = DEVQUEUE->next; ptr != DEVQUEUE; ptr = ptr->next)
             {
                pad(line,0,MAXLINSZ-1,' ');
                line[MAXLINSZ] = EOL;
                line[0] = '\n';
                itoa(ptr->id,line+2);
                line[strlen(line)] = ' ';
                strcpy(line+11,ptr->name);
                line[strlen(line)] = ' ';
                if (ptr->status == SHARABLE)
                    strcpy(line+22," AVAIL");
                    else strcpy(line+22,"LOCKED");
                line[strlen(line)] = ' ';
                if (ptr->type == PHONE)
                    then strcpy(line+30,"TEL");
                    else if (ptr->type == TTY)
                            then strcpy(line+30,"TTY");
                            else if (ptr->type == DISK)
                                    then strcpy(line+29,"DISK");
                                    else strcpy(line+29,"????");
                putstr(port,line,NULL);
             }
        putstr(port,"\n\n",NULL);
        }
        #include "[nangle.net.build]atlstc.h"

dspmem(port,line,token,lineptr,echo,parity)
        int     port,*lineptr,echo,parity;
        char    line[],token[];
        {
        int     i,j,dispsize,lmax,ltoken,increment;
        register int    k,n,loc;
        char    *memloc,*label,charptr;

label = memloc = 0;
        increment = 16;
        for (;;)
            {
                dispsize = 16;
                ltoken = lex(token,line,lineptr);
```

```c
        if (ltoken == 0)
            {
                putstr(port," Memory loc ) ",NULL);
                lmax = getline(port,line,lineptr,echo,parity);
                ltoken = lex(token,line,lineptr);
            }
        if (ltoken == 0)
            then return;
            else label = memloc = max(0,atox(token));
        ltoken = lex(token,line,lineptr);
        if (ltoken > 0)
            dispsize = max(1,atox(token));
        for (i = 0; i < dispsize; i +=increment)
            {
              charptr = 62;
              pad(line,1,MAXLINSZ - 1,' ');
              line[0] = '\n';
              line[MAXLINSZ] = EOL;
              itox(label,line+1);
              line[strlen(line)] = ' ';
              loc = 9;
              for(j = 0; j < 2; j++)
                  {
                    loc += 2;
                    for (k = 0; k < 8; k++)
                        {
                          n = (0x000000FF & *memloc++);
                          itox(n,line+loc);
                          if (n >= 32 && n <= 126)
                              then line[charptr++] = n;
                              else line[charptr++] = '.';
                          line[charptr] = EOL;
                          loc += 2;
                          line[loc++] = ' ';
                        }
                  }
                putstr(port,line,NULL);
                label = memloc;
            }
        putstr(port,"\n",NULL);
        *lineptr = strlen(line);
    }
        #include         "atlncp.h"

dspnet(port,line)
        register int port;
        register char   line[];
        {register P_NET ptr;
         extern P_NET NETQUEUE;

putstr(port,"\n     ID        NAME     STATUS PROT  CHAR TYPE",NULL);
         putstr(port,"\n    -------- ----------- ------ ---- ----- ----",NULL);
         for (ptr = NETQUEUE->next; ptr != NETQUEUE; ptr = ptr->next)
             {
                pad(line,0,MAXLINSZ-1,' ');
                line[MAXLINSZ] = EOL;
                line[0] = '\n';
                itoa(ptr->id,line+2);
                line[strlen(line)] = ' ';
                strcpy(line+11,ptr->name);
                line[strlen(line)] = ' ';
                if (ptr->status == UP)
                    then strcpy(line+26,"UP");
                    else strcpy(line+24,"DOWN");
                line[strlen(line)] = ' ';
                if (ptr->protocol == ATL)
                    then strcpy(line+30,"ATL");
                    else strcpy(line+30,"???");
                line[strlen(line)] = ' ';
                if (ptr->charset == ASCII)
                    then strcpy(line+34,"ASCII");
                    else strcpy(line+34,"?????");
                line[strlen(line)] = ' ';
                itoa(ptr->type,line+40);
                putstr(port,line,NULL);
             }
         putstr(port,"\n\n",NULL);
        }
```

```c
#include        "atlncp.h"

dspnode(port,line)
        register int port;
        register char   line[];
        {register P_NODE ptr;
         extern P_NODE NODEQUEUE;

putstr(port,"\n   ID     NAME    STATUS NDEV NUSER",NULL);
         putstr(port,"\n -------- ---------- ------- ---- -----",NULL);
         for (ptr = NODEQUEUE->next; ptr  != NODEQUEUE;
                ptr = ptr->next)
                {
                pad(line,0,MAXLINSZ-1,' ');
                line[MAXLINSZ] = EOL;
                line[0] = '\n';
                itoa(ptr->id,line+2);
                line[strlen(line)] = ' ';
                strcpy(line+11,ptr->name);
                line[strlen(line)] = ' ';
                if (ptr->status == UP)
                    then strcpy(line+26,"UP");
                    else strcpy(line+24,"DOWN");
                line[strlen(line)] = ' ';
                itoa(ptr->ndev,line+29);
                line[strlen(line)] = ' ';
                itoa(ptr->nuser,line+34);
                putstr(port,line,NULL);
                }
         putstr(port,"\n\n",NULL);
        }
#include        "atlncp.h"

dspsnet(port,line)
        int port;
        register char line[];
        {register P_SNET snet,ptr;
         P_NET  net;
         extern P_NET   NETQUEUE;
         extern P_SNET  SNETQUEUE;

for (net = NETQUEUE->next; net != NETQUEUE; net = net->next)
                {
                snet = net->snetq;
                putstr(port,"\n   ID      NAME     STATUS",NULL);
                putstr(port,"\n -------- ---------- ------",NULL);
                for (ptr = snet->next; ptr != snet; ptr = ptr->next)
                        {
                        pad(line,0,MAXLINSZ-1,' ');
                        line[MAXLINSZ] = EOL;
                        line[0] = '\n';
                        itoa(ptr->id,line+2);
                        line[strlen(line)] = ' ';
                        strcpy(line+11,ptr->name);
                        line[strlen(line)] = ' ';
                        if (ptr->status == UP)
                                then strcpy(line+26,"UP");
                                else strcpy(line+24,"DOWN");
                        putstr(port,line,NULL);
                        }
                putstr(port,"\n\n",NULL);
                }
        }
#include        "atlncp.h"

dspuser(port,line)
        register int    port;
        register char   line[];
        {register P_USER ptr;
         extern P_USER  USERQUEUE;

putstr(port,"\n   ID     NAME    PRI AUTH STATUS TYPE",NULL);
         putstr(port,"\n -------- ---------- ---- ---- ------ ----",NULL);
         for (ptr = USERQUEUE->next; ptr != USERQUEUE; ptr = ptr->next)
                {
                pad(line,0,MAXLINSZ-1,' ');
```

```
                line[MAX_INSZ] = EOL;
                line[0] = '\n';
                itox(ptr->ic,line+2);
                line[strlen(line)] = ' ';
                strcpy(line+11,ptr->name);
                line[strlen(line)] = ' ';
                itoa(ptr->priority,line+22);
                line[strlen(line)] = ' ';
                itoa(ptr->filter,line+27);
                line[strlen(line)] = ' ';
                if (ptr->status == AVAIL)
                    then strcpy(line+34,"NULL");
                    else {
                        if(ptr->rec->type == NET)
                            then strcpy(line+35,"NET");
                            else if (ptr->rec->type == TEL)
                                    then strcpy(line+35,"TEL");
                                    else strcpy(line+34,"DATA");
                        }
                line[strlen(line)] = ' ';
                itoa(ptr->type,line+39);
                putstr(port,line,NULL);
                }
            putstr(port,"\n\n",NULL);
        } include "atincp.h"

define IORMSG   1
#define IOCMSG   2
define IOPMSG   3 io_req()
        {int     i,j,net,snet,node,port,error;
         register P_IORBLK    req;
         extern   P_IORBLK    IOR_QUEUE,IOP_QUEUE;
         extern   P_SYNC      IORSEM,IOPSEM;
         extern   int         NXTPID;

p_smsg(&IORSEM->key,IORMSG,&error);
         for (;;)
             {
             error = 0;
             p_wmsg(&IORSEM->lock,&IORSEM->msg,&error);  /* get new req */
             if (IORSEM->msg != IOPMSG)
                 then {
                     req = (P_IORBLK) IORSEM->msg;
                     userpri(req);                        /* set priority */
                     enqio(IOR_QUEUE,req);                /* put on queue */
                     }
             p_wmsg(&IOPSEM->key,&IOPSEM->msg,&error);
             for(req = IOR_QUEUE->next; req != IOR_QUEUE; req = req->next)
                 {
                 enqio(IOP_QUEUE,req);    /* put on pending queue */
                 deqio(IOR_QUEUE,req);
                 }
             p_smsg(&IOPSEM->lock,IORMSG,&error);
             p_smsg(&IORSEM->key,IORMSG,&error);        /* enable for next */
             }
         } io_comp()
        {register P_IORBLK req;
         int error;
         extern P_IORBLK      IOC_QUEUE;
         extern P_SYNC        IOCSEM,IOPSEM;

p_smsg(&IOCSEM->key,IOCMSG,&error);                /* start up sync */
         for (;;)
             {
             error = 0;
             p_wmsg(&IOCSEM->lock,&IOCSEM->msg,&error); /* on new req */
             enqio(IOC_QUEUE,(P_IORBLK) IOCSEM->msg);
             for (req = IOC_QUEUE->next; req != IOC_QUEUE; req = req->next)
                 {           /* walk queue */
                 dev_free(req->spid,req->device,&error); /* free resource
```

```
                    req->bufptr = NULL;
                    p_smsg(&req->mailbox,req,&error);   /* notify user */
                    deqio(IOC_QUEUE,req);
                    }
            p_wmsg(&IOPSEM->key,&IOPSEM->msg,&error);
            p_smsg(&IOPSEM->lock,IOCMSG,&error);       /* check for any pending
            p_smsg(&IOCSEM->key,IOCMSG,&error);        /* enable for next req */
        }
    } io_pend()
        {register P_IORBLK req;
         int      error;
         extern   P_IORBLK    IOP_QUEUE, IOR_QUEUE;
         extern   P_SYNC      IOPSEM, IORSEM;
                                                        /* start up sync */
         p_smsg(&IOPSEM->key,IOPMSG,&error);
         for (;;)
             {
             error = 0;
             p_wmsg(&IOPSEM->lock,&IOPSEM->msg,&error);  /* for new req */
             p_wmsg(&IORSEM->key,&IORSEM->msg,&error);
             for (req = IOP_QUEUE->next; req != IOP_QUEUE; req = req->next)
                     {          /* walk queue */
                     if (req->device->status == SHARABLE)
                         {   /* if resource avail */
                         deqio(IOP_QUEUE,req);
                         enqio(IOR_QUEUE,req);  /* retry */
                         }
                     }
             p_smsg(&IORSEM->lock,IOPMSG,&error);       /* re-schedule */
             p_smsg(&IOPSEM->key,IOPMSG,&error);        /* enable for next IOC *
             } include "[nangle.net.build]atincp.h"

dev_alloc(user,device,error)
        register P_USER  user;
        register P_IODEV device;
        int      error[];
        { p_wmsg(&device->sem->key,&device->sem->msg,error);
          if (error[OSERR] != RET_OK)
                  return;
          device->status |= device->mode;
          p_smsg(&device->sem->lock,TRUE,error);
        } dev_free(user,device,error)
        register P_USER  user;
        register P_IODEV device;
        int      error[];

{
          p_wmsg(&device->sem->lock,&device->sem->msg,error);
          if (error[OSERR] != RET_OK)
                  return;
          device->status ^= device->mode;
          p_smsg(&device->sem->key,TRUE,error);
        } cr_ioblk(user,error)
        P_USER user;
        int    error[];

{register P_IORBLK ptr;
         register int    i;

mem_alloc(&user->req,sizeof(IO_RBLK),error);
         if ((error[UTLERR] = error[OSERR]) != RET_OK)
                 {
                 error[OSERR] = RET_OK;
                 return;
                 }
```

```
        ptr = user->req;
        ptr->dpid = NULL;
        ptr->spid = user->id;
        ptr->processid = user->processid;
        ptr->priority = 0;
        ptr->opcode = 0;
        ptr->type = 0;
        ptr->request = 0;
        mem_alloc(&ptr->msgbuf1,STDBUFSZ,error);
        if ((error[UTLERR] = error[OSERR]) != RET_OK)
            {
            error[OSERR] = RET_OK;
            mem_free(&user->req,sizeof(IO_RBLK),error);
            return;
            }
        mem_alloc(&ptr->pktbuf1,STDBUFSZ,error);
        if ((error[UTLERR] = error[OSERR]) != RET_OK)
            {
            error[OSERR] = RET_OK;
            mem_free(&ptr->msgbuf1,STDBUFSZ,error);
            mem_free(&user->req,sizeof(IO_RBLK),error);
            return;
            }
            for (i = 0; i < STDBUFSZ; ++i)
                ptr->msgbuf1[i] = ptr->pktbuf1[i] = EOL;
            ptr->nbytes1 = 0;
            ptr->npkts1 = 0;
            ptr->device = NULL;
            ptr->status = FREE;
            ptr->mailbox = 0;
        } del_ioblk(user,error)
        P_USER user;
        int    error[];

{ mem_free(&user->req->pktbuf1,STDBUFSZ,error);
        mem_free(&user->req->msgbuf1,STDBUFSZ,error);
        mem_free(&user->req,sizeof(IO_RBLK),error);
        }
        #include "atlncp.h"

deqdev(device)
        register P_IODEV device;

{
         p_lock();
         device->last->next = device->next;
         device->next->last = device->last;
         p_unloc();
        }
        #include "atlncp.h"

deqdoc(doc)
        register P_DOCUMENT doc;

{
         p_lock();
         doc->last->next = doc->next;
         doc->next->last = doc->last;
         p_unloc();
        }
        #include "[nangle.net.build]atlncp.h"

deqfibw(entry)
        register P_IORBLK entry;

{
         p_lock();
         entry->q_fiberwait.last->q_fiberwait.next = entry->q_fiberwait.next;
         entry->q_fiberwait.next->q_fiberwait.last = entry->q_fiberwait.last;
         p_unlock();
        }
```

```c
        #include "atlncp.h"

deqio(queue,req)
        register P_IOQUEUE queue;
        register P_IORBLK  req;

{register P_IOQUEUE  qptr;

for (qptr = queue->next; qptr != queue; qptr = qptr->next)
            {
              if (qptr->req == req)
                 {
                   qptr->last->next = qptr->next;
                   qptr->next->last = qptr->last;
                 }
            }
        }
        #include "atlncp.h"

deqmail(mail)
        register P_MAILBOX mail;

{
         p_lock();
         mail->last->next = mail->next;
         mail->next->last = mail->last;
         p_unloc();
        }
        #include "atlncp.h"

deqnet(net)
        register P_NET  net;

{
         p_lock();
         net->last->next = net->next;
         net->next->last = net->last;
         p_unloc();
        }
        #include "atlncp.h"

P_NODE deqnode(node)
        register P_NODE node;

{
         p_lock();
         node->last->next = node->next;
         node->next->last = node->last;
         p_unloc();
        }
        #include "atlncp.h"

deqsnet(snet)
        register P_SNET snet;

{
         p_lock();
         snet->last->next = snet->next;
         snet->next->last = snet->last;
         p_unloc();
        }
        #include "[nangle.net.build]atlncp.h"

deqqev(device)
        register P_UDEVQ device;

{
         p_lock();
         device->last->next = device->next;
         device->next->last = device->last;
         p_unloc();
        }
```

```
        #include "atlncp.h"

dequser(user)
        register P_USER user;

{
         p_lock();
         user->last->next = user->next;
         user->next->last = user->last;
         p_unlock();
        }
        #include "atlncp.h"

enqdev(queue,entry)     /* chains in fifo order */
        register P_IODEV queue,entry;

{
         p_lock();
         entry->next = queue;
         entry->last = queue->last;
         queue->last->next = entry;
         queue->last = entry;
         p_unloc();
        }
        #include "atlncp.h"

enqdoc(queue,entry)     /* chains in fifo order */
        register P_DOCUMENT queue,entry;

{
         p_lock();
         entry->next = queue;
         entry->last = queue->last;
         queue->last->next = entry;
         queue->last = entry;
         p_unloc();
        }
        #include "[nangle.net.build]atlncp.h"

enqfibw(queue,entry)    /* chains in priority order */
        register P_IORBLK queue,entry;

{register P_IORBLK ptr;

p_lock();
         ptr = queue->q_fiberwait.next;
         entry->q_fiberwait.next = ptr;
         entry->q_fiberwait.last = ptr->q_fiberwait.last;
         ptr->q_fiberwait.last->q_fiberwait.next = entry;
         ptr->q_fiberwait.last = entry;
         p_unloc();
        }
        #include "atlncp.h"

enqio(queue,req)        /* chains in priority order */
        register P_IOQUEUE queue;
        register P_IORBLK  req;

{register P_IOQUEUE ptr;

ptr = queue;
         do {
                ptr = ptr->next;
                if ((ptr->req->priority > req->priority) ||
                    (ptr == queue))
                    {
                        req->next = ptr;
                        req->last = ptr->last;
                        ptr->last->next = req;
                        ptr->last = req;
                    }
             }
         while (ptr != queue);
```

```
        #include "atlncp.h"

enqmail(queue,entry)    /* chains in fifo order */
        register P_MAILBOX queue,entry;

{
         p_lock();
         entry->next = queue;
         entry->last = queue->last;
         queue->last->next = entry;
         queue->last = entry;
         p_unloc();
        }
        #include "atlncp.h"

enqnet(queue,entry)     /* chains in fifo order */
        register P_NET queue,entry;

{
         p_lock();
         entry->next = queue;
         entry->last = queue->last;
         queue->last->next = entry;
         queue->last = entry;
         p_unloc();
        }
        #include "atlncp.h"

enqnode(queue,entry)    /* chains in fifo order */
        register P_NODE queue,entry;

{
         p_lock();
         entry->next = queue;
         entry->last = queue->last;
         queue->last->next = entry;
         queue->last = entry;
         p_unloc();
        }
        #include "atlncp.h"

enqsnet(queue,entry)    /* chains in fifo order */
        register P_SNET queue,entry;

{
         p_lock();
         entry->next = queue;
         entry->last = queue->last;
         queue->last->next = entry;
         queue->last = entry;
         p_unloc();
        }
        #include "triangle.net.buildlatlncp.h"

enqudev(queue,entry)    /* chains in fifo order */
        register P_UDEVQ queue,entry;

{
         p_lock();
         entry->next = queue;
         entry->last = queue->last;
         queue->last->next = entry;
         queue->last = entry;
         p_unloc();
        }
        #include "atlncp.h"

enquser(queue,entry)   /* chains in priority order */
        register P_USER queue,entry;

{register P_USER ptr;

p_lock();
         ptr = queue;
         do {
```

```
                ptr = ptr->next;
                if ((ptr->priority > entry->priority) ||
                    (ptr == queue))
                    {
                        entry->next = ptr;
                        entry->last = ptr->last;
                        ptr->last->next = entry;
                        ptr->last = entry;
                        ptr = queue;
                    }
            }
    while (ptr != queue);
    p_unloc();
}
        #include "atlncp.h"

P_IODEV fnodev(queue, entry)
        P_IODEV queue;
        char    *entry;

{register P_IODEV qptr,qstart;

for (qptr = queue->next; qptr != queue; qptr = qptr->next)
                if(strcmp(qptr->name,entry) == 0)
                    return(qptr);
            return(NULL);
        }
        #include "atlncp.h"

P_NET fnonet(queue,entry)
        register P_NET  queue;
        char            *entry;

{register P_NET qptr;

for (qptr = queue->next; qptr != queue; qptr = qptr->next)
                if(strcmp(qptr->name,entry) == 0)
                    return(qptr);
            return(NULL);
        }
        #include "atlncp.h"

P_NODE fnonode(queue,entry)
        register P_NODE queue;
        char            *entry;

{register P_NODE qptr;

for (qptr = queue->next; qptr != queue; qptr = qptr->next)
                if(strcmp(qptr->name,entry) == 0)
                    return(qptr);
            return(NULL);
        }
        #include "atlncp.h"

P_SNET fndsnet(queue,entry)
        register P_SNET queue;
        register char   *entry;

{register P_SNET qptr;

for (qptr = queue->next; qptr != queue; qptr = qptr->next)
                if(strcmp(qptr->name,entry) == 0)
                    return(qptr);
            return(NULL);
        }
```

```
#include "[nangle.net.build]atlncp.h"

P_UDEVQ fnddev(queue,entry)
        P_UDEVQ queue;
        char    *entry;

{register P_UDEVQ qptr;

for (qptr = queue->next; qptr != queue; qptr = qptr->next)
             if(strcmp(qptr->device->name,entry) == 0)
                 return(qptr);
         return(NULL);
        }
        #include "atlncp.h"

P_USER fnduser(queue,entry)
        register P_USER queue;
        register char   *entry;

{register P_USER qptr;

for (qptr = queue->next; qptr != queue; qptr = qptr->next)
             if(strcmp(qptr->name,entry) == 0)
                 return(qptr);
         return(NULL);
        } include "atlncp.h"
        #include "atlpkt.h"

/**********************************************************************/
/*                                                                    */
/* Packet format(in bits):                                            */
/*        32       32        8       8       32      8xN      ?       */
/*      --------------------------------------------------------------*/
/*      | dest | source | opcode | pkt # | pkt_size | data | trailer |*/
/*      --------------------------------------------------------------*/
/*                                                                    */
/**********************************************************************/
getpkt()
        {
                register char   *dest;
                P_USER          user;
                register P_IORBLK   req;
                register int    i;
                int             port,error;
                char            pinfo[4];
                extern P_SYNC   PORTSEM;
                extern int      PORTBASE;

p_inq(0,pinfo);
                p_wmsg(&PORTSEM->key,&port,&error);
                if (port >> 24 == pinfo[1] + PORTBASE + MAXPORTS)
                   then {   /* it's for us */
                        p_smsg(&PORTSEM->lock,TRUE,&error);
                        req = (P_IORBLK) (port | 0x00FFFFFF);
                        port >>= 24;
                        dest = req->pktbuf1;
                        for (i = 0; i < DFLT_PKTSZ; ++i)
                            sc_get(port,dest++,1);
                        req->npkts1 += 1;
                        moves(req->pktbuf1,HDRSIZ,req->msgbuf1,0,
                            DFLT_PKTSZ-HDRSIZ-TLRSIZ);
                        }
                else p_smsg(&PORTSEM->key,port,&error); /* not ours so return it */
        } include "atlncp.h"
                        #include "atlpkt.h"
```

```
/**********************************************************************/
/*                                                                    */
/* Packet format (in bits):                                           */
/*      32      32      8       8       32      8xN     ?             */
/*                                                                    */
/*      --------------------------------------------------------      */
/*      | dest | source | opcode | pkt # | pkt_size | data | trailer |*/
/*      --------------------------------------------------------      */
/*                                                                    */
/**********************************************************************/
putpkt()
        {
        char            *dest;
        P_USER          user;
        register P_IORBLK       req;
        register int    i;
        int     port,offset,error;
        char            pinfo[4];
        extern P_SYNC   PORTSEM;
        extern int      PORTBASE;

p_inq(0,pinfo);
        p_wmsg(&PORTSEM->key, &port, &error);
        if (port >> 24 == pinfo[1] + PORTBASE)
            then {      /* it's for us */
                p_smsg(&PORTSEM->lock,TRUE,&error);
                req = (P_IORBLK) (port & 0x00FFFFFF);
                port >>= 24;
                dest = req->pktbuf1;
                offset -= offset;

moves(req->dpid,0,dest,offset,sizeof(req->dpid));
                offset = sizeof(req->dpid);
                moves(req->spid,0,dest,offset,sizeof(req->spid));
                offset += sizeof(req->spid);
                moves(req->request,0,dest,offset++,1);
                moves(1,3,dest,offset++,1);
                moves(DFLT_PKTSZ,0,dest,offset,4);
                offset += 4;
                moves(req->msgbuf1,0,dest,offset,DFLT_PKTSZ-offset-TLRSIZ);
                moves(req->spid,0,dest,offset + DFLT_PKTSZ,
                        sizeof(req->spid));
                req->npkts1 -= 1;
                for (i = 0; i < DFLT_PKTSZ; ++i)
                        sc_put(port,dest++,1);
                }
            else p_smsg(&PORTSEM->key, port, &error);
        }
include         "atlstd.h"

static char a2etbl[] =      {0x00,0x01,0x02,0x03,0x00,0x09,0x00,0x7F,
                                0x00,0x00,0x00,0x0B,0x0C,0x0D,0x0E,0x0F,
                                0x10,0x11,0x12,0x00,0x00,0x00,0x08,0x00,
                                0x18,0x19,0x00,0x00,0x00,0x00,0x00,0x00,
                                0x00,0x00,0x1C,0x00,0x00,0x0A,0x17,0x1B,
                                0x00,0x00,0x00,0x00,0x00,0x05,0x06,0x07,
                                0x00,0x00,0x16,0x00,0x00,0x1E,0x00,0x04,
                                0x00,0x00,0x00,0x00,0x14,0x15,0x00,0x1A,
                                0x20,0x00,0x00,0x00,0x00,0x00,0x00,0x00,
                                0x00,0x00,0x00,0x2E,0x3C,0x28,0x2B,0x21,
                                0x26,0x00,0x00,0x00,0x00,0x00,0x00,0x00,
                                0x00,0x00,0x21,0x24,0x2A,0x29,0x3B,0x5E,
                                0x2D,0x2F,0x00,0x00,0x00,0x00,0x00,0x00,
                                0x00,0x00,0x7C,0x2C,0x25,0x5F,0x3E,0x3F,
                                0x00,0x00,0x00,0x00,0x00,0x00,0x00,0x00,
                                0x00,0x60,0x3A,0x23,0x40,0x27,0x3D,0x22,
                                0x00,0x61,0x62,0x63,0x64,0x65,0x66,0x67,
                                0x68,0x69,0x00,0x00,0x00,0x00,0x00,0x00,
                                0x00,0x6A,0x6B,0x6C,0x6D,0x6E,0x6F,0x70,
                                0x71,0x72,0x00,0x00,0x00,0x00,0x00,0x00,
                                0x00,0x7E,0x73,0x74,0x75,0x76,0x77,0x78,
                                0x79,0x7A,0x00,0x00,0x00,0x00,0x00,0x00,
                                0x00,0x00,0x00,0x00,0x00,0x00,0x00,0x00,
                                0x00,0x00,0x00,0x00,0x00,0x00,0x00,0x00,
                                0x7B,0x41,0x42,0x43,0x44,0x45,0x46,0x47,
```

```
                    0x48,0x49,0x00,0x00,0x00,0x00,0x00,0x00,
                    0x7D,0x4A,0x4B,0x4C,0x4D,0x4E,0x4F,0x50,
                    0x51,0x52,0x00,0x00,0x00,0x00,0x00,0x00,
                    0x5C,0x00,0x53,0x54,0x55,0x56,0x57,0x58,
                    0x59,0x5A,0x00,0x00,0x00,0x00,0x00,0x00,
                    0x30,0x31,0x32,0x33,0x34,0x35,0x36,0x37,
                    0x38,0x39,0x00,0x00,0x00,0x00,0x00,0x00
                };

asctebc(string,len)
        register char    *string;
        register long int len;
        {
         register long int i;

for(i = 0; i < len; ++i)
             *string++ = a2etbl[*string];
        }
atoi(s)
        register char    s[];
        {
         register int    i,n;
         register int    sign;

/* skip white space */
         for(i = 0; s[i] == ' ' || s[i] == '\n' || s[i] == '\t'; i++);
         sign = 1;
         if(s[i] == '+' || s[i] == '-')
             sign = (s[i++] == '+') ? 1 : -1;
         for(n = 0; s[i] >= '0' && s[i] <= '9'; i++)
             n = 10 * n + s[i] - '0';
         return(sign * n);
        }
        #include "[nangle.net.build]atlstd.h"

atox(s)
        register char    s[];
        {
         register int    i,n;

/* skip white space */
         for(i = 0; s[i] == ' ' || s[i] == '\n' || s[i] == '\t'; i++);
         for(n = 0; s[i] != '\0'; i++)
             if (s[i] >= '0' && s[i] <= '9')
                 then n = 16 * n + s[i] - '0';
             else if (s[i] >= 'A' && s[i] <= 'F')
                 n = 16 * n + s[i] - 55;
         return(n);
        }
        #include "[nangle.net.build]atincp.h"

int TODAY = 0;

static int day_tab[2][13] =     {{0,31,28,31,30,31,30,31,31,30,31,30,31},
                                 {0,31,29,31,30,31,30,31,31,30,31,30,31}
                                };

static char *month_name[] = {"BAD","JAN","FEB","MAR","APR","MAY","JUN",
                             "JUL","AUG","SEP","OCT","NOV","DEC"};

leapyear(year)
        int year;
        {
         return(year%4 == 0 && year%100 != 0 || year%400 == 0);
        } define TICKSPERDAY 43197000
montime()
        {
         int nticks,year,month,day;

nticks = gettime();
         if (nticks < TICKSPERDAY)
             return(nticks);
```

```
        settime(nticks % TICKSPERDAY);
        jtiymd(TODAY, &year, &month, &day);
        day += nticks / TICKSPERDAY;
        if (day > day_tab[leapyear(year)][month])
            {
                day -= day_tab[leapyear(year)][month];
                month++;
                if (month > 12)
                    {
                        month = 1;
                        year++;
                    }
            }
        TODAY = julian(year, month, day);
        return(gettime());
        } julian(year, month, day)
        register int day, month;
        int year;
        {
        register int    i;
        int leap;

leap = leapyear(year);
        for (i = 1; i < month; i++)
                day += day_tab[leap][i];
        year -= 1900;
        return(year * 1000 + day);
        } jtiymd(jdate, year, month, day)
        register int jdate, *month, *day;
        int *year;
        {
        int leap;

*year = jdate/1000 + 1900;
        *day = jdate%1000;
        leap = leapyear(*year);
        for (*month = 1; *day > day_tab[leap][*month]; (*month)++)
                *day -= day_tab[leap][*month];
        } fmtdate(cdate, jdate)
        char cdate[];
        int jdate;
        {
        int year, month, day;
        register int offset;

jtiymd(jdate, &year, &month, &day);
        strcpy(cdate, month_name[month]);
        offset = strlen(cdate);
        cdate[offset++] = ' ';
        if (day < 10)
            cdate[offset++] = '0';
        itoa(day, cdate+offset++);
        if (day > 9)
            offset++;
        cdate[offset++] = ' ';
        itoa(year, cdate+offset);
        } getdate(port, line, echo, parity)
        int port, echo, parity;
        char    line[];
        {
        int     year, month, day, jdate;
        int     ltoken, lineptr;
        char    token[MAXTOKEN];

day = month = year = 0;
        putstr(port, "\n Input date as MM DD YY\n", NULL);
        getline(port, line, &lineptr, echo, parity);
```

```
lex(token,line,&lineptr);
month = atoi(token);
while(month < 1 || month > 12)
        {
        putstr(port," Month ? ",NULL);
        getline(port,line,&lineptr,echo,parity);
        lex(token,line,&lineptr);
        month = atoi(line);
        }
lex(token,line,&lineptr);
day = atoi(token);
while (day < 1 || day > 31)
        {
        putstr(port," Day ? ",NULL);
        getline(port,line,&lineptr,echo,parity);
        lex(token,line,&lineptr);
        day = atoi(line);
        }
ltoken = lex(token,line,&lineptr);
year = atoi(token);
while (ltoken == 0)
        {
        putstr(port," Year ? ",NULL);
        getline(port,line,&lineptr,echo,parity);
        ltoken = lex(token,line,&lineptr);
        year = atoi(token);

return(julian(year+1900,month,day));
        } daytime(hhmmss)
        char    hhmmss[];
        {
        fmttime(montime(),hhmmss);
        } dechms(nticks,hh,mm,ss)
        register int nticks,*hh,*mm;
        int *ss;
        { nticks /= 500;
        *hh = (nticks/3600);
        nticks = nticks - *hh * 3600;
        *mm = nticks / 60;
        nticks = nticks - *mm * 60;
        *ss = nticks;
        *hh %= 24;
        }
include        "atlstd.h"

decnid(netid,net,snet,node,port)
        register ULINT  netid;
        int     *net,*snet,*node,*port;
        {
        *net  = (netid & 0xFF000000) >> 24;
        *snet = (netid & 0x00FF0000) >> 16;
        *node = (netid & 0x0000FF00) >> 8;
        *port =  netid & 0x000000FF;
        } include        "atlstd.h"

static char e2atbl[] =  {0x00,0x01,0x02,0x03,0x37,0x2D,0x2E,0x2F,
                         0x16,0x05,0x25,0x0B,0x0C,0x0D,0x0E,0x0F,
                         0x10,0x11,0x12,0x00,0x3C,0x3D,0x32,0x26,
                         0x18,0x19,0x3F,0x27,0x22,0x00,0x35,0x00,
                         0x40,0x4F,0x7F,0x7B,0x5B,0x6C,0x50,0x7D,
                         0x4D,0x5D,0x5C,0x4E,0x6B,0x60,0x4B,0x61,
                         0xF0,0xF1,0xF2,0xF3,0xF4,0xF5,0xF6,0xF7,
                         0xF8,0xF9,0x7A,0x5E,0x4C,0x7E,0x6E,0x6F,
                         0x7C,0xC1,0xC2,0xC3,0xC4,0xC5,0xC6,0xC7,
```

```
                    0xC8, 0xC9, 0xD1, 0xD2, 0xD3, 0xD4, 0xD5, 0xD6,
                    0xD7, 0xD8, 0xD9, 0xE2, 0xE3, 0xE4, 0xE5, 0xE6,
                    0xE7, 0xE8, 0xE9, 0xAD, 0xE0, 0xBD, 0x5F, 0x6D,
                    0x79, 0x81, 0x82, 0x83, 0x84, 0x85, 0x86, 0x87,
                    0x88, 0x89, 0x91, 0x92, 0x93, 0x94, 0x95, 0x96,
                    0x97, 0x98, 0x99, 0xA2, 0xA3, 0xA4, 0xA5, 0xA6,
                    0xA7, 0xA8, 0xA9, 0xC0, 0x6A, 0xD0, 0xA1, 0x07,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00,
                    0x00, 0x00, 0x00, 0x00, 0x00, 0x00, 0x00, 0x00
            };

ebctasc(string, len)
        register char   *string;
        register long int len;
        {
         register long int i;

for(i = 0; i < len; ++i)
             *string++ = e2atbl[*string];
        }
include         "atlstd.h"

encnid(netid, net, snet, node, port)
        int net, snet, node, port;
        ULINT   *netid;
        {
         *netid = net << 24 | snet << 16 | node << 8 | port;
        }
fmttime(nticks, hhmmss)
        int     nticks;
        register char   hhmmss[];
        {
        int     hh, mm, ss;
        register int offset;

offset = 0;
        dechms(nticks, &hh, &mm, &ss);
        if (hh < 10)
            hhmmss[offset++] = '0';
        itoa(hh, hhmmss+offset);
        offset = strlen(hhmmss);
        hhmmss[offset++] = ':';
        if (mm < 10)
            hhmmss[offset++] = '0';
        itoa(mm, hhmmss+offset);
        offset = strlen(hhmmss);
        hhmmss[offset++] = ':';
        if (ss < 10)
            hhmmss[offset++] = '0';
        itoa(ss, hhmmss+offset);
        }
include         "atlstd.h"

flush(position)
        long int *position;

{
         *position = HIGHVAL;
        }
```

```
gettok(string,position,size,brktbl,brktblen,token,toklen)
        char    *brktbl,*string;
        register char   *token;
        long int        *size,*position,brktblen,*toklen;
        {
        register char   *chpos,*brkchar;
        short int       i,found;

for (i = 0; token[i] != NULL; ++i)
             token[i] = NULL;

if (*position )= *size - 1)
            {
            return;
            *position = 0;
            while(*size = getlin(string,MAXLINSZ) (= 0);
            } chpos = string = *position;
        do {
            found = FALSE;
            for (brkchar = brktbl; *brkchar != NULL; ++brkchar)
                if (*chpos == *brkchar)
                    {
                        ++chpos;
                        (*position)++;
                        found = TRUE;
                    }
            }
        while (found && (*chpos != NULL));

do {
            found = FALSE;
            for (brkchar = brktbl; *brkchar != NULL; ++brkchar)
                if (*chpos == *brkchar)
                    {
                        ++chpos;
                        found = TRUE;
                    }
            if (!found)
                *token++ = *chpos++;
            }
        while (!found && (*chpos != NULL));

toklen = chpos - string - (*position) -1;
        *position = chpos - string;
        }
        #include "[nangle.net.build]atlncp.h"

define blanksize 17 help(port,cmdtbl,len)
        ATLSVC  cmdtbl[];
        register int    port,len;
        {
        register int i,j,nspace;
        char line[blanksize + 1];

pad(line,0,blanksize,' ');
        line[blanksize+1] = '\0';
        putstr(port,"\n Command              Abbreviation",NULL);
        putstr(port,"\n -------              ------------\n",NULL);
        for (i = 0; i < len; ++i)
            {
            putstr(port," ",NULL);
            putstr(port,cmdtbl[i].lname,NULL);
            nspace = blanksize - strlen(cmdtbl[i].lname);
            line[nspace] = '\0';
            putstr(port,line,NULL);
            line[nspace] = ' ';
            putstr(port,cmdtbl[i].sname,NULL);
            putstr(port,"\n",NULL);
            }
        }
```

```
itoa(n,s)        /* convert n to characters in s */
        register int n;
        register char s[];
        {
         register int   i;
         int    sign;

if ((sign = n) < 0)
             n = -n;
         i = 0;
         do {                                   /* get digits in reverse order */
                 s[i++] = n % 10 + '0';         /* get next digit */
             }
         while ((n /= 10) > 0);
         if (sign < 0)
             s[i++] = '-';
         s[i] = '\0';
         reverse(s);
        } char    hextbl[] =      {'0','1','2','3','4','5','6','7',
                         '8','9','A','B','C','D','E','F'
                        };

itox(n,s)        /* convert n to characters in s */
        register unsigned int n;
        register char s[];
        {
         register int   i;
         extern char hextbl[];

i = 0;
         do {
                 s[i++] = hextbl[n%16];
             }
         while ((n /= 16) > 0);
         if ((i & 1) == 1)
             s[i++] = '0';
         s[i] = '\0';
         reverse(s);
        }
        #include "atlncp.h"

netid(uname,nid)
        char    *uname;
        ULINT   *nid;
        {
         extern BOOL strcmp();
         extern P_NET NETQUEUE;
         P_NET qptr,qstart;

qstart = NETQUEUE->next->sneto->next->nodeo->next->usero;
         for(qptr = qstart->next; qptr != qstart; qptr = qptr->next)
                 if(strcmp(qptr->name, uname))
                         *nid = qptr->id;
        }
        #include "[nangle.net.build]atlncp.h"

BOOL offnode(userid)
        ULINT   userid;
        {
         extern ULINT   NODEID;

return(((userid & 0x0000FF00) >> 8) != NODEID);
        } include         "atlstd.h"
        #include         "atlque.h"

userpri(req)
                P_IORBLK req;

{
```

```
            if (req->type == NETWORK)
                then req->priority = PRI_NET;
                else if (req->type == TEL)
                        then req->priority = PRI_TEL;
                        else if (req->type == DATA)
                                then req->priority = PRI_DATA;
    } reverse(s)              /* reverse string s in place */
    register char s[];
    {
     int c;
     register i,j;

for (i = 0, j = strlen(s)-1; i < j; i++,j--)
        {
         c = s[i];
         s[i] = s[j];
         s[j] = c;
        }
    }
include        "atlstd.h"

moves(source,soffset,dest,doffset,len)
    register char   *source,*dest;
    register long int len;
    long int soffset,doffset;

{ source += soffset;
     dest += doffset;
     while(len-- > 0)
         *dest++ = *source++;
    }
pad(source,start,len,ch)

register char   *source,ch;
    int len;
    int start;

{register int i;

source += start;
     for(i = 0; i < len; ++i)
         *source++ = ch;
    }
    #include "[nangle.net.build]atlncp.h"

int strcmp(s,t)
    register char *s,*t;
    { for (; *s==*t; s++,t++)
          if (*s=='\0')
              return(0);
      return(*s-*t);
    }
    #include "[nangle.net.build]atlncp.h"

int strcpy(s,t)
    register char *s,*t;
    { while (*s++ = *t++); } include        "atlstd.h"

BOOL streql(str1,str2)
    char    *str1,*str2;
    {
     return (str1 == str2);
    }
```

```c
strlen(str)
        register char str[];
        {
         register int i;

i = 0;
         while (str[i] != '\0')
                ++i;
         return(i);
        }
        #include "[nangle.  t.build]atlstc.h"

static char DEL = 0x7F;
static char BS = 0x08;
static char SP = 0x20;
static char lf = LF;

int getline(port,line,lineptr,echo,parity)
        char *line;
        int port,*lineptr,echo,parity;
        {
         register char c,*linepos;
         char ch;
         register int loopmax;

c = EOL;
         *lineptr = 0;
         linepos = line;
         loopmax = line + MAXLINE-1;
         while (linepos < loopmax)
                {
                  sc_get(port,&ch,1);
                  c = ch;
                  if (parity==0) c = ch &= 0x7f; /*remove parity bit*/
                  if (echo==1)
                     then if(c != DEL) sc_put(port,&ch,1);
                     else {
                             linepos = max(linepos - 1,line);
                             sc_put(port,&BS,1);
                             sc_put(port,&SP,1);
                             sc_put(port,&BS,1);
                          }
                  if (c == CR)
                      {
                        sc_put(port,&lf,1);
                        break;
                      }
                  if (c != DEL)
                      {
                        if ((c >= 'a') & (c <= 'z'))
                             c &= 0xdf;          /*convert to uppercase*/
                        *linepos++ = c;
                      }
                }
         *linepos = EOL;
         return(linepos - line);
        }
        #include "[nangle.net.build]atlstd.h"

int lex(token,line,lineptr)
        register char *token;
        char *line;
        int *lineptr;
        {
         register int maxloc;
         register char *chpos;
         int    ltoken;

chpos = line + *lineptr;
         maxloc = chpos + MAXTOKEN;
         for(; (*chpos != EOL) && ((*chpos==' ') || (*chpos == '\t')); chpos++);
         while((chpos<maxloc)&&(*chpos!=' ')&&(*chpos!='\t')&&(*chpos!=EOL))
                *token++ = *chpos++;
         *token = EOL;
         ltoken = chpos - line - *lineptr;
         *lineptr = chpos - line;
         return(ltoken);
    }
```

```
#include "[nangle.net.build]atlncp.h"

int putstr(port,s1,s2)
    int port;
    char *s1,*s2;
    { char c;
      c = CR;
      for(; *s1!='\0'; s1++)
         { sc_put(port,s1,1);
           if (*s1=='\n') sc_put(port,&c,1);
         }
    } include "[nangle.net.build]atlncp.h"
include "[nangle.net.build]atltel.h"

/*******************************************************************/
/*                                                                 */
/*     Phone Directory                                             */
/*                                                                 */
/*******************************************************************/
PHONE_INFO directory[DIRSIZE+1] =
         {{"AETNA",   "3660400",0x01010:+f.0,0,0},
          {"WOO",     "8770726",0x01010.-e.0,0,0},
          {"ELION",   "3660000",0x01010:+f.0,0,0},
          {"BARR",    "8778843",0x01010:-c.0,0,0},
          {"NANGLE",  "4842368",0x01010:-c,0,0,0},
          {"TOURNAS", "4784685",0x01010 +5,0,0,0},
          {'\0',      '\0',     0,        0,0,0}
         };

/*******************************************************************/
/*                                                                 */
/*     Telephone Handling Interface                                */
/*                                                                 */
/*******************************************************************/
char *phonebase = 0xfe6000,    /*phone base address*/
     *out1a    = 0xfe6003,    /*double buffered output FIFOs*/
     *out1b    = 0xfe6009,
     *in1a     = 0xfe6005,    /*double buffered input FIFOs*/
     *in1b     = 0xfe600b;

char *cr1tone  = 0xfe6013,    /*tone generator control register*/
     *tone1buf = 0xfe600f,    /*ascii character representing a tone*/
     *cr1phone = 0xfe6011,    /*phone control register*/
     *stat1phone= 0xfe6007;   /*phone status register*/
/*******************************************************************/
/*                                                                 */
/*     Second Phone Control is offset 32 (20 hex) from First       */
/*     *** Not currently used                                      */
/*******************************************************************/
char *out2a    = 0xfe6023,    /*double buffered output FIFOs*/
     *out2b    = 0xfe6029,
     *in2a     = 0xfe6025,    /*double buffered input FIFOs*/
     *in2b     = 0xfe602b;

char *cr2tone  = 0xfe6033,    /*tone generator control register*/
     *tone2buf = 0xfe602f,    /*ascii character representing a tone*/
     *cr2phone = 0xfe6031,    /*phone control register*/
     *stat2phone= 0xfe6027;   /*phone status register*/
/*******************************************************************/
/*                                                                 */
/*     Fiber Controls                                              */
/*                                                                 */
/*******************************************************************/
char *statfiber = 0xfe6015,   /*fiber status register*/
     *txfiber   = 0xfe6017,   /*fiber transmit FIFO buffer*/
     *rxfiber   = 0xfe6019,   /*fiber receive FIFO buffer*/
     *txctrfiber= 0xfe601b,   /*fiber transmit byte counter*/
     *rxctrfiber= 0xfe601d,   /*fiber receive byte counter*/
     *cr1fiber  = 0xfe601f;   /*fiber tx control register*/
     *cr2fiber  = 0xfe6013;   /*fiber rx control register*/
/*******************************************************************/
/*                                                                 */
/*     Telephone Buffers                                           */
/*                                                                 */
/*******************************************************************/
```

```
BODY bodyin [PHONES]=bodyread;
BODY bodyout[PHONES]=bodywrite;
char bodyread [PHONES][FIFOLEN]={'\0'};
char bodywrite[PHONES][FIFOLEN]={'\0'};
char *digits = -1;
/*******************************************************************/
/*                                                                 */
/*      Tone Valid Interrupt Routine                               */
/*                                                                 */
/*******************************************************************/
tonevld()
      { register int i;
        int message,error;
        for (i=0; i<PHONES; i++)
            { if ((*(stat1phone+(i<<5))&TONEVALID) == TONEVALID)
                  { *(cr1tone+(i<<5)) = TONELISTEN;
                    *(stat1phone+(i<<5)) |= TONEVALID;
                    message = *(tone1buf+(i<<5));
                    uiqmsg(255-i,message,&error);
                  }
            }
      }
/*******************************************************************/
/*                                                                 */
/*      Hook ON/OFF Interrupt Routine                              */
/*                                                                 */
/*******************************************************************/
hook()
 {register int offset,j;
  register char *ptr;
  PHONE_INFO *dirptr;
  int i,error;
  extern PHONE_INFO directory[];
  for (i=0; i<PHONES; i++)
    {offset=i<<5;
     dirptr = directory+i;
     if (((*(stat1phone+(offset))&HOOKOFF) == HOOKOFF)
          {*(stat1phone+(offset)) != HOOKOFF;
           dirptr->busy = 1;
           ptr=out1a+(offset);
           for (j=0; j<FIFOLEN; j++)
             { *ptr = FILLCHR;
             }
           ptr=out1b+(offset);
           for (j=0; j<FIFOLEN; j++)
             { *ptr = FILLCHR;
             }
           if ((dirptr->ringing) == 1)
               { /putstr(4,"\nAnswering local ring...",NULL);/
                 uiqmsg(255-i,ANSWER,&error);
                 /*if (error)0) no such queue*/
               }
           else { *(cr1tone+(offset)) = DIALTONE;
                }
          }
     else if ((*(stat1phone+offset)&HOOKON) == HOOKON)
          { *(cr1phone+(offset)) = 0x00; /*HOOK ON*/
            *(cr1tone+(offset)) = TONELISTEN;
            *(stat1phone+(offset)) |= HOOKON;
            *(cr1phone+(offset)) = DIGITIZING;
            *(cr1phone+(offset)) = DIGITIZING|MRESET;
            dirptr->busy = 0;
            dirptr->ringing = 0;
            uiqmsg(255-i,HANGUP,&error);
            /*if (error)0) no such queue*/
          }
    }
 }
/*******************************************************************/
/*                                                                 */
/*      Fiber EMPTY/FULL Interrupt Handler                         */
/*                                                                 */
/*******************************************************************/
fiber()
   {/*not yet implemented*/
    putstr(4,"\nFIBER INTERRUPT",NULL);
   }
```

```
/*******************************************************************/
/*                                                                 */
/*      Input FIFO A/B Full Interrupt Handler                      */
/*                                                                 */
/*******************************************************************/
fifoful()
        {int i,error,offset;
         extern BODY bodyin[],bodyout[];
         register char *phoneptr;
         register char *fifoptr,j;
         for (i=0; i<PHONES; i++)
                { offset = i<<5;
                  if ((*(stat1phone+(offset))&INAFULL) == INAFULL)
                        { *(stat1phone+(offset)) |= INAFULL;
                          fifoptr = in1a+(offset);
                          phoneptr = bodyin[i].bodyptr;
                          for (j=0; j<FIFOLEN; j++)
                                *(phoneptr++) = *fifoptr;
                          fifoptr = out1a+(offset);
                          phoneptr = bodyout[i].bodyptr;
                          for (j=0; j<FIFOLEN; j++)
                                *fifoptr = *(phoneptr++);
                          uiqmsg(255-i,A_FULL,&error);
                        }
                  else if ((*(stat1phone+offset)&INBFULL) == INBFULL)
                        { *(stat1phone+(offset)) |= INBFULL;
                          fifoptr = in1b+(offset);
                          phoneptr = bodyin[i].bodyptr;
                          for (j=0; j<FIFOLEN; j++)
                                *(phoneptr++) = *fifoptr;
                          fifoptr = out1b+(offset);
                          phoneptr = bodyout[i].bodyptr;
                          for (j=0; j<FIFOLEN; j++)
                                *fifoptr = *(phoneptr++);
                          uiqmsg(255-i,B_FULL,&error);
                        }
                }
        }
        #include [nangle.net.build]atlncp.h"

mod6850(port)
        int     port;
        {char   *cr;
         P_CONTRLOLLER ptr;

cr = ptr->base + 1;
         mask = ptr->nbits + ptr->parity + ptr->stopbits + ptr->linespeed;
         *cr = mask;
        }
        #include "[nangle.net.build]atlips.h"

/*******************************************************************/
/*                                                                 */
/*      M68000 Trap and Interrupt Routines                         */
/*                                                                 */
/*******************************************************************/
BCB rcb[PORTS]={0},             /*receive buffer control blocks */
    tbcb[PORTS]={0};            /*transmit buffer control blocks*/
char rbuf[PORTS][BUFMAX]=" ",   /*receive buffers for 4 ports */
     tbuf[PORTS][BUFMAX]=" ";   /*transmit buffers for 4 ports*/
/*******************************************************************/
/*                                                                 */
/*      M68000 Trap #1 Routine Inputs a Character                  */
/*              to a Selected Signetics 2661 port                  */
/*                                                                 */
/*******************************************************************/
char trap1(portid,tcbid,tcbuffer,length)
        int portid,tcbid,length;
        char *tcbuffer;
        {
         int error,message;
         register BCB *bcbptr;
         extern disable(),rte(),p_susp(),uiqmsg();
         extern char *cr2661,*cr6850;
```

```
        disable();

if (portid==MONITOR)
            *cr6850 = 0xb5;                         /*enable 6850 for I/O*/
        else *(cr2661+(portid<<3)) != 0x05;  /*enable 2661 for I/O*/ bcbptr=rbcb+portid;
        if ((*bcbptr).len>0)
            {*tcbuffer=rbuf[portid][(*bcbptr).start];
             (*bcbptr).start = ((*bcbptr).start+1)&((*bcbptr).bufmax);
             (*bcbptr).len--;
             rte();
            }
        else {p_susp(tcbid,&error);
              message=(tcbid<<24) | (int)((int)tcbuffer&0x00ffffff);
              uiqmsg(portid,message,&error);
              rte();
             }
     }
/*******************************************************************/
/*                                                                 */
/*    M68000 Trap #2 Routine Outputs a Character                   */
/*                      to a Selected Signetics 2661 port          */
/*                                                                 */
/*******************************************************************/
char trap2(portid,tcbid,tcbuffer,length)
    int portid,tcbid,length;
    char *tcbuffer;
    { int error,message;
      register BCB *bcbptr;
      extern disable(),rte(),p_susp(),uiqmsg();
      extern char *stat2661,*tbuf2661,*cr2661;
      extern char *stat6850,*tbuf6850,*cr6850;

disable();
      bcbptr=tbcb+portid;
  if(portid==MONITOR)
      { *cr6850 = 0xb5; /*enable Rdy lines on Motorola 6850*/
        if ((*stat6850&0x02)==0x02)
            { if (bcbptr->len==0)
                {
                 *tbuf6850 = *tcbuffer;
                 rte();
                }
            else { *tbuf6850=tbuf[portid][bcbptr->start];
                   bcbptr->start=((bcbptr->start+1)&(bcbptr->bufmax));
                   tbuf[portid][bcbptr->next]= *tcbuffer;
                   bcbptr->next=((bcbptr->next+1)&(bcbptr->bufmax));
                   rte();
                 }
            }
        else if (bcbptr->len )= bcbptr->bufmax)
                { p_susp(tcbid,&error);
                  /*if (error)0) error, no such task id*/
                  message=(tcbid<<24) (int)((int)tcbuffer&0x00ffffff);
                  uiqmsg(portid+PORTS,message,&error);
                  rte();
                }
             else { tbuf[portid][bcbptr->next]= *tcbuffer;
                    bcbptr->next=((bcbptr->next+1)&(bcbptr->bufmax));
                    (bcbptr->len)++;
                    rte();
                  }
      }
  else { *(cr2661+(portid<<3)) != 0x01; /*enable TxRdy line on Signetics 2661*/
         if ((*(stat2661+(portid<<3))&0x01)==0x01)
            { if (bcbptr->len==0)
                {
                 *(tbuf2661+(portid<<3)) = *tcbuffer;
                 rte();
                }
             else { *(tbuf2661+(portid<<3))=tbuf[portid][bcbptr->start];
                    bcbptr->start=((bcbptr->start+1)&(bcbptr->bufmax));
                    tbuf[portid][bcbptr->next]= *tcbuffer;
                    bcbptr->next=((bcbptr->next+1)&(bcbptr->bufmax));
                    rte();
                  }
```

```
              }
      else if (bcbptr->len )= bcbptr->bufmax)
              { p_susp(tcbid,&error);
                /*if (error)0) error, no such task id*/
                message=(tcbid<<(24)|(int)((int)tcbuffer&0x00ffffff);
                uiqmsg(portid+PORTS,message,&error);
                rte();
              }
          else { tbuf[portid][bcbptr->next]= *tcbuffer;
                 bcbptr->next=((bcbptr->next+1)&(bcbptr->bufmax));
                 (bcbptr->len)++;
                 rte();
               } .
      }
  }
/************************************************************/
/*                                                          */
/*    c2661() Called from int2661 (assemble language)       */
/*            to process Signetics 2661 interrupts          */
/*                                                          */
/************************************************************/
c2661()
{ char teststat,*tcbuffer;
  register BCB *bcbptr;
  int port,error,message,taskid;
  extern p_res(),qaccept();
  extern char *stat2661,*rbuf2661,*tbuf2661,*cr2661;

for(port=0; port<4; ++port)
  { teststat = *(stat2661+(port<<(3))&0x02;
    if (teststat==0x02) /*receiver ready*/
        { qaccept(port,&message,&error);
          if (error==0) /*message found*/
              { taskid = (message)>24)&0x000000ff;
                tcbuffer = message&0x00ffffff;
                *tcbuffer = *(rbuf2661+(port<<(3));
                p_res(taskid,&error);
                /*if (error>0) error, no such task id*/
              }
          else { bcbptr=rbcb+port;
                 if(bcbptr->len)=(bcbptr->bufmax-TXDELAY))
                     { /*send x-off ctrl s 0x13*/
                       /*shut down receive port*/
                       *(cr2661+(port<<(3)) &= 0xfd;
                     }
                 rbuf[port][bcbptr->next]= *(rbuf2661+(port<<(3));
                 bcbptr->next=((bcbptr->next+1)&(bcbptr->bufmax));
                 (bcbptr->len)++;
               }
        }
  }
  for(port=0; port<4; ++port)
  { teststat = *(stat2661+(port<<(3))&0x01;
    if (teststat==0x01) /*transmitter ready*/
        { bcbptr=tbcb+port;
          if (bcbptr->len>0)
              { *(tbuf2661+(port<<(3))=tbuf[port][bcbptr->start];
                if (bcbptr->len )= bcbptr->bufmax)
                    { qaccept(port+PORTS,&message,&error);
                      if (error=0) /*message found*/
                          { taskid=(message))24)&0x000000ff;
                            tcbuffer=message&0x00ffffff;
                            tbuf[port][bcbptr->start]=
                                            *tcbuffer;
                            bcbptr->start=((bcbptr->start+1)&
                                              (bcbptr->bufmax));
                            bcbptr->next=((bcbptr->next+1)&
                                              (bcbptr->bufmax));
                            p_res(taskid,&error);
                            /*if (error)0) error, no such taskid*/
                          }
                      else { (bcbptr->len)--;
                             bcbptr->start=((bcbptr->start+1)&
                                              (bcbptr->bufmax));
                           }
```

```
                }
          else { bcbptr->start=((bcbptr->start+1)&(bcbptr->bufmax));
                (bcbptr->len)--;
                }
          }
     else *(cr2661+(port<<3)) &= 0xfe;/*else reset TxRdy interrupt*/
     }
}
}

/****************************************************************/
/*                                                              */
/*     c6850() Called from int6850 (assemble language)          */
/*             to process Motorola 6850 interrupts              */
/*                                                              */
/****************************************************************/
c6850()
    { char teststat,*tcbuffer;
      register BCB *bcbptr;
      int error,message,taskid;
      extern p_res(),qaccept();
      extern char *stat6850,*rbuf6850,*tbuf6850,*cr6850;

*cr6850 = 0xb5;  /*enable Rdy lines in 6850*/
      teststat = *stat6850;
      if ((teststat&0x01)==0x01) /*receiver ready*/
          { qaccept(MONITOR,&message,&error);
            if (error==0) /*message found*/
                 { taskid = (message)>>24)&0x000000ff;
                   tcbuffer = message&0x00ffffff;
                   *tcbuffer = *rbuf6850;
                   p_res(taskid,&error);
                   /*if (error>0) error, no such task id*/
                 }
            else { bcbptr=rbcb+MONITOR;
                   if(bcbptr->len)=(bcbptr->bufmax-TXDELAY))
                         { /*send x-off ctrl s 0x13*/
                           /*shut down receive port*/
                           *cr6850 = 0x35;
                         }
                   rbuf[MONITOR][bcbptr->next]= *rbuf6850;
                   bcbptr->next=((bcbptr->next+1)&(bcbptr->bufmax));
                   (bcbptr->len)++;
                   }
           }.

if ((teststat&0x02)==0x02) /*transmitter ready*/
          { bcbptr=tbcb+MONITOR;
            if (bcbptr->len>0)
                { *tbuf6850=tbuf[MONITOR][bcbptr->start];
                  if (bcbptr->len )= bcbptr->bufmax)
                      { qaccept(MONITOR+PORTS,&message,&error);
                        if (error=0) /*message found*/
                            { taskid=(message)>>24)&0x000000ff;
                              tcbuffer=message&0x00ffffff;
                              tbuf[MONITOR][bcbptr->start]=
                                              *tcbuffer;
                              bcbptr->start=((bcbptr->start+1)&
                                              (bcbptr->bufmax));
                              bcbptr->next=((bcbptr->next+1)&
                                              (bcbptr->bufmax));
                              p_res(taskid,&error);
                              /*if (error>0) error, no such taskid*/
                            }
                        else { (bcbptr->len)--;
                               bcbptr->start=((bcbptr->start+1)&
                                              (bcbptr->bufmax));
                             }
                      }
                 else { bcbptr->start=((bcbptr->start+1)&(bcbptr->bufmax));
                        (bcbptr->)len)--;
                      }
           else *cr6850 = 0x95;/*else reset TxRdy interrupt*/
           }
}
```

```
#include        "[nangle.r .build]atlstd.h"

int     FREEMEM = NULL;
int     HIGHMEM = NULL;

typedef struct  {char   *trash;
                 int    size;
                } collection;
static  collection garbage[1000] = 0;

mem_alloc(ptr,size,error)
        char    *ptr;
        int size;
        int     error[];
        {
        int *intptr,memerr;
        register int trashidx,contig,reqsize;
        char *nxtblk;
        extern int FREEMEM;
        extern unsigned short int  MBLKSZ;
        extern collection garbage[];

p_lock();
        trashidx = -1;
alloc:
        a_mem(ptr,error+OSERR);
        intptr = ptr;
        nxtblk = contig = *intptr;
        garbage[++trashidx].trash = nxtblk;
        garbage[trashidx].size = MBLKSZ;
        reqsize = size;
        while ((reqsize -= MBLKSZ) ) 0 && (error[OSERR] == RET_OK))
                {
                a_mem(&nxtblk,error+OSERR);
                contig += MBLKSZ;
                garbage[trashidx].size += MBLKSZ;
                if (nxtblk != contig)
                        goto alloc;
                }
        for (contig = 0; contig < trashidx; ++contig)
                mem_free(&garbage[contig].trash,garbage[contig].size,&memerr);
        FREEMEM = max(FREEMEM,nxtblk+MBLKSZ);
        p_unloc();
        } mem_free(ptr,size,error)
        char    *ptr;
        register int size;
        register int error[];

{
        char *nxtblk;
        register int fudge;
        int *intptr;
        extern unsigned short int MBLKSZ;

fudge = size % MBLKSZ;
        if (fudge > 0)
                size += (MBLKSZ - fudge);
        intptr = ptr;
        nxtblk = *intptr + size;
        error[OSERR] = RET_OK;
        while ((size -= MBLKSZ) >= 0 && error[OSERR] == RET_OK)
                {
                nxtblk -= MBLKSZ;
                f_mem(&nxtblk,error+OSERR);
                }
        }
include        "atlstd.h"

typedef struct map      {char   *adcr;
                         ULINT  size;
                         int    buddy;
                        }memmap, *p_memmap.
```

```
static struct map maptbl[32] = {0};

mem_alloc(ptr,size,error)
        char    *ptr;
        int     size;
        int     error[];
        {
         register int index,blksize;
         int buddysize;
         register p_memmap fast;

blksize = size;
         for (fast = &maptbl; blksize > 0; fast++)
                 blksize >>= 1;
         while(fast->addr == NULL)
                 fast++;
         buddysize = fast->size << 1;
         *ptr = fast->addr;
         if (buddysize >= size)
                {
                    (fast - 1)->buddy = fast->buddy;
                    fast->addr = *ptr + buddysize;
                    fast->size = buddysize;
                }
        } mem_free(ptr,error)
        register char   *ptr;
        int error[];

{
         register int buddysize;
         register p_memmap fast;

for (fast = &maptbl; ptr != fast->addr; fast++);
         buddysize = fast->size;
         while (fast->buddy != NULL)
                {
                  fast->addr = NULL;
                  (fast++)->buddy = NULL;
                  fast->size = buddysize <<= 1;
                }
        }
```

```
VAX/VMS    NANGLE      ATLRTX 25-AUG-1983 10:51    TTA6: 25-AUG-1983 11:22    SYS:[N-
VAX/VMS    NANGLE      ATLRTX 25-AUG-1983 10:51    TTA6: 25-AUG-1983 11:22    SYS:[N-
VAX/VMS    NANGLE      ATLRTX 25-AUG-1983 10:51    TTA6: 25-AUG-1983 11:22    SYS:[N-

N   N   AAA    N    N    GGGG    L         EEEEE
                       N   N   A A    N    N    G       L         E
                      NN   N   A A    NN   N    G       L         E
                      N N  N   A A    N N  N    G       L         EEEE
                      N   NN   AAAAA  N  N N    G GGG   L         E
                      N    N   A   A  N    N    G   G   L         E
                      N    N   A   A  N    N    GGG     LLLLL     EEEEE

AAAAAA       TTTTTTTTT    LL          RRRRRRRR    TTTTTTTTT    XX      XX
   AAAAAA       TTTTTTTTT    LL          RRRRRRRR    TTTTTTTTT    XX      XX
   AA    AA        TT        LL          RR    RR       TT        XX      XX
   AA    AA        TT        LL          RR    RR       TT        XX      XX
   AA    AA        TT        LL          RR    RR       TT         XX   XX
   AA    AA        TT        LL          RR    RR       TT          XX XX
   AA    AA        TT        LL          RRRRRRRR       TT           XX
   AA    AA        TT        LL          RRRRRRRR       TT           XX
   AAAAAAAAA       TT        LL          RR    RR       TT          XX XX
   AAAAAAAAA       TT        LL          RR    RR       TT         XX   XX
   AA    AA        TT        LL          RR    RR       TT        XX      XX
   AA    AA        TT        LL          RR    RR       TT        XX      XX
   AA    AA        TT        LLLLLLLLL   RR    RR       TT        XX      XX
   AA    AA        TT        LLLLLLLLL   RR    RR       TT        XX      XX
```

```
           SSSSSSSS         ;;;;          11
           SSSSSSSS         ;;;;          11
        SS                  ;;;;        1111
        SS                  ;;;;        1111
        SS                                11
        SS                                11
           SSSSSS           ;;;;          11
           SSSSSS           ;;;;          11
                 SS         ;;;;          11
                 SS         ;;;;          11
                 SS          ;;            11
                 SS          ;;            11
        SSSSSSSS             ;;          111111
        SSSSSSSS             ;;          111111

N   N   AAA    N   N    GGGG   L      EEEEE
              N   N   A  A   N   N   G       L      E
              NN  N   A  A   NN  N   G       L      E
              N N N   A  A   N N N   G       L      EEEE
              N  NN   AAAAA  N  NN   G GGG   L      E
              N   N   A  A   N   N   G   G   L      E
              N   N   A  A   N   N    GGG    LLLLL  EEEEE

VAX/VMS   NANGLE      ATLRTX 25-AUG-1983 10:51    TTA6: 25-AUG-1983 11:22    SYS:[N-
VAX/VMS   NANGLE      ATLRTX 25-AUG-1983 10:51    TTA6: 25-AUG-1983 11:22    SYS:[N-
VAX/VMS   NANGLE      ATLRTX 25-AUG-1983 10:51    TTA6: 25-AUG-1983 11:22    SYS:[N-

***
*
*       see VRTX manual for further description, error returns, etc.
*
***
arg1 =   8
arg2 =  12
arg3 =  16
arg4 =  20
arg5 =  24
arg6 =  28
***
*
*       p_create(name, pic, pri, &error)
*
***
.globl _p_creat,_p_del,_p_susp,_p_res,_p_inq,_p_inq
.globl _p_lock,_p_unloc,_a_mem,_f_mem,_p_smsg,_p_wmsg,_p_amsg
.globl _settime,_gettime,_timeslu,_ui_time
.globl _ui_post,_uiqmsg,_p_qmsg,_caccept,_c_wmsg,_inicue
.globl _TIMER
.text
.even _p_creat:
             link     a6,#0            * 'c' stack frame convention
             movem.l  d0-d2/a0/a5,-(sp)   * save registers
             sub.l    d0,d0
             move.l   arg3(a6),d1      * priority (0-255)
             move.l   arg2(a6),d2      * id# (0-255)
             move.l   arg1(a6),a0      * start address
             move.l   arg4(a6),a5      * return code
             trap     #0               * do it
             dc.w     0x0000           * ...
             move.l   d0,(a5)          * set return code
             movem.l  (sp)+,d0-d2/a0/a5   * restore registers
             unlk     a6
             rts                       * and return
***
*
*       p_del(arg,&error)
*
***
.even
```

```
_p_cel:
                link     a6,#0               * 'c' stack frame convention
                movem.l  d1/d0/a5,-(sp)      * save registers
                sub.l    d0,d0
                move.l   arg1(a6),d1         * id# or priority
                move.l   arg2(a6),a5         * return code
                trap     #0                  * do it
                dc.w     0x0001              * ...
                move.l   d0,(a5)             * set return code
                movem.l  (sp)+,d1/d0/a5      * restore registers
                unlk     a6
                rts                          * and return
***
*
*       p_susp(arg,&error)
*
***
.even
_p_susp:
                link     a6,#0               * 'c' stack frame convention
                movem.l  d1/d0/a5,-(sp)      * save registers
                sub.l    d0,d0
                move.l   arg1(a6),d1         * id# or priority
                move.l   arg2(a6),a5         * return code
                trap     #0                  * do it
                dc.w     0x0002              * ...
                move.l   d0,(a5)             * set return code
                movem.l  (sp)+,d1/d0/a5      * restore registers
                unlk     a6
                rts                          * and return
***
*
*       p_res(arg,&error)
*
***
.even
_p_res:
                link     a6,#0               * 'c' stack frame convention
                movem.l  d1/d0/a5,-(sp)      * save registers
                sub.l    d0,d0
                move.l   arg1(a6),d1         * id# or priority
                move.l   arg2(a6),a5         * return code
                trap     #0                  * do it
                dc.w     0x0003              * ...
                move.l   d0,(a5)             * set return code
                movem.l  (sp)+,d1/d0/a5      * restore registers
                unlk     a6
                rts                          * and return
***
*
*       p_pri(pid,pri,&error)
*
***
.even
_p_pri:
                link     a6,#0               * 'c' stack frame convention
                movem.l  d0-d2/a5,-(sp)      * save registers
                sub.l    d0,d0
                move.l   arg1(a6),d1         * id# (0-255)
                move.l   arg2(a6),d2         * new priority
                move.l   arg3(a6),a5
                trap     #0                  * do it
                dc.w     0x0004              * ...
                move.l   d0,(a5)             * set return code
                movem.l  (sp)+,d0-d2/a5      * restore registers
                unlk     a6
                rts                          * and return
***
*
*       p_inq(pid,pinfo)
*
***
.even
```

```
_p_inq:
            link     a6,#0              * 'c' stack frame convention
            movem.l  d0-d3/a5,-(sp)     * save registers
            move.l   arg1(a6),d1        * id# (0 = self)
            move.l   arg2(a6),a5        * return code
            trap     #0                 * do it
            dc.w     0x0005
            move.b   d0,(a5)+           * set return code
            move.b   d1,(a5)+           * id #
            move.b   d2,(a5)+           * priority
            move.b   d3,(a5)            * status
            movem.l  (sp)+,d0-d3/a5     * restore registers
            unlk     a6
            rts                         * and return
***
*
*       p_lock()
*
***
.even
_p_lock:
            link     a6,#0              * 'c' stack frame convention
            move.l   d0,-(sp)           * save registers
            sub.l    d0,d0
            trap     #0                 * do it
            dc.w     0x0020
            move.l   (sp)+,d0           * restore registers
            unlk     a6
            rts                         * and return
***
*
*       p_unloc()
*
***
.even
_p_unloc:
            link     a6,#0              * 'c' stack frame convention
            move.l   d0,-(sp)           * save registers
            sub.l    d0,d0
            trap     #0                 * do it
            dc.w     0x0021
            move.l   (sp)+,d0           * restore registers
            unlk     a6
            rts                         * and return
***
*
*       a_mem(&block,&error)
*
***
.even
_a_mem:
            link     a6,#0              * 'c' stack frame convention
            movem.l  d1/d0/a0/a4/a5,-(sp)  * save registers
            sub.l    d0,d0
            sub.l    d1,d1              * for vrtx v.2 compatibility
            move.l   arg1(a6),a4        * mem addr ptr
            move.l   arg2(a6),a5        * error addr
            trap     #0                 * do it
            dc.w     0x0006
            move.l   a0,(a4)            * return address of memory block
            move.l   d0,(a5)            * set error
            movem.l  (sp)+,d1/d0/a0/a4/a5  * restore registers
            unlk     a6
            rts                         * and return
***
*
*       f_mem(&block,&error)
*
***
.even
_f_mem:
            link     a6,#0              * 'c' stack frame convention
            movem.l  d1/d0/a0/a5,-(sp)     * save registers
```

```
            sub.l    d0,d0
            sub.l    d1,d1           * for vrtx v.2 compatibility
            move.l   arg1(a6),a0     * memory block ptr
            move.l   (a0),a0         * memory location
            move.l   arg2(a6),a5     * address of error
            trap     #0              * do it
            dc.w     0x0007
            move.l   d0,(a5)         * set return code
            movem.l  (sp)+,d1/d0/a5/a0    * restore registers
            unlk     a6
            rts                      * and return
***
*
*           p_smsg(&mailbox,&message,&error)
*
***
.even
_p_smsg:
            link     a6,#0           * 'c' stack frame convention
            movem.l  d1/d0/a5/a0,-(sp)    * save registers
            sub.l    d0,d0
            move.l   arg1(a6),a0     * mailbox address
            move.l   arg2(a6),d1     * message
            move.l   arg3(a6),a5     * error
            trap     #0              * do it
            dc.w     0x0008
            move.l   d0,(a5)         * set return code
            movem.l  (sp)+,d1/d0/a5/a0    * restore registers
            unlk     a6
            rts                      * and return
***
*
*           p_wmsg(&mailbox,&message,&error)
*
***
.even
_p_wmsg:
            link     a6,#0           * 'c' stack frame convention
            movem.l  d1/d0/a5/a1/a0,-(sp) * save registers
            sub.l    d0,d0
            sub.l    d1,d1           * for vertx v.2 compatibility
            move.l   arg1(a6),a0     * mailbox
            move.l   arg2(a6),a1     * msg address
            move.l   arg3(a6),a5     * error
            trap     #0              * do it
            dc.w     0x0009
            move.l   d1,(a1)         * return the message
            move.l   d0,(a5)         * set return code
            movem.l  (sp)+,d1/d0/a5/a1/a0 * restore registers
            unlk     a6
            rts                      * and return
***
*
*           p_amsg(&mailbox,&message,&error)
*
***
.even
_p_amsg:
            link     a6,#0           * 'c' stack frame convention
            movem.l  d1/d0/a5/a1/a0,-(sp) * save registers
            sub.l    d0,d0
            move.l   arg1(a6),a0     * mailbox address
            move.l   arg2(a6),a1     * msg addr
            move.l   arg3(a6),a5     * error
            trap     #0              * do it
            dc.w     0x0025
            move.l   d1,(a1)         * message (if call successful)
            move.l   d0,(a5)         * set return code
            movem.l  (sp)+,d1/d0/a5/a1/a0 * restore registers
            unlk     a6
            rts                      * and return
***
*
*           gettime();
*
```

```
***
        .even
_gettime:       link        a6,#0
                movem.l     d1/d0,-(sp)
                trap        #0              * call VRTX
                dc.w        0x000A
                move.l      d1,d7           * return 32 bit time value
                movem.l     (sp)+,d1/d0
                unlk        a6
                rts
***
*
*               settime(timeout);
*
***
        .even
_settime:       link        a6,#0
                movem.l     d1/d0,-(sp)
                move.l      arg1(a6),d1     * get counter value
                trap        #0              * pass it to VRTX
                dc.w        0x000B
                movem.l     (sp)+,d1/d0
                unlk        a6
                rts
***
*
*               timeslice(interval);
*
***
        .even
_timesli:       link        a6,#0
                movem.l     d1/d0,-(sp)
                move.l      arg1(a6),d1     * get interval value
                trap        #0              * pass it to VRTX
                dc.w        0x0015
                movem.l     (sp)+,d1/d0
                unlk        a6
                rts
****************************************************************
*                                                               *
*       p_qmsg(queueid,message,error)                           *
*                                                               *
****************************************************************
        .text
        .even
_p_qmsg:   link       a6,#0           *stack frame convention for 'c'
           movem.l    d0-d3,-(sp)     *save registers on system stack
           move.l     arg1(a6),d1     *queue id
           move.l     arg2(a6),d2     *message contents
           trap       #0              *sc_qpost
           dc.w       0x26
           move.l     d0,arg3(a6)     *return error code
           movem.l    (sp)+,d0-d3     *restore registers
           unlk       a6              *unlink stack frame
           rts                        *return
****************************************************************
*                                                               *
*       VRTX Interrupt Routine Service Calls                    *
*                                                               *
****************************************************************
***
*
*               ui_timer();
*
***
        .even
_ui_time:
                movem.l     d0/a0,-(sp)
                move.l      _TIMER,a0       * fetch timer address
                move.b      #0x01,(a0)      * clear the interrupt
                move.b      #0x00,(a0)
                movem.l     (sp)+,d0/a0
                trap        #0
                dc.w        0x0012          * announce timer intrerupt
                rte
```

```
***
*
*               ui_post(&mailbox,&message,&error);
*
***
.even
_ui_post:
            link        a6,#0
            movem.l     d0/d1/a0/a5,-(sp)
            sub.l       d0,d0
            move.l      arg1(a6),a0        * mailbox address
            move.l      arg2(a6),d1        * message
            move.l      arg3(a6),a5        * error
            trap        #0                 * do it
            dc.w        0x0010
            move.l      d0,(a5)            * set return code
            movem.l     (sp)+,d0/d1/a0/a5             * restore registers
            unlk        a6
            rts
****************************************************************
*                                                               *
*       uiqmsg(queueid,message,error)                           *
*                                                              -*
****************************************************************
.text
.even
_uiqmsg:    link        a6,#0              *stack frame convention for 'c'
            movem.l     d0-d3,-(sp)        *save registers on system stack
            move.l      arg1(a6),d1        *queue id
            move.l      arg2(a6),d2        *message contents
            trap        #0                 *ui_qpost
            dc.w        0x24
            move.l      d0,arg3(a6)        *return error code
            movem.l     (sp)+,d0-d3        *restore registers
            unlk        a6                 *unlink stack frame
            rts                            *return
****************************************************************
*                                                               *
*       quaccept(portid,&message,&error)                        *
*                                                               *
****************************************************************
.even
_qaccept:   link        a6,#0              *stack frame convention for 'c'
            movem.l     d0-d2/a0,-(sp)     *save registers
            move.l      arg1(a6),d1        *d1 = queue id
            trap        #0                 *sc_qaccept
            dc.w        0x28
            move.l      arg2(a6),a0        *d2 = message from vrtx
            move.l      d2,(a0)            *return message to caller
            move.l      arg3(a6),a0        *d0 = error code
            move.l      d0,(a0)            *return error code to caller
            movem.l     (sp)+,d0-d2/a0     *restore registers
            unlk        a6                 *unlink stack frame
            rts                            *return
****************************************************************
*                                                               *
*       q_wmsg(queue_id,timeout,&message,&error)                *
*                                                               *
****************************************************************
.even
_q_wmsg:    link        a6,#0              *stack frame convention for 'c'
            movem.l     d0-d2/a0-a1,-(sp)  *save registers
            move.l      arg1(a6),d1        *queue_id
            move.l      arg2(a6),d2        *timeout value
            move.l      arg3(a6),a0        *message address
            move.l      arg4(a6),a1        *error address
            trap        #0                 *sc_qpend
            dc.w        0x27
            move.l      d2,(a0)            *return the message
            move.l      d0,(a1)            *return error code
            movem.l     (sp)+,d0-d2/a0-a1  *restore registers
            unlk        a6                 *unlink stack frame
            rts                            *return
```

```
****************************************************************
*                                                               *
*         inique(queue_id,queue_length,&error)                  *
*                                                               *
****************************************************************
        .even
_inique:    link    a6,#0              *stack frame convention for 'c'
            movem.l d0-d2/a0,-(sp)     *save registers
            move.l  arg1(a6),d1        *queue id
            move.l  arg2(a6),d2        *maximum queue length
            trap    #0                 *sc_qcreate
            dc.w    0x29
            move.l  arg3(a6),a0        *d0 = error code
            move.l  d0,(a0)            *return error code to caller
            movem.l (sp)+,d0-d2/a0     *restore registers
            unlk    a6                 *unlink stack frame
            rts                        *return

****************************************************************
*                                                               *
*       Initialization Routine                                  *
*       Triggered by reset or software interrupt                *
*                                                               *
****************************************************************
        8X305
        OBJ     R                ASCII HEX QUOTE FORMAT
        PROM    512,8,8
        LIST    A
        LIST    X
        PROG    INIT
ANET    RIV     062H             ADDRESS OF NET
ASNET   RIV     063H             ADDRESS OF SNET
ANODE   RIV     064H             ADDRESS OF NODE
ACLUS   RIV     065H             ADDRESS OF CLUSTER
        SEL     ANET             XMIT ADDRESS OF NET who am i
        MOVE    37H,0,01         NET -> r1
        SEL     ASNET            XMIT ADDRESS OF SNET who am i
        MOVE    37H,0,02         SNET -> r2
        SEL     ANODE            XMIT ADDRESS OF NODE who am i
        MOVE    37H,0,03         NODE -> r3
        SEL     ACLUS            XMIT ADDRESS OF CLUSTER who am i
        MOVE    37H,0,04         CLUSTER -> r4
        MOVE    4,4              CLEAR MASKS, ENABLE INTERRUPTS
MAIN    JMP     MAIN             MAIN PROGRAM (HEALTH CHECK)
        END     INIT

****************************************************************
*                                                               *
*     INT1 Interrupt Handler for Packet Ready at Level 2        *
*                                                               *
*         WHO AM I registers for Level 2 Clusters               *
*                                                               *
*              R1 = NET                                         *
*              R2 = SNET                                        *
*              R3 = NODE                                        *
*              R4 = CLUSTER                                     *
*                                                               *
*     NOTE: Masks are automatically enabled when an interrupt   *
*           routine is entered and cleared when a return is     *
*           executed                                            *
****************************************************************
        ORG     0
        8X305
        OBJ     R,H              ASCII HEX QUOTE FORMAT
        PROM    512,8,8
        LIST    A
        LIST    X
        PROG    LEVEL2
BYTECTR LIV     010H             ADDRESS OF BYTE COUNTER
UPSTAT  LIV     011H             ADDRESS OF UP STATUS REGISTER
DNSTAT  LIV     012H             ADDRESS OF DOWN STATUS REGISTER
CLUPHDR LIV     013H             ADDRESS OF CLUSTER PAGE HEADER
```

```
SRCFIFO  LIV    016H              ADDRESS OF SOURCE FIFO
DSTFIFO  LIV    017H              ADDRESS OF DESTINATION FIFO
INT1     SEL    UPSTAT            SELECT STATUS REGISTER
         MOVE   37H,0,11H         STATUS -> r11
         XEC    JMPTBL(11H)       STATUS IS 1,2,4,8
JMPTBL   JMP    DEV0              DEVICE 0
         JMP    DEV0              DEVICE 0
         JMP    DEV1              DEVICE 1
         JMP    DEV1              DEVICE 1
         JMP    DEV2              DEVICE 2
         JMP    DEV2              DEVICE 2
         JMP    DEV2              DEVICE 2
         JMP    DEV2              DEVICE 2
         JMP    DEV3              DEVICE 3
DEV0     XMIT   062H,IVR          ADDRESS OF NET DEVICE 0 DESTINATION
         MOVE   37H,0,05          NET -> r5
         XMIT   063H,IVR          ADDRESS OF SNET DEVICE 0 DESTINATION
         MOVE   37H,0,06          SNET -> r6
         XMIT   064H,IVR          ADDRESS OF NODE DEVICE 0 DESTINATION
         MOVE   37H,0,14H         NODE -> r14
         XMIT   065H,IVR          ADDRESS OF PID DEVICE 0 DESTINATION
         MOVE   37H,0,15H         PID -> r15
         SEL    SRCFIFO           ADDRESS OF SOURCE FIFO REGISTER ON 1b
         XMIT   00,27H            SET SOURCE TO ZERO
         JMP    TSTHDR            GO TO TEST HEADER SECTION
DEV1     XMIT   162H,IVR          ADDRESS OF NET DEVICE 1 DESTINATION
         MOVE   37H,0,05          NET -> r5
         XMIT   163H,IVR          ADDRESS OF SNET DEVICE 1 DESTINATION
         MOVE   37H,0,06          SNET -> r6
         XMIT   164H,IVR          ADDRESS OF NODE DEVICE 1 DESTINATION
         MOVE   37H,0,14H         NODE -> r14
         XMIT   165H,IVR          ADDRESS OF PID DEVICE 1 DESTINATION
         MOVE   37H,0,15H         PID -> r15
         SEL    SRCFIFO           ADDRESS OF SOURCE FIFO REGISTER ON 1b
         XMIT   01,27H            SET SOURCE TO ONE
         JMP    TSTHDR            GO TO TEST HEADER SECTION
DEV2     XMIT   262H,IVR          ADDRESS OF NET DEVICE 2 DESTINATION
         MOVE   37H,0,05          NET -> r5
         XMIT   263H,IVR          ADDRESS OF SNET DEVICE 2 DESTINATION
         MOVE   37H,0,06          SNET -> r6
         XMIT   264H,IVR          ADDRESS OF NODE DEVICE 2 DESTINATION
         MOVE   37H,0,14H         NODE -> r14
         XMIT   265H,IVR          ADDRESS OF PID DEVICE 2 DESTINATION
         MOVE   37H,0,15H         PID -> r15
         SEL    SRCFIFO           ADDRESS OF SOURCE FIFO REGISTER ON 1b
         XMIT   02,27H            SET SOURCE TO TWO
         JMP    TSTHDR            GO TO TEST HEADER SECTION
DEV3     XMIT   362H,IVR          ADDRESS OF NET DEVICE 3 DESTINATION
         MOVE   37H,0,05          NET -> r5
         XMIT   363H,IVR          ADDRESS OF SNET DEVICE 3 DESTINATION
         MOVE   37H,0,06          SNET -> r6
         XMIT   364H,IVR          ADDRESS OF NODE DEVICE 3 DESTINATION
         MOVE   37H,0,14H         NODE -> r14
         XMIT   365H,IVR          ADDRESS OF PID DEVICE 3 DESTINATION
         MOVE   37H,0,15H         PID -> r15
         SEL    SRCFIFO           ADDRESS OF SOURCE FIFO REGISTER ON 1b
         XMIT   03,27H            SET SOURCE TO THREE
         JMP    TSTHDR            GO TO TEST HEADER SECTION
****************************************************************
*                                                              *
*                      HEADER FORMAT                           *
*                                                              *
* 68000 view     net      snet     node     pid                *
*                                                              *
*              | 8 bits | 8 bits | 8 bits | 8 bits |           *
*              ---------------------------------------         *
*                                                              *
* 8x305 view     net      snet     node     cluster:pid offset *
*                                                              *
*              | 8 bits | 8 bits | 8 bits | 6 bits:2 bits |    *
*              ---------------------------------------         *
*                                                              *
****************************************************************
```

```
TSTHDR   MOVE   05,00              TEST NET
         XOR    01,00
         NZT    0,OUTLOW           OUTPUT TO LOWER LEVEL
         MOVE   06,00              TEST SNET
         XOR    02,00
         NZT    0,OUTLOW           OUTPUT TO LOWER LEVEL
         MOVE   14H,00             TEST NODE
         XOR    03,00
         NZT    0,OUTLOW           OUTPUT TO LOWER LEVEL
         XMIT   077H,00            CLUSTER MASK 077 (OCTAL) TO r0 (AUX)
         AND    15H(2),00          r15 RIGHT SHIFT 2 -> r0 (CLUSTER)
         XOR    04,00              TEST CLUSTER
         NZT    00,OUTLOW          OUTPUT TO LOWER LEVEL
         XMIT   003,00             PID MASK 003 (OCTAL) TO r0 (AUX)
         AND    15H,11H            ISOLATE PID OFFSET
         SEL    DSTFIFO            ADDRESS OF DESTINATION FIFO REG ON 1b
         MOVE   11H,27H            SET DESTINATION FROM r11
STARTX   SEL    BYTECTR            ADDRESS OF BYTE COUNTER
         XMIT   64,16H             LOAD BYTE COUNT 64 (DECIMAL) INTO r16
         MOVE   16H,27H            MOVE r16 INTO BYTE COUNTER TO START XFER
         MOVE   6,6                RET TO INTERRUPTED ROUTINE, ENABLE MASKS
OUTLOW   SEL    DNSTAT             ADDRESS OF dnstatus
         MOVE   20H,11H            MOVE STATUS TO r11
         XMIT   001,00             MASK TO TEST dn1 AVAILABLE
         AND    11H,00             TEST BIT 1
         NZT    00,DN1             TRANSMIT ON dn1
         XMIT   002,00             MASK TO TEST dn2 AVAILABLE
         AND    11H,00             TEST BIT 2
         NZT    00,DN2             TRANSMIT ON dn2
         JMP    OUTLOW             NO down FIFOS AVAIL. LOOP UNTIL AVAILABLE
DN1      SEL    DSTFIFO            ADDRESS OF DESTINATION FIFO REG ON 1b
         XMIT   04,27H             SET DEST TO 04 (dn1 LOWER LEVEL FIFO)
         JMP    STARTX             JUMP TO START XFER
DN2      SEL    DSTFIFO            ADDRESS OF DEST FIFO REGISTER ON 1b
         XMIT   05,27H             SET DEST TO 05 (dn2 LOWER LEVEL FIFO)
         JMP    STARTX             JUMP TO START XFER
         END    LEVEL2

****************************************************************
*                                                              *
*     INT1 Interrupt Handler for Packet Ready at Level 3       *
*                                                              *
*     NOTE  Masks are automatically enabled when an interrupt  *
*           routine is entered and cleared when a return is    *
*           executed                                           *
****************************************************************
         8X305
         OBJ    R,H                ASCII HEX QUOTE FORMAT
         PROM   512,8,8
         LIST   A
         LIST   X
         PROG   LEVEL3
BYTECTR  LIV    010H               ADDRESS OF BYTE COUNTER
UPSTAT   LIV    011H               ADDRESS OF UP STATUS REGISTER
DNSTAT   LIV    012H               ADDRESS OF DN STATUS REGISTER
CLUPHDR  LIV    013H               ADDRESS OF CLUSTER PAGE HEADER
SRCFIFO  LIV    016H               ADDRESS OF SOURCE FIFO
DSTFIFO  LIV    017H               ADDRESS OF DESTINATION FIFO
INT1     SEL    UPSTAT             ADDRESS OF STATUS REGISTER
         MOVE   37H,0,11H          STATUS -> r11
         XEC    JMPTBL(11H)        STATUS IS 1,2,4,8
JMPTBL   JMP    DEV0               DEVICE 0
         JMP    DEV0               DEVICE 0
         JMP    DEV1               DEVICE 1
         JMP    DEV1               DEVICE 1
         JMP    DEV2               DEVICE 2
         JMP    DEV2               DEVICE 2
         JMP    DEV2               DEVICE 2
         JMP    DEV2               DEVICE 2
         JMP    DEV3               DEVICE 3
DEV0     XMIT   062H,IVR           ADDRESS OF NET DEVICE 0 DESTINATION
         MOVE   37H,0,05           NET -> r5
```

```
         XMIT    063H, IVR       ADDRESS OF SNET DEVICE 0 DESTINATION
         MOVE    37H, 0, 06      SNET -> r6
         XMIT    064H, IVR       ADDRESS OF NODE DEVICE 0 DESTINATION
         MOVE    37H, 0, 14H     NODE -> r14
         XMIT    065H, IVR       ADDRESS OF PID DEVICE 0 DESTINATION
         MOVE    37H, 0, 15H     PID -> r15
         SEL     SRCFIFO         ADDRESS OF SOURCE FIFO REGISTER ON 1b
         XMIT    00, 27H         SET SOURCE TO ZERO
         JMP     TSTHDR          GO TO TEST HEADER SECTION
DEV1     XMIT    162H, IVR       ADDRESS OF NET DEVICE 1 DESTINATION
         MOVE    37H, 0, 05      NET -> r5
         XMIT    163H, IVR       ADDRESS OF SNET DEVICE 1 DESTINATION
         MOVE    37H, 0, 06      SNET -> r6
         XMIT    164H, IVR       ADDRESS OF NODE DEVICE 1 DESTINATION
         MOVE    37H, 0, 14H     NODE -> r14
         XMIT    165H, IVR       ADDRESS OF PID DEVICE 1 DESTINATION
         MOVE    37H, 0, 15H     PID -> r15
         SEL     SRCFIFO         ADDRESS OF SOURCE FIFO REGISTER ON 1b
         XMIT    01, 27H         SET SOURCE TO ONE
         JMP     TSTHDR          GO TO TEST HEADER SECTION
DEV2     XMIT    262H, IVR       ADDRESS OF NET DEVICE 2 DESTINATION
         MOVE    37H, 0, 05      NET -> r5
         XMIT    263H, IVR       ADDRESS OF SNET DEVICE 2 DESTINATION
         MOVE    37H, 0, 06      SNET -> r6
         XMIT    264H, IVR       ADDRESS OF NODE DEVICE 2 DESTINATION
         MOVE    37H, 0, 14H     NODE -> r14
         XMIT    265H, IVR       ADDRESS OF PID DEVICE 2 DESTINATION
         MOVE    37H, 0, 15H     PID -> r15
         SEL     SRCFIFO         ADDRESS OF SOURCE FIFO REGISTER ON 1b
         XMIT    02, 27H         SET SOURCE TO TWO
         JMP     TSTHDR          GO TO TEST HEADER SECTION
DEV3     XMIT    362H, IVR       ADDRESS OF NET DEVICE 3 DESTINATION
         MOVE    37H, 0, 05      NET -> r5
         XMIT    363H, IVR       ADDRESS OF SNET DEVICE 3 DESTINATION
         MOVE    37H, 0, 06      SNET -> r6
         XMIT    364H, IVR       ADDRESS OF NODE DEVICE 3 DESTINATION
         MOVE    37H, 0, 14H     NODE -> r14
         XMIT    365H, IVR       ADDRESS OF PID DEVICE 3 DESTINATION
         MOVE    37H, 0, 15H     PID -> r15
         SEL     SRCFIFO         ADDRESS OF SOURCE FIFO REGISTER ON 1b
         XMIT    03, 27H         SET SOURCE TO THREE
         JMP     TSTHDR          GO TO TEST HEADER SECTION
******************************************************************
*                                                                *
*                         HEADER FORMAT                          *
*                                                                *
* 68000 view      net      snet      node      pid               *
*                ----------------------------------------        *
*                | 8 bits | 8 bits | 8 bits | 8 bits |           *
*                ----------------------------------------        *
*                                                                *
* 8x305 view      net      snet      node      cluster:pid offset *
*                ----------------------------------------        *
*                | 8 bits | 8 bits | 8 bits | 6 bits:2 bits |    *
*                ----------------------------------------        *
*                                                                *
******************************************************************
TSTHDR   MOVE    05, 00          TEST NET
         XOR     01, 00
         NZT     0, OUTLOW       OUTPUT TO LOWER LEVEL
         MOVE    06, 00          TEST SNET
         XOR     02, 00
         NZT     0, OUTLOW       OUTPUT TO LOWER LEVEL
         MOVE    14H, 00         TEST NODE
         XOR     03, 00
         NZT     0, OUTLOW       OUTPUT TO LOWER LEVEL
         XMIT    077H, 00        CLUSTER MASK 077 (OCTAL) TO r0 (AUX)
         AND     15H(2), 00      r15 RIGHT SHIFT 2 -> r0 (CLUSTER)
         XOR     04, 00          TEST CLUSTER
         NZT     00, OUTLOW      OUTPUT TO LOWER LEVEL
         XMIT    003, 00         PID MASK 003 (OCTAL) TO r0 (AUX)
         AND     15H, 11H        ISOLATE PID OFFSET
```

```
                SEL     DSTFIFO         ADDRESS OF DESTINATION FIFO REG ON 1b
                MOVE    11H,27H         SET DESTINATION FROM r11
STARTX          SEL     BYTECTR         ADDRESS OF BYTE COUNTER
                XMIT    64,16H          LOAD BYTE COUNT 64 (DECIMAL) INTO r16
                MOVE    16H,27H         MOVE r16 INTO BYTE COUNTER TO START XFER
                MOVE    6,6             RET TO INTERRUPTED ROUTINE, ENABLE MASKS
OUTLOW          SEL     DNSTAT          ADDRESS OF dnstatus
                MOVE    20H,11H         MOVE STATUS TO r11
                XMIT    001,00          MASK TO TEST dn1 AVAILABLE
                AND     11H,00          TEST BIT 1
                NZT     00,DN1          TRANSMIT ON dn1
                XMIT    002,00          MASK TO TEST dn2 AVAILABLE
                AND     11H,00          TEST BIT 2
                NZT     00,DN2          TRANSMIT ON dn2
                JMP     OUTLOW          NO down FIFOS AVAIL. LOOP UNTIL AVAILABLE
DN1             SEL     DSTFIFO         ADDRESS OF DESTINATION FIFO REG ON 1b
                XMIT    04,27H          SET DEST TO 04 (dn1 LOWER LEVEL FIFO)
                JMP     STARTX          JUMP TO START XFER
DN2             SEL     DSTFIFO         ADDRESS OF DEST FIFO REGISTER ON 1b
                XMIT    05,27H          SET DEST TO 05 (dn2 LOWER LEVEL FIFO)
                JMP     STARTX          JUMP TO START XFER
                END     LEVEL3
```

What is claimed is:

1. A node structure for communication system comprising:
- a first level logical processor operative in response to indicia indicative of a desired communication recipient for generating routing indicia corresponding to a selected routing for communication to the desired recipient;
- one or more second level asynchronous logical processors connected to one or more sources of communication signals and responsive to the routing indicia from said first level logical processor for providing outgoing signals comprising communication signals from an associated source and header routing indicia from said first level logical processor; and
- one or more third level asynchronous logical processor responsive to said outgoing signals for routing said communication signals in accordance with the routing indicia, wherein said indicia indicative of a desired recipient comprises an interrupt signal from a source associated with a second level logical processor to said first level logical processor.

2. The node structure of claim 1 further including means for controlling said second level logical processor and associated source, said means providing said interrupt to said first level logical processor at a character rate of data transmission.

3. A node structure including:
- a first level logical processor operative in response to indicia indicative of a desired communication recipient for generating routing indicia corresponding to a selected routing for communication to the desired recipient;
- one or more second level asynchronous logical processors connected to one or more sources of communication signals and responsive to the routing indicia from said first level logical processor for providing outgoing signals comprising communication signals from an associated source and header routing indicia from said first level logical processor;
- one or more third level asynchronous logical processor responsive to said outgoing signals for routing said communication signals in accordance with the routing indicia;
- means for providing said outgoing communication signals from said second level logical processor to said third level logical processor at a data burst rate;
- means for queuing the outgoing communication signals between said second level logical processor and said thrid level logical processor;
- means for routing said outgoing communications signals over a fiber optical coupler system in communication with one or more additional node structures, said means for routing connected to said third level processor; and
- means for prioritizing the communication of one node with respect to another node over said fiber optic coupler.

4. The node structure of claim 3 wherein said prioritizing means comprises:
- means for establishing a control signal exchange over a fiber optic coupler, said control signal comprising a repeating sequence of transmitted requests for transmission of an outgoing communication signal on said fiber optic coupler, one from said one or more additional node structure associated with said fiber optic coupler, alternating with a repeating sequence of grants, one from each node associated with said fiber optic coupler, and indicating the identity of the node text to transmit over said fiber optic coupler;
- means for transmitting said outgoing communication signals over said fiber optic coupler network from the node identified in the preceding sequence of grant signals; and
- means for determining the grants at each node structure in accordance with a priority scheme, awarding the grant to the node having waited the longest time since its last opportunity to transmit.

5. The node structure of claim 4 wherein:
- said means for determining grants provides priority to real time communication; and
- said transmitted request identify whether the message waiting at each corresponding node is a real time communication.

6. A node structure including:
- a first level logical processor operative in response to indicia indicative of a desired communication recipient for generating routing indicia corresponding to a selected routing for communication to the desired recipient;

one or more second level asynchronous logical processors connected to one or more sources of communication signals and responsive to the routing indicia from said first level logical processor for providing outgoing signals comprising communication signals from an associated source and header routing indicia from said first level logical processor;

one or more third level asynchronous logical processor responsive to said outgoing signals for routing said communication signals in accordance with the routing indicia;

means for providing said outgoing communication signals from said second level logical processor to said thrid level logical processor at a data burst rate;

means for queuing the outgoing communication signals between said second level logical processor and said thrid level logical processor; and means for routing said outgoing communications signals over a fiber optical coupler system in communication with one or more additional node structures, said means for routing connected to said third level processor, wherein said optical coupler includes at least one passive star.

7. A node structure for communication system comprising:

a first level logical processor operative in response to indicia indicative of a desired communication recipient for generating routing indicia corresponding to a selected routing for communication to the desired recipient;

one or more second level asynchronous logical processors connected to one or more sources of communication signals and responsive to the routing indicia from said first level logical processor for providing outgoing signals comprising communication signals from an associated source and header routing indicia from said first level logical processor;

one or more third level asynchronous logical processor responsive to said outgoing signals for routing said communication signals in accordance with the routing indicia;

a plurality of queues coupled by a data bus and associated with a second level logical processor and one or more signal sources;

means for directing communication signals between said queues in accordance with said routing indicia; and a plurality of clusters each including said second level logical processor data bus, and associated said separate second level logical processor and at least one of said signal sources and each of said queues comprises a preassigned data queue and is operative under routing indicia control for communicating between each said cluster through said third level processor.

8. A node structure for communication system comprising:

a first level logical processor operative in response to indicia indicative of a desired communication recipient for generating routing indicia corresponding to a selected routing for communication to the desired recipient;

one or more second level asynchronous logical processors connected to one or more sources of communication signals and responsive to the routing indicia from said first level logical processor for providing outgoing signals comprising communication signals from an associated source and header routing indicia from said first level logical processor; and one or more third level asynchronous logical processor responsive to said outgoing signals for routing said communication signals in accordance with the routing indicia, wherein said signal sources with which a second level logical processor is associated are selected from the class of signal sources comprising voice and video data signals, said node structure further including means responsive to signal sources of a voice signal transmitting capability for digitizing said signals wherein the generated outgoing communication signals comprise digital counterparts of source generated voice signals as said communication signal and wherein said digitizing means has a logarithmic transfer function between a voice signal in an analog form and a digital signal counterpart.

9. A communication priority scheme for communication between a plurality, greater than three, of communication centers over a channel coupling network comprising:

three of more communication centers each capable of receiving and transmitting data;

a communication coupler capable of supporting communication between one such communication center and another such communication center;

a control channel linking said three or more communication centers;

means associated with each of said communication centers for transmitting over said control channel a repeating sequence of requests for communications, one associated with each of said communication centers, alternating with a repeating sequence of grants of communication to an identifiable communication center;

means associated with each communication center for identifying the communication center next to transmit in response to information received in the previous requests for communication, that determination were being made at each communication center according to a priority algorithm; and the communication center identified in a preceeding grant for communicating a message over the coupling system until a subsequent grant to a different communication center is transmitted over said control network.

10. The priority system of claim 9 wherein said communication coupler comprises an optical fiber communication coupled having a passive star coupler.

11. The priority system of claim 9 wherein each communication center is operative to provide in each request for communication an identification of the communication type as real time communication or not.

12. The priority system of claim 11 wherein said priority algorithm gives precedance to requests for real time communication.

13. A node architecture for a communication system comprising:

plural signal originating and receiving sources and an associated middle logical processor;

a hierarchically superior logical processor and associated source directory, having source routing indicia;

a plurality of block transfer registers for the flow of signals between said sources dedicated to said middle logical processors;

means associated with said middle logical processor for controlling the transferring of signals in blocks between said registers in response to routing indicia; and a hierarchically inferior logical processor and associated plural additional block transfer registers operative to establish asynchronous communication to other inferior logical processors according to said routing indicia, wherein said superior logical processor operative to provide said routing indicia from said director for use by said logical processor.

14. the node architecture of claim 13 further including:

inferior logical processor associated plural additional block transfer registers; and means for enabling said inferior logical processor associated plural block transfer of signals between said sources under control of said inferior logical processor, and being connected to said middle logical processor.

15. The architecture of claim 14 wherein the signal flow speed of block transfers between registers increases inversely with hierarchical processor level.

16. A process for node based information flow comprising:

generating recipient routing indicia at a first level logical processor in response to indicia from a plurality of signal sources indicative of a desired communication recipient;

generating outgoing signals at a second level logical processor adapted for operation in association with one or more sources of communication signals in response to routing indicia form said first level logical processor, said outgoing signals comprising communication signals from the associated source and routing indicia from said first level logical processor;

routing said communication signals ar a third level asynchronous logical processor in accordance with the routing indicia; and providing an interrupt signal from a source to said first level logical processor indicative of a desired communication recipient associated with a second level logical processor.

17. The process of claim 16 wherein said interrupt is provided to said first level logical processor at a character rate.

18. The process of claim 17 wherein said outgoing signals are provided at a data burst rate.

19. A process for node based information flow comprising:

generating recipient routing indicia at a first level logical processor in response to indicia from a plurality of signal sources indicative of a desired communication recipient;

generating outgoing signals at a second level logical processor adapted for operation in association with one or more sources of communication signals in response to routing indicia from said first level logical processor, said outgoing signals comprising communication signals from the associated source and routing indicia from said first level logical processor;

routing said communication signals at a third level asynchronous logical processor in accordance with the routing indicia;

queuing the outgoing signals from said second level logical processor to said third level logical processor for block transfer;

routing said outgoing signals over a network comprising a fiber optical coupler system in communication with one or more additional nodes; and prioritizing the communication of one node with respect to another node over said fiber optic coupler.

20. The process of claim 19 wherein said prioritizing step comprises the steps of:

establishing a control signal exchange over a fiber optic coupler comprising a repeating sequence of transmitted requests for transmission of an outgoing signal on said fiber optic coupler, one from each node associated with said fiber optic coupler, alternating with a repeating sequence of grants, one from each node associated with said fiber optic coupler, and indicating the identity of the node next to transmit over said fiber optic coupler;

transmitting said outgoing signal over said fiber optic coupler network from the node identified in the preceding sequence of grant signals;

determining the grants at each nodal station in accordance with the same priority scheme, awarding the grant to the node having waited the longest time since its last opportunity to transmit.

21. The process of claim 20 wherein:

said step of identifying grants provides priority to real time communication; and said requests identify whether the message waiting at each corresponding node is real time communication.

22. The process of claim 19 further including the step of digitizing source signals whereby the generated outgoing signals comprise digital counterparts of the source generated signals as said communication signals.

23. A communication priority method for communication between a plurality greater than three of communication centers over a single channel coupling network comprising:

transmitting over a control channel a repeating sequence of requests for transmission, one associated with each of plural communication centers, alternating with a repeating sequence of grants of communication authority to an identifiable communication center;

identifying the communication center to be granted authority next to transmit in response to information received in the previous request for communication, that identification determination being made at each communication center according to a unitary priority algorithm; and communicating a message from the communication center identified in the preceding set of grants over a coupling system until a subsequent grant to a different communication center is transmitted over said control network.

24. The priority method of claim 23 wherein said priority algorithm gives precedence to requests for real time communication.

* * * * *